US009208655B2

(12) United States Patent
Aida et al.

(10) Patent No.: US 9,208,655 B2

(45) Date of Patent: *Dec. 8, 2015

(54) GAMING MACHINE AND METHODS OF ALLOWING A PLAYER TO PLAY GAMING MACHINES HAVING SYNCHRONIZED SYMBOLS

(71) Applicant: Konami Gaming, Inc., Las Vegas, NV (US)

(72) Inventors: Eiji Aida, Chiyoda-ku (JP); Daisuke Nakamura, Zama (JP); Osamu Yoshimi, Botany (AU)

(73) Assignee: KONAMI GAMING, INC., Las Vegas, NV (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/934,648

(22) Filed: Jul. 3, 2013

(65) Prior Publication Data

US 2013/0296019 A1 Nov. 7, 2013

Related U.S. Application Data

(63) Continuation-in-part of application No. 13/891,059, filed on May 9, 2013, now Pat. No. 8,961,293, which is a continuation of application No. 13/169,639, filed on Jun. 27, 2011, now Pat. No. 8,465,359, which is a (Continued)

(30) Foreign Application Priority Data

Apr. 30, 2003 (JP) ................................ 2003-125600
Feb. 14, 2005 (AU) ................................ 2005900681

(51) Int. Cl.
*A63F 9/24* (2006.01)
*A63F 13/00* (2014.01)

(Continued)

(52) U.S. Cl.
CPC ............ *G07F 17/34* (2013.01); *G07F 17/3267* (2013.01)

(58) Field of Classification Search
CPC . G07F 17/32; G07F 17/3211; G07F 17/3213; G07F 17/34
USPC .......................................................... 463/20
See application file for complete search history.

(56) References Cited

U.S. PATENT DOCUMENTS 4,037,845 A 7/1977 Hooker
4,448,419 A 5/1984 Teinaes (Continued)

FOREIGN PATENT DOCUMENTS

AU 768153 1/2002
AU 2002301067 B2 6/2003

(Continued)

OTHER PUBLICATIONS

European Search Report (date of completion of search Feb. 12, 2010).
European Search Report (date of mailing Dec. 19, 2012).
International Search Report (Date of Mailing Apr. 22, 2005).

(Continued)

*Primary Examiner* — Kevin Y Kim

(74) *Attorney, Agent, or Firm* — Howard & Howard Attorneys PLLC

(57) ABSTRACT

A gaming machine for providing a game to a player is described herein. The gaming machine includes a display device for displaying the game and a game controller. The game includes a plurality of reels having a predetermined number of elements, wherein each element has an associated symbol from a set of symbols and at least one reel has a run of consecutive elements. The game controller initiates an instance of the game, responsively displays the game on the display device, randomly determines an outcome of the game, and responsively spins and stops the reels to display the outcome. The outcome includes at least two reels having the same symbols being displayed in the same symbol positions. The game controller displays each one of the at least two reels having a run of consecutive elements, and populates the run of consecutive elements with an identical symbol.

28 Claims, 58 Drawing Sheets

Related U.S. Application Data continuation of application No. 12/890,385, filed on Sep. 24, 2010, now Pat. No. 8,449,376, which is a continuation of application No. 10/835,887, filed on Apr. 29, 2004, now Pat. No. 7,824,260, said application No. 13/934,648 is a continuation of application No. 13/609,717, filed on Sep. 11, 2012, now Pat. No. 8,715,059, which is a continuation of application No. 13/160,810, filed on Jun. 15, 2011, now Pat. No. 8,287,359, said application No. 13/934,648 is a continuation of application No. 11/924,064, filed on Oct. 25, 2007, now Pat. No. 8,052,515, which is a continuation of application No. 13/685,368, filed on Nov. 26, 2012, now Pat. No. 8,628,401, which is a continuation of application No. 13/316,025, filed on Dec. 9, 2011, now Pat. No. 8,366,540, which is a continuation of application No. 11/299,009, filed on Dec. 9, 2005, now Pat. No. 8,096,869.

(51) Int. Cl.

| | |
|---|---|
| ***G06F 17/00*** | (2006.01) |
| ***G06F 19/00*** | (2011.01) |
| ***G07F 17/34*** | (2006.01) |
| ***G07F 17/32*** | (2006.01) |

(56) References Cited

U.S. PATENT DOCUMENTS 4,836,546 A * 6/1989 DiRe et al. .................... 463/18
5,085,436 A 2/1992 Bennett
5,152,529 A 10/1992 Okada
5,395,111 A 3/1995 Inoue
5,580,055 A 12/1996 Hagiwara
5,609,524 A 3/1997 Inoue
5,611,535 A 3/1997 Tiberio
5,624,119 A 4/1997 Leake
5,722,891 A 3/1998 Inoue
5,752,881 A 5/1998 Inoue
5,807,172 A 9/1998 Piechowiak
5,976,016 A 11/1999 Moody et al.
5,984,781 A 11/1999 Sunaga
5,997,401 A 12/1999 Crawford
6,007,066 A 12/1999 Moody
6,056,642 A 5/2000 Bennett
6,159,096 A 12/2000 Yoseloff
6,186,894 B1 2/2001 Mayeroff
6,220,959 B1 4/2001 Holmes, Jr. et al.
6,227,971 B1 5/2001 Weiss
6,241,607 B1 6/2001 Payne et al.
6,254,483 B1 * 7/2001 Acres .......................... 463/26
6,270,412 B1 8/2001 Crawford et al.
6,309,299 B1 10/2001 Weiss
6,319,124 B1 11/2001 Baerlocher et al.
6,394,902 B1 5/2002 Glavich et al.
6,413,162 B1 7/2002 Baerlocher et al.
6,439,993 B1 8/2002 O'Halloran
6,464,581 B1 10/2002 Yoseloff et al.
6,471,208 B2 10/2002 Yoseloff et al.
6,475,087 B1 11/2002 Cole
6,517,432 B1 2/2003 Jaffe
6,517,433 B2 2/2003 Loose et al.
6,544,120 B2 4/2003 Ainsworth
6,604,999 B2 8/2003 Ainworth
6,644,664 B2 11/2003 Muir et al.
6,663,487 B1 12/2003 Ladner
6,726,204 B2 4/2004 Inoue
6,805,349 B2 10/2004 Baerlocher et al.
6,869,357 B2 3/2005 Adams et al.
6,880,826 B2 4/2005 Inoue
6,893,018 B2 5/2005 Inoue
6,896,615 B2 5/2005 Berman
6,905,408 B2 6/2005 Inoue
6,908,381 B2 6/2005 Ellis
6,910,962 B2 6/2005 Marks et al.
6,932,700 B2 8/2005 Bennett et al.
6,960,134 B2 11/2005 Hartl et al.
7,056,213 B2 6/2006 Ching et al.
7,179,166 B1 2/2007 Abbott
7,214,132 B2 5/2007 Inoue
7,237,775 B2 7/2007 Thomas et al.
7,252,589 B1 8/2007 Marks et al.
7,252,591 B2 8/2007 Van Asdale
7,311,602 B2 12/2007 Inoue
7,316,395 B1 1/2008 Kromydas
7,479,061 B2 1/2009 Okada
7,690,984 B2 4/2010 Tran et al.
7,824,260 B2 11/2010 Aida
8,052,515 B2 11/2011 Nakamura
8,096,869 B2 1/2012 Yoshimi
8,287,359 B2 10/2012 Nakamura
8,366,540 B2 2/2013 Yoshimi
2002/0039920 A1 4/2002 Bryant
2002/0123378 A1 9/2002 Bucknail et al.
2003/0013517 A1 1/2003 Bennett et al.
2003/0027611 A1 2/2003 Recard
2003/0060268 A1 * 3/2003 Falconer ......................... 463/20
2003/0087687 A1 5/2003 Locke et al.
2003/0134673 A1 7/2003 Moody
2004/0012145 A1 1/2004 Inoue
2004/0014516 A1 1/2004 Inoue
2004/0014517 A1 1/2004 Inoue
2004/0017041 A1 1/2004 Inoue
2004/0026854 A1 2/2004 Inoue
2004/0036218 A1 2/2004 Inoue
2004/0038726 A1 2/2004 Inoue
2004/0048646 A1 3/2004 Visocnik
2004/0053679 A1 3/2004 Getz et al.
2004/0058727 A1 3/2004 Marks et al.
2004/0063488 A1 4/2004 Berman
2004/0072610 A1 4/2004 White et al.
2004/0102244 A1 5/2004 Kryuchkov et al.
2004/0116175 A1 6/2004 Aida
2004/0198486 A1 10/2004 Walker et al.
2004/0219969 A1 11/2004 Casey et al.
2004/0266520 A1 12/2004 Aida
2005/0043083 A1 2/2005 Inoue
2005/0043084 A1 2/2005 Inoue
2005/0159208 A1 7/2005 Pacey
2005/0277460 A1 12/2005 Inoue
2006/0046830 A1 3/2006 Webb
2006/0052155 A1 3/2006 Inoue
2006/0084492 A1 4/2006 Baerlocher et al.
2006/0084498 A1 4/2006 Baerlocher et al.
2006/0166731 A1 7/2006 Yoshimi et al.
2006/0183533 A1 8/2006 Tran et al.
2006/0183534 A1 8/2006 Yoshimi
2006/0247002 A1 11/2006 Yoshimi et al.
2006/0287060 A1 12/2006 Yoshimi
2007/0015565 A1 1/2007 Chan
2007/0060323 A1 3/2007 Isaac et al.
2007/0105610 A1 5/2007 Anderson
2007/0270203 A1 11/2007 Adia
2008/0045300 A1 2/2008 Quayle et al.
2008/0045323 A1 2/2008 Bermam
2008/0113753 A1 5/2008 Nelson
2009/0082087 A1 3/2009 Pacey et al.
2009/0111571 A1 4/2009 Nakamura et al.
2009/0227332 A1 9/2009 Yoshizawa

FOREIGN PATENT DOCUMENTS

AU 2004203045 A1 7/2004
JP 6-246043 A2 9/1994
JP 10-328351 12/1998

(56) References Cited

FOREIGN PATENT DOCUMENTS

| | | | |
|---|---|---|---|
| JP | 3330338 | | 8/1999 |
| JP | 2001-095972 | A | 4/2001 |
| JP | 2002-191782 | | 7/2002 |
| JP | 2002-325881 | A | 11/2002 |
| JP | 2003-236055 | A | 8/2003 |
| JP | 2004-329297 | A | 11/2004 |
| JP | 2006-204537 | A | 8/2006 |

OTHER PUBLICATIONS

Office Action for U.S. Appl. No. 11/281,258 (Notification Date Dec. 13, 2007).

Response to Office Action of Dec. 13, 2007 (Dated Mar. 13, 2008) for U.S. Appl. No. 11/281,258.

Office Action for U.S. Appl. No. 11/413,707 (Notification Date Jan. 28, 2008).

* cited by examiner

FIG. 54

| | |
|---|---|
| ONE PAIR | THERE ARE TWO CARDS (ONE PAIR) OF SAME NUMBER IN FIVE CARDS |
| TWO PAIR | THERE ARE TWO KINDS OF PAIRS IN FIVE CARDS |
| THREE CARD | THERE ARE THREE CARDS OF SAME NUMBER IN FIVE CARDS |
| STRAIGHT | NUMBERS ARE SEQUENTIAL IN ALL FIVE CARDS |
| FLUSH | ALL FIVE CARDS ARE OF SAME SUIT (SPADES, DIAMONDS, ETC.) |
| FULL HOUSE | THERE IS ONE PAIR AND THREE CARD IN FIVE CARDS |
| FOUR OF A KIND | THERE ARE FOUR SAME NUMBERS IN FIVE CARDS |
| STRAIGHT FLUSH | BOTH FLUSH AND STRAIGHT ARE IN FIVE CARDS |

GAMING MACHINE AND METHODS OF ALLOWING A PLAYER TO PLAY GAMING MACHINES HAVING SYNCHRONIZED SYMBOLS

CROSS-REFERENCES TO RELATED APPLICATIONS

This application is a continuation-in-part of U.S. patent application Ser. No. 13/891,059, filed May 9, 2013, which is a continuation of U.S. patent application Ser. No. 13/169,639, filed on Jun. 27, 2011 (now U.S. Pat. No. 8,465,359, issued Jun. 18, 2013), which is a continuation of U.S. patent application Ser. No. 12/890,385, filed on Sep. 24, 2010 (now U.S. Pat. No. 8,449,376, issued May 28, 2013), which is a continuation of U.S. patent application Ser. No. 10/835,887, filed on Apr. 29, 2004 (now U.S. Pat. No. 7,824,260, issued on Nov. 2, 2010), which claims priority to Japanese Application No. JP-2003-125600, filed on Apr. 25, 2003, and is a continuation-in-part of U.S. patent application Ser. No. 13/609,717, filed Sep. 11, 2012, which is a continuation of U.S. patent application Ser. No. 13/160,810, filed Jun. 15, 2011 (now U.S. Pat. No. 8,287,359, issued Oct. 16, 2012), which is a continuation of U.S. patent application Ser. No. 11/924,064, filed Oct. 25, 2007 (now U.S. Pat. No. 8,052,515, issued Nov. 8, 2011), and is a continuation-in-part of U.S. patent application Ser. No. 13/685,368 filed on Nov. 26, 2012, which is a continuation of U.S. patent application Ser. No. 13/316,025 filed on Dec. 9, 2011 (now U.S. Pat. No. 8,366,540, issued Feb. 5, 2013), which is a continuation of U.S. patent application Ser. No. 11/299,009 filed on Dec. 5, 2005 (now U.S. Pat. No. 8,096,869, issued on Jan. 17, 2012), which claims priority to Australian Patent Application No. 2005900681, filed on Feb. 14, 2005, all of which are incorporated herein by reference in their entirety for all purposes.

FIELD OF THE INVENTION

The present invention relates to a gaming machine having a re-drawing function. Moreover, the present invention relates to a gaming machine that is installed in a casino or the like, and in particular conducts a slot game. In addition, the present invention relates to gaming machines for the playing of games of chance and, more particularly, to special features of games or feature games which may be offered on such machines.

BACKGROUND OF THE INVENTION

Conventionally, there are known pachinko-type gaming machines comprising slot machine and reel units that carry out re-drawing. For example, in the pachinko gaming machine disclosed in Publication of Japanese Patent No. 3330338, when a player operates a hitting handle, pachinko balls are hit into a game region formed in a front surface of a game board one by one. A reel unit that can change display or stop display of a plurality of symbols, and a plurality of starting winning holes are provided on the play surface. In a case where a pachinko ball goes into any of the starting winning holes, the pachinko ball is detected by a starting winning ball detector, and each reel in the reel unit rotates based on a detection signal of the starting winning ball detector, so as to change display the plurality of symbols. After a predetermined time has passed, a second reel (center reel) stops, and in a case where the second reel that stops is a symbol other than a specific symbol, a first reel (left reel) stops thereafter, and finally, a third reel (right reel) stops.

When every reel stops, in a case where a combination of pre-set specific symbols are displayed, a situation favorable for the player occurs by for example, opening an opening/closing plate of a variable prize winning ball device in a tulip-shape, and creating a situation where a predetermined game value can be provided to the player.

Each reel can display three symbols in the longitudinal direction. Therefore, symbols displayed by the three reels are in a 3×3 matrix alignment. In this matrix, a total of five lines are formed: three horizontal lines and two diagonal lines.

On the other hand, in a case where a symbol stop displayed is a specified symbol (for example "7") at the time the second reel stops, the change display discussed below is carried out. The first and third reels continue change display of the symbols, but the first and third reels are stopped at the same time, or are stopped in an order of first reel, then the third reel, after slowly rotating the "7" symbol horizontally, downwards, or upwards, in a state where the symbols are matched. By this, a situation where a matching is possible in a win line of a center horizontal direction, a win line of a downward direction, or win line of an upwards direction is possible, while the rotation of the first and third reels.

However, in the conventional re-drawing method, it is difficult to correspond to a slot machine with many reels, or a slot machine that validates a plurality of symbols on one reel. In the conventional method, when a predetermined condition is met, re-drawing is carried out by the entire reels, so as to standardize variation of re-drawing.

Gaming machines such as slot machines, poker machines, fruit machines, and the like generally attract enormous popularity from players in casinos. Such a gaming machine displays an arrangement of symbols on the front thereof, and randomly changes types of symbols in the arrangement at each round of game. A player places a bet at the start of each round. If a winning combination appears in the arrangement, the player will win an amount of a payout that depends on the amount of the bet and the type of the winning combination.

This type of gaming machine is generally equipped with mechanical reels that are coaxially arranged and allowed to independently spin by respective motors. Symbols are permanently displayed, e.g., printed on the circumferential surfaces on each reel in a predetermined order. Mechanical reels repeat spins and stops, and thereby change visible symbols at random. Alternatively, this type of gaming machine may use an electric display device to display symbols in graphic form on a screen thereof. The symbols are aligned in two or more columns, i.e., video reels Like mechanical reels repeating spins and stops, video reels repeatedly change in appearance, and thereby symbols repeatedly move and stop in a vertical direction. Such actions of symbols are often referred to as "spins and stops of video reels". There is also a mechanical reel with one or more electric display devices mounted on the circumferential surface of the mechanical reel. Symbols are displayed in graphic form on a screen of the electric display device. Visible symbols move and change, whichever the mechanical reel spins or the electric display device changes images produced thereon.

Most players prefer a gaming machine that can provide a larger amount of payout. The upper limit of payout per round generally depends on a total number of types of symbol arrangements visible on reels. Mechanical reels have a limited number of symbol types mainly because of their sizes. In order to increase the upper limit of payout per round, a gaming machine with mechanical reels randomly provides a player with a right to play a bonus round. A player can win a larger amount of payout, or an amount of payout more frequently at a bonus round than at a normal round. In addition, a player can play a bonus round for free.

On the other hand, video reels have no limited number of symbol types in principle. However, a gaming machine with video reels also provides a player with a right to play a bonus round in order to enhance the variety of game contents and visual effects, and thereby attract a larger number of players.

Recent remarkable progress on game controllers, computer graphics, and display devices enables gaming machines to produce more various types of bonus rounds with more complex rules and visual effects. This facilitates differentiation of a type of gaming machines from others. On the other hand, excessively complex rules and visual effects may prevent gaming machines to raise players' expectations for winning In addition, excessively complex rules and visual effects may place a heavy burden on game designers and developers.

In addition, traditionally such gaming machines were mechanical devices where a number of reels marked with a plurality of numbers or symbols could be made to spin randomly by the application of some mechanical input. If the subsequent patterns of numbers or symbols displayed on the reels, when these returned to a rest state, corresponded to predetermined patterns, the machine would provide a prize or payout. Generally such gaming machines have come to be regulated by government authorities as to their number and in the manner in which the machines must return a percentage of the monetary turnover to the players.

The introduction of electronics, computers and electronic graphical displays, has allowed a continual increase in the complexity and variations of gaming machines, games and displays while maintaining the basic concept of the traditional machine. Nevertheless, in some jurisdictions at least, government regulations effectively restrict the degree of variation which may be incorporated in games played on coin-freed machines.

Machines and games therefore that offer novel and stimulating variations on the basic game theme and environment, yet comply with these restrictions are eagerly sought by the gaming industry and there is consequently intense competition between machine manufacturers to innovate.

Games based on simulated rotatable reels typically display a matrix of elements each of which displays a symbol. Predetermined patterns of symbols, if displayed after the reels are spun and come to rest, may then award a prize to the player of the game. Typically also, the symbols are arranged in the elements of a reel so that adjoining elements do not display the same symbol.

An exception to this is found for example in Australian Patent Application number 2004203045 (Aristocrat Technologies Australia Pty Ltd), in which arrangements are envisaged where two special symbols may occur adjacent one to the other.

A similar exception is found in Australian Patent Application number 2002301067 (Stargames Corporation Limited), in which a specific symbol and the number of its occurrences in the display at the conclusion of a game sequence, is determinant of a win. As indicated in FIG. 2 of the specification, two such symbols may appear in adjoining elements of a reel.

Both these examples of the prior art allow for only a single predetermined or special symbol to take up such adjacent positions on a reel.

In view of the above, it will be apparent to those skilled in the art from this disclosure that there exists a need for an improved gaming machine that can produce a bonus round with more simple rules and visual effects, and thereby cause a player to recognize the bonus round more clearly and reduce a burden on game designers and developers. This invention addresses this need in the art as well as other needs, which will become apparent to those skilled in the art from this disclosure.

BRIEF SUMMARY OF THE INVENTION

In view of the above-noted disadvantages, one of one of the objects of the present invention is to provide a gaming machine that can raise a player's interest in a game by carrying out diverse re-drawing in accordance with progress of the game.

In one aspect of the present invention, a gaming machine for providing a game to a player is provided. The gaming machine includes a display device for displaying the game and a game controller. The game includes a plurality of reels having a predetermined number of elements, wherein each element has an associated symbol from a set of symbols and at least one reel has a run of consecutive elements. The game controller initiates an instance of the game, responsively displays the game on the display device, randomly determines an outcome of the game, and responsively spins and stops the reels to display the outcome. The outcome includes at least two reels having the same symbols being displayed in the same symbol positions. The game controller displays each one of the at least two reels having a run of consecutive elements, and populates the run of consecutive elements with an identical symbol.

In another aspect of the present invention, a gaming machine for providing a game to a player is provided. The gaming machine includes a game controller and a display device for displaying the game including a plurality of reels. Each reel has a predetermined number of elements, wherein each element has an associated symbol from a set of symbols. At least one reel has a run of consecutive elements. The game controller initiates a first instance of the game and responsively displays the game on the display device, wherein the game includes a plurality of first reels and a second reel. The game controller detects a triggering condition in the first instance and in response to detecting the triggering condition, initiates a second instance of the game, determines an outcome of the second instance of the game including at least two first reels having the same symbols being displayed in the same symbol positions, displays the outcome including spinning and stopping the at least two first reels and retains a second reel in a stop position while the at least two reels are spinning.

In a further aspect of the present invention, a method of providing a game on a gaming machine is provided. The gaming machine has a plurality of reels and a display device. Each reel has a predetermined number of elements, wherein each element has an associated symbol from a set of symbols. At least one reel of the plurality of reels has a run of consecutive elements. The method includes initiating an instance of the game and responsively displaying the game on a display device, randomly determining an outcome of the game and responsively spinning and stopping the reels to display the outcome, wherein the outcome includes at least two reels having the same symbols being displayed in the same symbol positions, displaying each one of the at least two reels having a run of consecutive elements, and populating the run of consecutive elements with an identical symbol.

In another aspect of the present invention, a method of providing an electronic game on a gaming machine is provided. The gaming machine has a plurality of reels and a display device. Each reel has a predetermined number of elements, wherein each element has an associated symbol from a set of symbols. The method includes initiating a first instance of the game and responsively displaying the game on a display device, wherein the game includes a plurality of first reels and a second reel, detecting a triggering condition in the first instance and in response to detecting the triggering condition, initiating a second instance of the game, determining an outcome of the second instance of the game including at least two first reels having the same symbols being displayed in the same symbol positions, displaying the outcome including spinning and stopping the at least two first reels and retaining a second reel in a stop position while the at least two reels are spinning, and awarding an award to the player as a function of the outcome.

A gaming machine has a display unit having a first display area adapted to displaying a plurality of types of symbols and a second display area adapted to displaying specific symbols that have specific interrelationships, a draw control unit that determines the specific symbols to display for a first game, wherein after the specific symbols are displayed in the first game, the draw control unit controls the display of the specific symbols in the second display area at determined times of subsequent the games, and determines areas in which the specific symbols are not displayed in the first display area and wherein the plurality of types of symbols displayed in the first display area are predetermined by the draw control unit as symbols that have no specific interrelationship.

In this way, in a case where a predetermined symbol is stopped in a plurality of display regions, the display regions that display the predetermined symbols are set as specific display regions. Because drawing at predetermined times of games after the first game is carried out from a plurality of types of symbols that are to be displayed, there is a specific relationship among the symbols in each game and the symbols having a predetermined relationship are displayed in the specific display region. By this, an independent drawing result (re-drawing result) which differs from the general display region, can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

A gaming machine has a display unit that performs a flash display of symbols in which symbols are moved in a constant fashion in a plurality of display areas and subsequently stops movement of the symbols to display all or a portion of the symbols in a substantially stationary fashion, a draw control unit that determines specific symbols to be stopped in a specific display area for a first game, and wherein the specific symbols stopped in one of the display areas, are different types of the symbols from those in other display areas in a predetermined number of times after the specific symbols are displayed in the first game.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the symbols in the other display areas is the same type of symbol as displayed in the specific display area, the draw control unit changes the symbols in the other display areas to the specific symbols, and controls all of the specific symbols to be same type of the symbols in a predetermined number of times after modified.

In this way, in a case where a symbol to be displayed in whichever ordinary display region is the same symbol as the symbol that is to be displayed in the specific display region, because the ordinary display region that has drawn the same symbols as the symbol that is to be displayed in the specific display region is changed to the specific display region, in a predetermined number of feature games after the next time, the number of regions that structure the specific display region increases every time the same symbol is drawn in the ordinary display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein when the symbols in one of the other display areas are in a win situation, the draw control unit modifies one of the other display areas to another specific display area, modifies the symbols in the another specific display area to the specific symbols, and controls all of the specific symbols in the one of the other display areas, being same type of the symbols in a predetermined number of times after modified.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein at least one of the other display areas is adjacent to the specific display area.

In this way, in a case where a win situation is established in whichever of a plurality of ordinary display regions, during a game of a predetermined number of times, because the ordinary display region that is to establish a win changes to another specific display region independent from the specific display region, the number of specific display regions increases every time a win situation is established in the ordinary display regions. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the win situation is established when special symbols are displayed in one of the other display areas.

In this way, in a case where a win situation is established in whichever of a plurality of ordinary display regions by a predetermined symbol being displayed, during a game of a predetermined number of times, because the ordinary display region that is to establish a win changes to another specific display region independent from the specific display region, the number of specific display regions increases every time a win situation is established in the ordinary display regions by a predetermined symbol being displayed. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the draw control unit controls all of the specific symbols in the specific display area and one of the other display areas, being same type of the 10 symbols in a predetermined number of times after modified.

By this structure, in a case where the symbol to be displayed in the specific display regions and the other specific display region are the same, drawing is carried out so that the same symbol is displayed in every specific display region. Namely, the specific display region and the other specific display region display the same symbols by combining, and becoming one specific display region. By this, diverse re-drawing can be carried out in the specific display region. For example, variation of the game activity can be possible by for example, increasing the dividend in accordance with the increase in number of the regions that constitute the specific display region, etc. As a result, the player's interests can be aroused.

A gaming machine has a display unit displaying a plurality of types of symbols, upon starting a game, a draw control unit predetermining a specific symbol display area where specific symbols that establish a plurality of specific prizes are displayed at predetermined times after starting the game, wherein the draw control unit selects the specific symbols for one of the plurality of specific prizes, from a prize group to which the one of the plurality of specific prizes belongs, and predetermines a general display area where other symbols are displayed, wherein the general display area displays the other symbols independently of the specific symbols in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the other symbols in the general display area adjacent to the specific display area is the same type of the specific symbols in the specific display area, the draw control unit modifies the general display area adjacent the specific display area correspond to the specific symbol display area, and controls all symbols in the specific symbol display area to establish a prize that belongs to different group from the one of the plurality of specific prizes.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out in every specific display region including the increased specific display region, so that at least one win among win groups different from win groups that the specific win belongs to in each game is established. Namely by the number of regions structuring the specific display region increasing, the grading of the wing groups are changed, and players alternate between hope and despair every time the number of regions increase. By this, it is possible to arouse the player's interests towards the game.

In another aspect, a gaming machine according to the present invention comprises a display unit, a console unit, a game controller unit, and a display controller unit.

The display unit is configured to display symbols in a plurality of columns. The display unit preferably arranges the symbols in the same order in two or more of the columns. The display unit is configured to spin and stop the columns of symbols.

The console unit is configured to accept instructions from a player. The instructions preferably indicate starting a round of game or placing a bet. The console unit is preferably configured to accept money from a player.

The game controller unit is configured to execute a game program, and thereby control the following functions of game. First, the game controller unit starts a round of game in response to an instruction accepted by the console unit. Here, the game controller unit preferably uses a portion of the money accepted by the console unit as a bet. The game controller unit may interpret the instruction to place a bet as a cue for starting a round of game. Second, the game controller unit determines an arrangement of symbols at random on a condition that symbols are arranged in the same order and at the same positions in the two or more columns. Third, the game controller unit retrieves a winning combination from the arrangement of symbols. Fourth, the game controller unit provides the player with an award depending on the winning combination retrieved from the arrangement of symbols. Here, the game controller unit may determine the type of the award depending on the bet.

The display controller unit is configured to cause the display unit to spin the two or more columns of symbols from the same position in synchronization with each other, and stop the two or more columns at the same position to display the arrangement of symbols determined by the game controller unit.

In general, a winning combination includes the same type of symbols at the same positions of two or more columns. Since the game controller unit determines an arrangement of symbols on the condition that symbols are arranged in the same order and at the same positions in two or more columns, chances are fairly good that a winning combination will appear in the arrangement determined by the game controller unit. Furthermore, the display unit spins the two or more columns of symbols from the same position in synchronization with each other. This effectively raises player's expectations for winning an award. On the other hand, the condition is easy to impose on the game controller unit. The display controller unit can easily control the two or more columns of symbols spinning in the above-mentioned synchronized manner. Thus, the gaming machine can provide a player with a better chance of winning an award in a simple manner, and cause the player to recognize the chance through simple and clear visual effects, without any heavy burden on game designers and developers.

Preferably, the display unit comprises a mechanical reel rotatable around its axis and having a circumferential surface on which a column of symbols is displayed. Alternatively, the display unit may comprise an electric display device on which a column of symbols is displayed in a graphic form. The electric display device may be mounted on the circumferential surface of a mechanical reel, and thereby rotatable together with the mechanical reel around the axis thereof.

The game controller unit preferably determines an arrangement of symbols at random without the above-mentioned condition in normal games, and on the condition in bonus games. In that case, the display controller unit preferably causes the display unit to spin all columns of symbols independently in normal games, and spin the two or more columns of symbols from the same position in synchronization with each other in bonus games.

The display unit preferably pairs a left end column of symbols with a right end column thereof in turn, starting from the outmost columns thereof, and arranges symbols in the same order in each pair of columns. In that case, the game controller unit preferably determines an arrangement of symbols at random on a condition that symbols are arranged in the same order and at the same positions in each pair of columns. Furthermore, the display controller unit preferably causes the display unit to spin each pair of columns from the same position in synchronization with each other, and stop the pairs at respective positions in the order from outermost to innermost. Note that the display controller unit may cause the display unit to stop the pairs in another order, e.g., from innermost to outermost, or at random. Alternatively, the display unit may pair different two columns, e.g., two adjacent columns or two columns separated by one other column.

These and other objects, features, aspects and advantages of the present invention will become apparent to those skilled in the art from the following detailed description, which, taken in conjunction with the annexed drawings, discloses a preferred embodiment of the present invention.

In yet another aspect, there is provided a gaming machine arranged to display a matrix of symbol containing elements; each column of said matrix comprising a portion of a simulated rotatable reel of said symbol containing elements; and wherein each of said symbol containing elements of at least one consecutive run of said symbol containing elements of at least one said reel is caused to display an identical symbol.

Preferably, said identical symbol is selected by a game controller from a subset of available symbols.

Preferably, each symbol of said subset of symbols is assigned a probability of selection.

Preferably, said matrix of elements is comprised of five columns and three rows of elements.

Preferably, said at least one said reel is a first left-most reel.

Preferably, each element of said first left-most reel other than elements of said at least one consecutive run of elements is populated by a random selection of said available symbols.

Preferably, said game controller selects one potential win element from each said reel.

Preferably, a prize is awarded to a player of a game on said gaming machine if a predetermined arrangement of said potential win elements is displayed on a pre-defined payline of said matrix of elements when a game sequence is concluded.

Preferably, elements of each of reels two, three, four and five are populated with a default random selection of said available symbols.

Preferably, each symbol of at least one pre-defined consecutive run of said elements of each of said reels two, three, four and five is adapted for potential modification from said default random selection of available symbols to a said identical symbol.

Preferably, said identical symbol is that symbol populating said consecutive run of elements of a leftwardly adjoining reel.

Preferably, said modification from said default random selection occurs within any one of said reels two, three, four or five, if a said win element of a preceding reel coincides with a said element of a consecutive run of elements of said preceding reel.

Preferably, each said reel, which includes said at least one consecutive run of identical symbols, is pre-spun at a relatively slow rate when a game sequence is initiated.

Preferably, all symbols of all elements of at least one said reel are identical.

Preferably, said gaming machine is a single display stand-alone gaming machine.

Preferably, said gaming machine is a stand-alone gaming machine provided with an upper secondary display.

Preferably, said gaming machine is one of a plurality of gaming machine linked to a progressive jackpot controller.

Preferably, said elements are N-sided elements; where N is a variable and values of N include N=1.

Preferably, said values of N include 4, 5, 6, 7, 8, 9, 10, 11, 12, 13, 14, 15, 16, 17, 18, 19 and 20.

Preferably, said N-sided elements are regular hexagons.

In a further broad form of the invention there is provided a method for increasing probability of a winning outcome on a gaming machine; wherein said winning outcome is determined by pre-defined arrangements of symbols displayed in a matrix of elements comprising portions of simulated rotatable reels; said method including the steps of: arranging at least of said simulated rotatable reels with at least one consecutive run of elements displaying an identical symbol; said identical symbol selected from a subset of available symbols. A game controller randomly selecting one element from each one of said simulated rotatable reels as a potential win element.

Preferably, said matrix of elements comprises three rows and five columns of said elements; said columns comprising portions of said rotatable reels.

Preferably, said identical symbol is selected from a look-up table of said subset of available symbols.

Preferably, said at least one of said simulated rotatable reels is a first left-most reel.

Preferably, all said elements of said reels, except said at least one consecutive run of elements displaying said identical symbol on said first left-most reel, display randomly selected symbols from said available symbols.

Preferably, reels other than said first left-most reels are each provided with at least one potential consecutive run of elements adapted for modification from said randomly selected symbols to a said identical symbol.

Preferably, said modification from said randomly selected symbols within said potential consecutive run of said reels other than said first left-most reel, occurs if said potential win element of a leftwardly preceding reel falls within a said consecutive run of elements of said leftwardly preceding reel.

In yet a further broad form of the invention there is provided a method of implementing a game on a gaming machine; said method including the steps of: providing said gaming machine with a control module; said module including a microprocessor, a working memory and a data storage device connection means, writing program code to said data storage device, connecting said data storage device to said control module.

In still a further broad form of the invention there is provided media for storing enabling digital code for playing games; said media comprising solid state data retaining devices including, read only memory (ROM) and erasable programmable read only memory (EPROM), compact flash cards and PCMCIA cards; said media further including disc-based storage devices.

BRIEF DESCRIPTION OF THE DRAWINGS

These objects and other objects and advantages of the present invention will become more apparent upon reading of the following detailed description and the accompanying drawings in which:

FIG. 54 is a diagram showing a structure of wins of the gaming machine according to the ninth embodiment;

Corresponding reference characters indicate corresponding parts throughout the drawings.

DETAILED DESCRIPTION OF THE INVENTION

Figure 1:
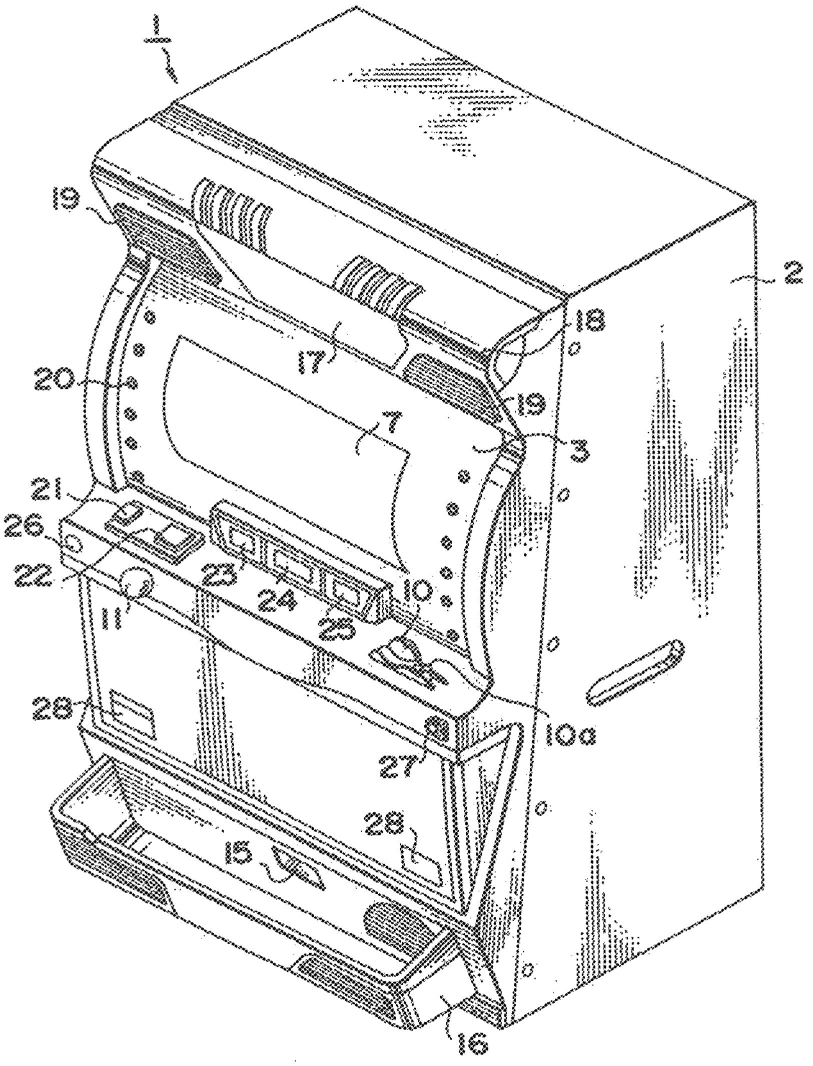
FIG. 1 is a perspective view of the exterior of a gaming machine according to a first embodiment.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

(1) Definition of Re-Drawing Reel

The purpose of re-drawing is to maintain an established win situation or a situation where particular symbols appear on the reel. One example is a case where three “cherry” symbols match on a slot machine. In this case, a win situation of “three matches” is established. Re-drawing maintains this win situation, and switches the kind of desired symbol to, for example “bar”, and “7”, etc. Also, re-drawing is to carry out re-drawing of symbols, maintaining a situation where same symbols appear in every position of up, middle, and down of the first to third reels, or maintaining a situation where same symbols appear in positions of each column, assuming that re-drawing is carried out in the first to third reels, in a five-reel slot machine. It is possible that the original symbol is re-drawn. In the case of “in a case where predetermined symbols are displayed stopped to a plurality of display regions, in a predetermined number of games after that game, in special display regions where the predetermined symbols are displayed, in at least game units, drawing is carried out from a plurality of kinds of symbols that are to be displayed having a predetermined relationship among the symbols", "predetermined relationship" corresponds to the above "established win situation, or a situation where symbols appear on the reels".

(2) Re-Drawing Reel

The re-drawing reel is for carrying out the above-discussed re-drawing. Symbol alignment of the re-drawing reel are all the same. By aligning the symbol alignment in a same position, and by rotating or stopping the reels, synchronizing timing and speed, the win situation can be maintained, and re-drawing of symbols can be carried out. A group of a plurality of re-drawing reels that maintain a common win situation will be described as "re-drawing reel group".

Appearance of the Re-Drawing Reel

Appearance of the re-drawing reel is switching of an ordinary reel to a re-drawing reel under a condition that a certain setting condition is established. This setting condition can be for example, appearance of a predetermined symbol. Below, this predetermined symbol will be described as a "trigger symbol". Or, a situation where a predetermined win (for example "BAR-BAR-BAR" and "7-7-7", etc.), being established by a combination of symbols, can be the "condition" of above. Or, in a case where a poker game is carried out, one establishment of the winning combinations, such as shown in FIG. 54, can be the "condition" of above. In a case of a video slot, because the reel is drawn by program-like processing, switching of the reel is easy. Symbol alignment of the ordinary reel and the re-drawing reel may be different. In a case of a rotating drum type reel, because switching is physically difficult, in most cases, the alignment symbol of the ordinary reel and the re-drawing reel are the same. Therefore, "to synchronization control" or "not to synchronization control" becomes the difference in separating the ordinary reel and the re-drawing reel. By changing the symbol alignment and synchronization timing, a plurality of re-drawing reels can be made to appear at the same time.

Increase of the Re-Drawing Reel

Increase of the re-drawing reel is carrying out the increase operation discussed, under the condition that some kind of setting condition is established. Here also, a predetermined symbol appearing, and a predetermined win situation being established by a combination of symbols, can be the setting condition. Also, for example, in a case where a poker game is carried out, one establishment of the winning combinations, such as shown in FIG. 54, can be the "condition" of above.

1. Increase in number of the re-drawing reels included in the re-drawing reel group 2. Increase in number of the re-drawing reel group itself Establishment of a win situation by a combination of a plurality of kinds of symbols may be the condition for the appearance of the re-drawing reel, or the increase of the re-drawing reel. For example, cases where combinations of symbols that express a specific meaning content, are displayed, such as "G" "0" "D" (GOD), and "C" "0" "I" "N" (COIN). The embodiments of the present invention will be described, with reference to the drawings.

First Embodiment

Figure 5:
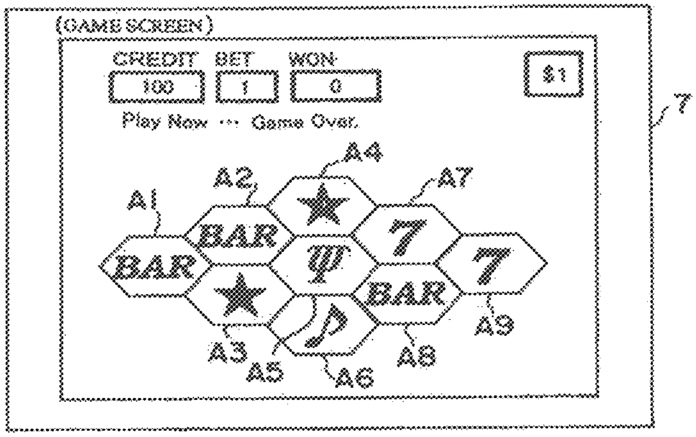
FIG. 5 is a diagram showing a screen display example of the gaming machine according to the first embodiment.
Figure 7:
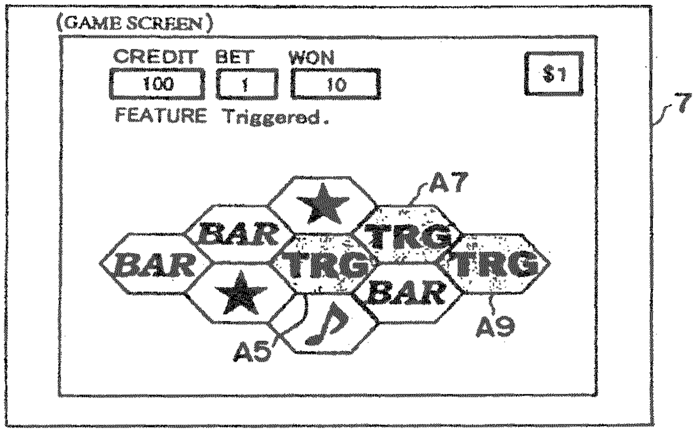
FIG. 7 is a diagram showing a screen display example of the gaming machine according to the first embodiment.

As shown in FIG. 5, a gaming machine 1 according to the first embodiment, uses nine independent hexagon reels A1 to A9 that respectively have different symbol alignments. The hexagon reels A1 to A9 structure a display region. In this gaming machine, if three or more sides of hexagons of a same symbol are adjacent, when each reel stops, it is a win. As shown in FIG. 7, in a case where trigger symbols "TRG" are displayed stopped, at the same time win is established and a predetermined pay is carried out, for five next games, feature games are carried out. Feature games are so called free games, and a game starts without a BET.

In FIG. 7, reels (A5, A7, A9) where trigger symbols appear, are switched to re-drawing reels at a start of a feature game. This re-drawing reel has a same symbol alignment, and stops the symbols at the same position by synchronously rotating. The re-drawing reel structures a specific display region. The reels that are not a re-drawing reel, is an ordinary reel, and structures a general display region.

The reels that establish a win situation during a feature game is switched to a re-drawing reel, in a unit of a symbol according to the win situation. Therefore, each time a win situation occurs in the feature game, an independent new re-drawing reel is generated. A plurality of kinds of re-drawing reels independently rotate, and stop. However, in a case where a same symbol is displayed stopped in a plurality of kinds of re-drawing reels, those reels combine, and one re-drawing reel, wherein the number of reels is increased is generated. Below, the first embodiment will be described in detail.

Figure 6:
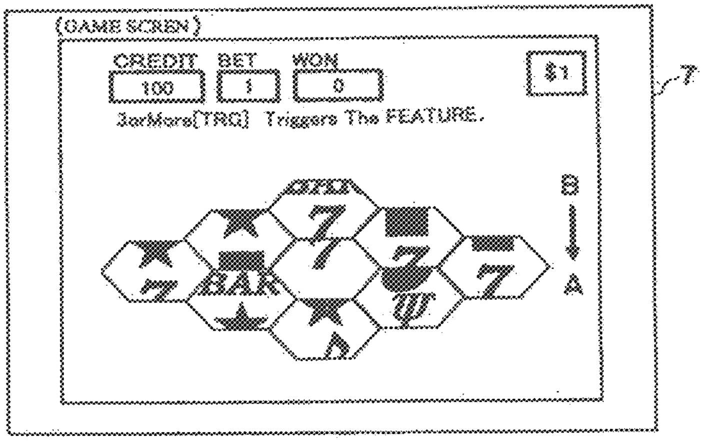
FIG. 6 is a diagram showing a screen display example of the gaming machine according to the first embodiment.

As shown in FIG. 1, a gaming machine 1 according to the first embodiment, comprises a chassis 2, and a front panel 3 in front of the chassis 2, which is attached so that it can be opened and closed. In the rear of the front panel 3, a symbol display unit 7 structured by a liquid crystal panel or a CRT (Cathode Ray Tube) is provided. In the first embodiment, the symbol display unit 7 adopts a video reel method, and displays nine hexagon reels A1 to A9, by executing a program. For example, FIG. 5 shows a wait state of an ordinary game, and FIG. 6 shows a state of changing display of symbols by each reel A1 to A9 rotating in a direction from B to A, in an ordinary game. The symbol display unit 7 includes trigger symbols and other kinds of symbols, and while it change displays a plurality of types of symbols column-wise, as above, it stop displays symbols of the change display, based on a result of an interior drawing.

In front of the chassis 2, a medal (the medal may be real money, such as a coin) slot 10, and a medal return button 10*a*, which returns the medal, in a case where the inserted medal is stuck, etc. A start lever 11 is for carrying out starting operation of a rotating display (change display) of the symbol display unit 7.

A game in the gaming machine 1 starts by a player carrying out a BET operation. The BET operation is carried out by credits or by inserting money. As above, a medal or a coin can be used, as having an equivalent value as money. BET operation can be possible by providing a device that receives inserting of bills, and a card reader/writer. After BET operation by a player, when the start lever 11 is operated, the symbol display unit 7 change displays the symbols. After a predetermined time has passed, the symbol display unit 7 sequentially stop displays the change-displayed symbols. The order for stopping may be that every reel stops at once, or the reels may be stopped in an order from reel A1 to A9. In a case of sequentially stopping, the reels can be stopped having a time interval of for example 0.5 seconds. When three or more predetermined symbols are adjacent at this stopped state, a win situation corresponding to that symbol is obtained.

On the lower side of the front panel 3, a medal pay-off opening 15 and a medal receiving tray 16 is provided, and on the upper side of the front panel 3, a game rendition indicator 17, which is driven for • game rendition is provided. The game rendition indicator 17 comprises for example LCD (Liquid Crystal Device) or various types of lamps. In the first embodiment, an embodiment where LCD is adopted is shown. On the upper side of the front panel 3, a bonus game indicator 18 is provided. The bonus game indicator 18 comprises LED (Light Emitting Diode), and displays, a winning state or a win of a feature game or a bonus prize, which provide a high game value to the player, rendition of a game, and error occurrence. A speaker 19 generates audio assist, music, and sound effects, etc.

A plurality of lamps 20 provided on the front panel 3 carries out displays concerning the game, such as display of a win situation line validated in accordance with the inserted number of medals (or number of credits that are BET), and display of a win situation, by turning on, turning off, or blinking the lamps 20. An accumulated metal inserting button 21 is a button for using a predetermined number of medals accumulated (credited) in a not shown medal accumulation device, and an accumulated metal inserting button 22 is a button for using a maximum specified number of medals accumulated in a not shown metal accumulation device. A medal accumulated number display unit 23 displays the number of medals accumulated in the not shown metal accumulation device. A win situation number display unit 24 displays number of times of win situation and number of times left, during a bonus prize of a win situation. A medal pay-off number display unit 25 comprises for example, LED. A pay off button 26 pays off the accumulated medals, and a locking mechanism 27 locks the door, by a rotating direction. A format of the gaming machine 1 and a name of a maker is written on a label 28.

Figure 2:
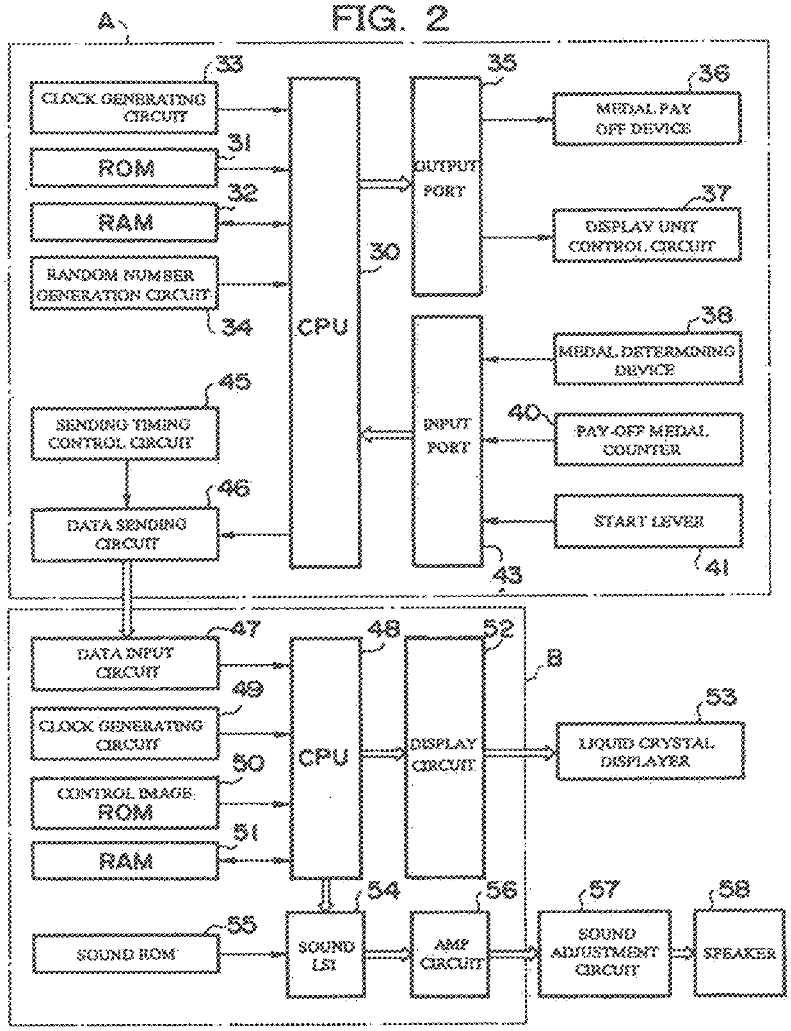
FIG. 2 is a diagram showing the electric structure of the gaming machine according to the first embodiment.

FIG. 2 is a diagram showing an electric structure of the gaming machine according to the first embodiment. As shown in FIG. 2, the gaming machine 1 electrically comprises a main substrate A and a sub substrate B. In the main substrate A, a CPU 30 comprises a ROM 31 and a RAM 32, and carries out control operation in accordance with a pre-set program. Besides a control program for controlling operation of the gaming machine 1, a win group drawing table used for carrying out pre-determination (internal drawing) of win groups, is stored in the ROM 31.

A clock generation circuit 33 which generates a standard clock pulse, and a random number generation circuit 34 which generates a certain number of random numbers, are connected to the CPU 30. The CPU 30, the ROM 31, the RAM 32, and the random number generation circuit 34 structure a drawing control unit. A control signal passed from the CPU 30 is output to a medal pay-off device 36 which carries out pay off of medals, and a display unit control circuit 37 which controls the symbol display unit 7 via an output port 35. The symbol display unit 7 and the display control circuit 37 structure the display unit.

A signal output from a medal determining device 38 which determines adequacy of a medal, a pay off medal counter 40 which counts the number of medals that are to be paid, and a start lever 41 which starts the rotation of the reels, is input to the CPU 30 via an input port 43. The signal output from the CPU 30 is output to the sub substrate B via a data sending circuit 46, receiving control from a sending timing control circuit 45 which controls signal sending timing to the sub substrate B.

In the sub substrate B, the signal output from the data sending circuit 46 is input to a data input circuit 47. The signal input to the data input circuit 47 is processed in a CPU 48. A clock generating circuit 49, a ROM 50 which has recorded various programs and image data, and a RAM 51 are connected to the CPU 48. Data concerning images is output to a liquid crystal displayer 53 via a display circuit 52 which carries out image processing, etc., from the CPU 48. In the liquid crystal displayer 53, characters, still images, and moving images, etc. are displayed. Data concerning sound is output to an amp circuit 56 via a sound LSI 54 which carries out sound processing, etc., from the CPU 48. The sound LSI 54 extracts necessary sound data from a sound ROM 55, and carries out processing of sound data. The sound data that receives processing of amplification, etc., by the amp circuit 56, is output to a speaker 58 via a sound adjustment circuit 57 which carries out adjustment of sound.

Figure 3:
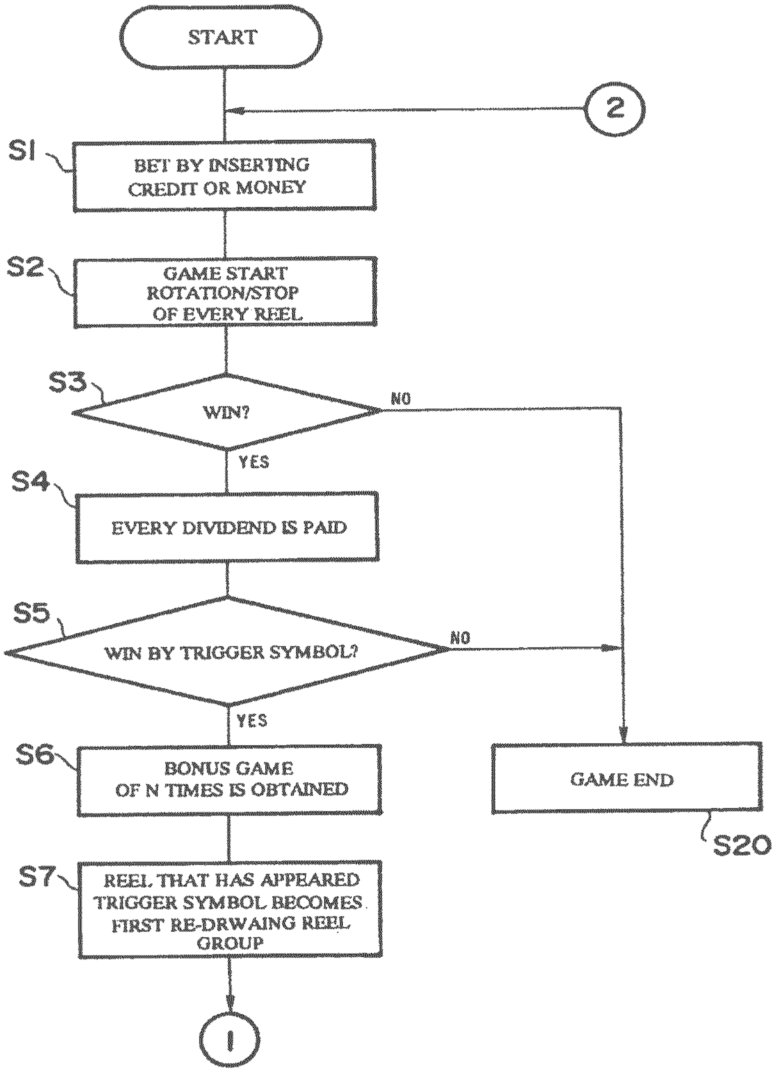
FIG. 3 is a flowchart showing performance of the gaming machine according to the first embodiment.
Figure 4:
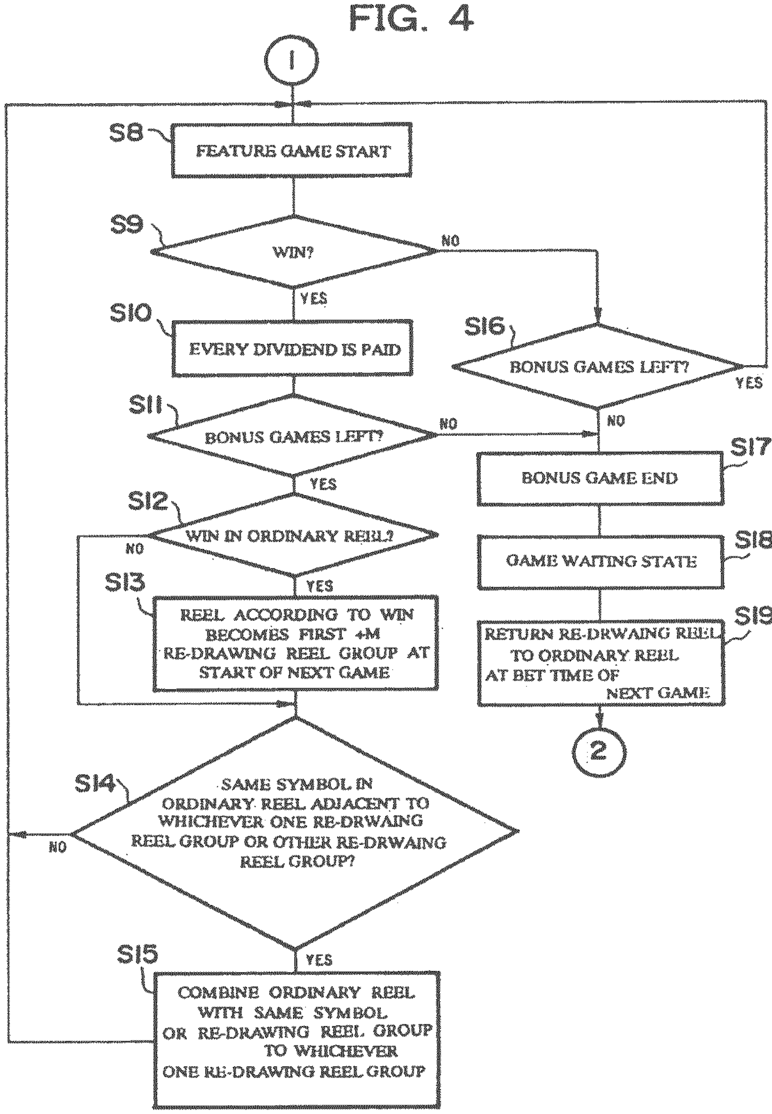
FIG. 4 is a flowchart showing performance of the gaming machine according to the first embodiment.

Performance of the gaming machine according to first embodiment structured as above, will be described with reference to FIGS. 3 to 12. FIGS. 3 and 4 are flowcharts showing main performance of the gaming machine according to the first embodiment, and FIGS. 5 to 12 are diagrams showing screen display examples. In a wait state of an ordinary game, a screen such as shown in FIG. 5 is displayed in the symbol display unit 7. Namely, reels A1 to A9 having a shape of a hexagon, which independently change or stop displays symbols, is displayed in a center part of a screen. Other than the reels A1 to A9, a credit meter which displays number of credits, a BET meter which displays number of BETs, and WON meter which indicates number of medals that are paid off to a player at a time of a win situation. In the first embodiment, as above, a win situation is established when three or more sides of hexagons of same symbols are adjacent, when each reel A1 to A9 stops.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5). In a case where the win situation is not established by the trigger symbol, the game ends (Step S20).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the first embodiment, the number of times of the feature game is five times (Step S6).

Reels A5, A7, and A9 that have displayed trigger symbols when a first feature game is started, are switched to re-drawing reels (Step S7). The reels A5, A7, and A9 that become re-drawing reels are called a “first re-drawing reel group” as one group. Symbol alignment is the same, and synchronously rotates and stops at the same position on the reel in each reel A5, A7, and A9 which structure the re-drawing reel group.

By this, an independent re-drawing result, which differs from the ordinary reel, can be displayed to the re-drawing reel group. Because a plurality of symbols are drawn for the ordinary reels where trigger symbols are not displayed, so that arbitrary symbols are independently displayed, the ordinary reels and the re-drawing reels are respectively independent, and mixed. Namely, re-drawing is not carried out using every region, but a re-drawing result is displayed in the re-drawing reels that are a part of the display regions, and in another one part of the region, the ordinary drawing result is displayed. By this, because two types of regions, the ordinary reels and the re-drawing reels coexist, and display drawing results, a new kind of game which arouses the player's interests, can be realized. Every display region may be a re-drawing reel (specific display region) in accordance with process of the game.

Figure 8:
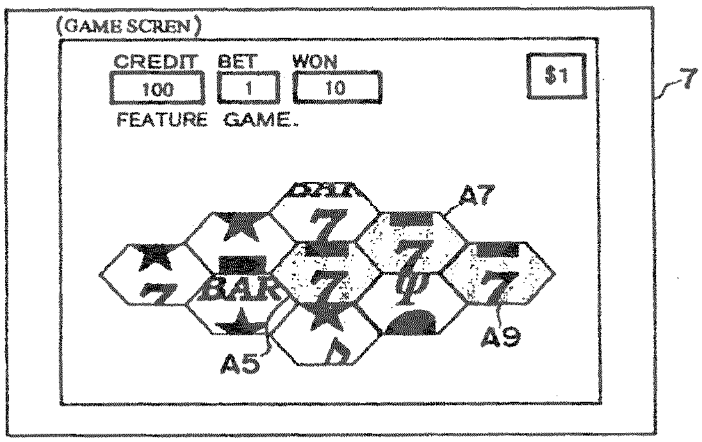
FIG. 8 is a diagram showing a screen display example of the gaming machine according to the first embodiment.
Figure 9:
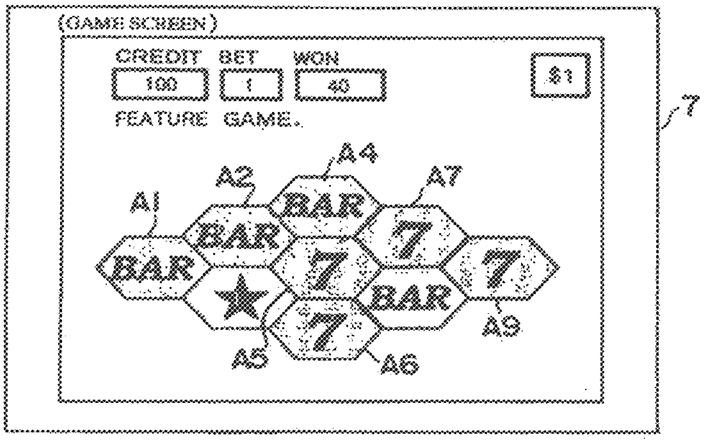
FIG. 9 is a diagram showing a screen display example of the gaming machine according to the first embodiment.

In the flowchart shown in FIG. 4, a feature game (bonus game) is started (Step S8). As shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step S9). In a case where a win situation is not established, the flow forwards to Step S 16, and as shown in FIG. 9, in a case where a win situation is established, every dividend is paid (Step S 10). The dividend at this time is set in accordance with the BET state. In FIG. 9, a win situation is established by the "BAR" symbols matching in adjacent reels A1, A2, and A4. Also, a win situation is established by "7" symbols matching in adjacent reels A6, A5, A7, and A9.

Then, it is determined whether there are any feature games (bonus games) left (Step S 11). In a case where there aren't any feature games left, the flow forwards to Step S17, and in a case where there are feature games left, it is determined whether a win situation is established in the ordinary reels (Step S12). In Step S12, in a case where a win situation is not established in the ordinary reels, the flow forwards to Step S14, and in a case where a win situation is established in the ordinary reels, the reels according to the win situation becomes a first+m$^{th}$ (m is a natural number) re-drawing reel group (Step S 13). In this case, it becomes a second re-drawing reel group.

In this way, during the period of a feature game, in a case where a win situation is established in whichever of the plurality of, ordinary reels, because the ordinary reels involved in the win situation are changed to new reels, independent from the existing reels, each time a win situation is established in the ordinary reels, the number of re-drawing reel groups increases. Because drawing is carried out from a plurality of types of symbols so that the same symbols are respectively stop displayed in each re-drawing reel group, diverse re-drawing can be carried out in each re-drawing reel group. As a result, a strong impression is provided to the players, and is possible to arouse the player's interests.

Then, it is determined whether there are any same symbols in whichever one of the re-drawing reel groups and an adjacent ordinary reel, or in another re-drawing reel group (Step S14). In a case where there isn't this kind of symbol, the flow forwards to Step S8, and in a case where there is this kind of symbol, the ordinary reel or the re-drawing reel group that has displayed the same symbols is combined to one re-drawing reel group (Step S 15). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

In this way, in a case where a symbol displayed in whichever ordinary reel is the same symbol as the symbol displayed in the re-drawing reel group, because the ordinary reel is changed to a re-drawing reel and is combined to the existing re-drawing reel group, in a predetermined number of feature games after the next time, the number of reels that structure the re-drawing reel group increases. Then, because a drawing from a plurality of types of symbols is carried out so that a same symbol is stop displayed in every re-drawing reel group, the same symbol is stop displayed in the entire re-drawing reel group. By this, diverse re-drawing can be carried out in the specific display region, a strong impression is provided to the player, and it is possible to arouse the player's interest.

Figure 10:
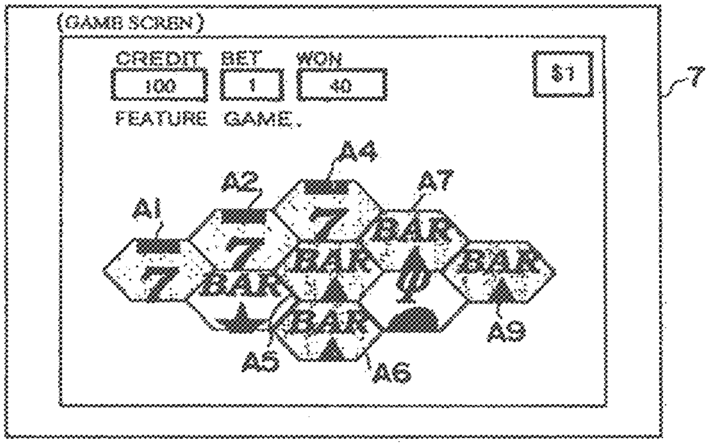
FIG. 10 is a diagram showing a screen display example of the gaming machine according to the first embodiment.
Figure 11:
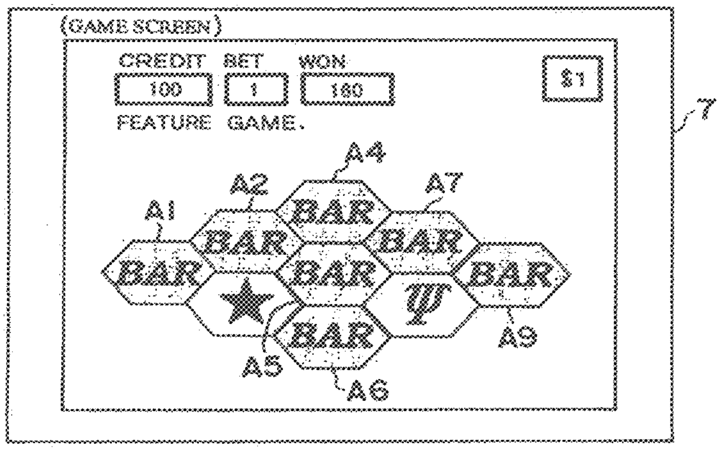
FIG. 11 is a diagram showing a screen display example of the gaming machine according to the first embodiment.

Next, the flow returns to Step S8, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step S9). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step S 10), and it is determined whether there are any feature games (bonus games) left (Step S11). In a case where a feature game is left, it is determined whether a win situation is established, and when a win situation is not established, the flow forwards to Step S14, and when a win situation is established in the ordinary reels, the reels according to the win situation becomes a first+m$^{th}$ (m is a natural number) re-drawing reel group (Step S 13). The case shown in FIG. 11, is a situation where a win situation is not established in the ordinary reels.

Then, it is determined whether there are any same symbols in whichever one of the re-drawing reel groups and an adjacent ordinary reels, or in another re-drawing reel group (Step S14). For example, in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group) (Step S15). Namely, as shown in FIG. 11, reels (A1, A2, A4, A5, A6, A7, and A9) structure a new re-drawing reel group.

Figure 12:
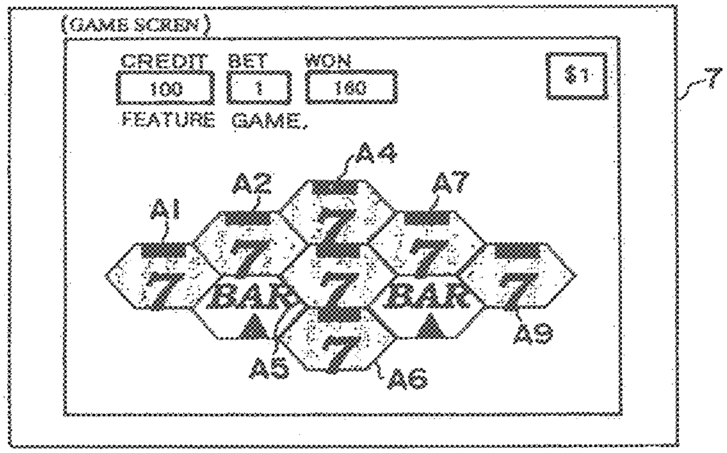
FIG. 12 is a diagram showing a screen display example of the gaming machine according to the first embodiment.

In the next game, as shown in FIG. 12, a new re-drawing reel group (A1, A2, A4, A5, A6, A7, and A9) and the ordinary reels (A3 and A8) respectively rotate independently.

In this way, in a case where the symbols displayed in each re-drawing reel group are the same, the re-drawing reel groups combine, and becomes one re-drawing reel group, and displays the same symbol. By this, diverse re-drawing can be carried out in the re-drawing reel. For example, by raising the odds, accompanying the increase in number of the re-drawing reels, the player's interests can be aroused.

As the above, a third to fifth feature game is carried out. Namely, in Step S9, in a case where a win situation is not established, it is determined whether a feature game (bonus game) is left (Step S 16), and in a case where there is a feature game (bonus game) left, the flow forwards to Step S8. On the other hand, in Step S16, in a case where there isn't a feature game (bonus game) left, the flow forwards to Step S17. In Step S11, in a case where there isn't a feature game (bonus game) left, the feature game (bonus game) ends (Step S17), and moves to a game waiting state (Step S18). At the BET time of the next game, the re-drawing reel is retuned to an ordinary reel (Step S19). From the next game, an ordinary game is carried out once again.

Second Embodiment

Figure 15:
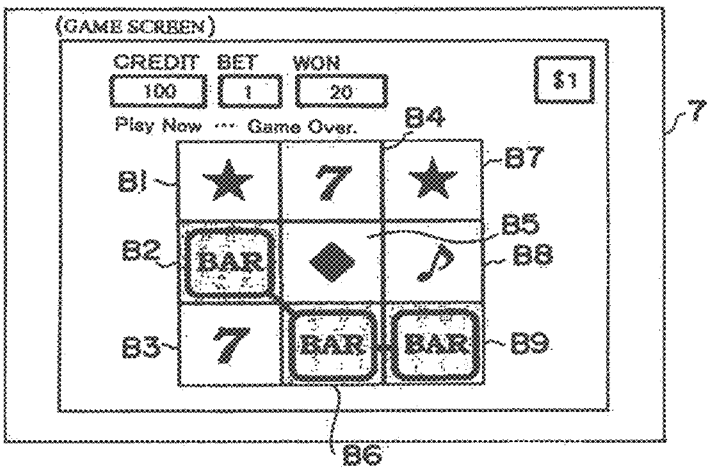
FIG. 15 is a diagram showing a screen display example of the gaming machine according to the second embodiment.

In the second embodiment, a symbol display unit 7 displays a screen, such as shown in FIG. 15. Namely, as shown in FIG. 15, in an ordinary game, nine independent reels B1 to B9 having a quadrangle shape, wherein alignment of symbols each differ, are displayed. The reels B1 to B9 structure a display region. In the second embodiment, if a same symbol is adjacent in three or more sides or corners of the reels B1 to B9, when each reel stops, it is a win. Hardware structure of the gaming machine according to the second embodiment, is the same as that of the first embodiment.

Figure 13:
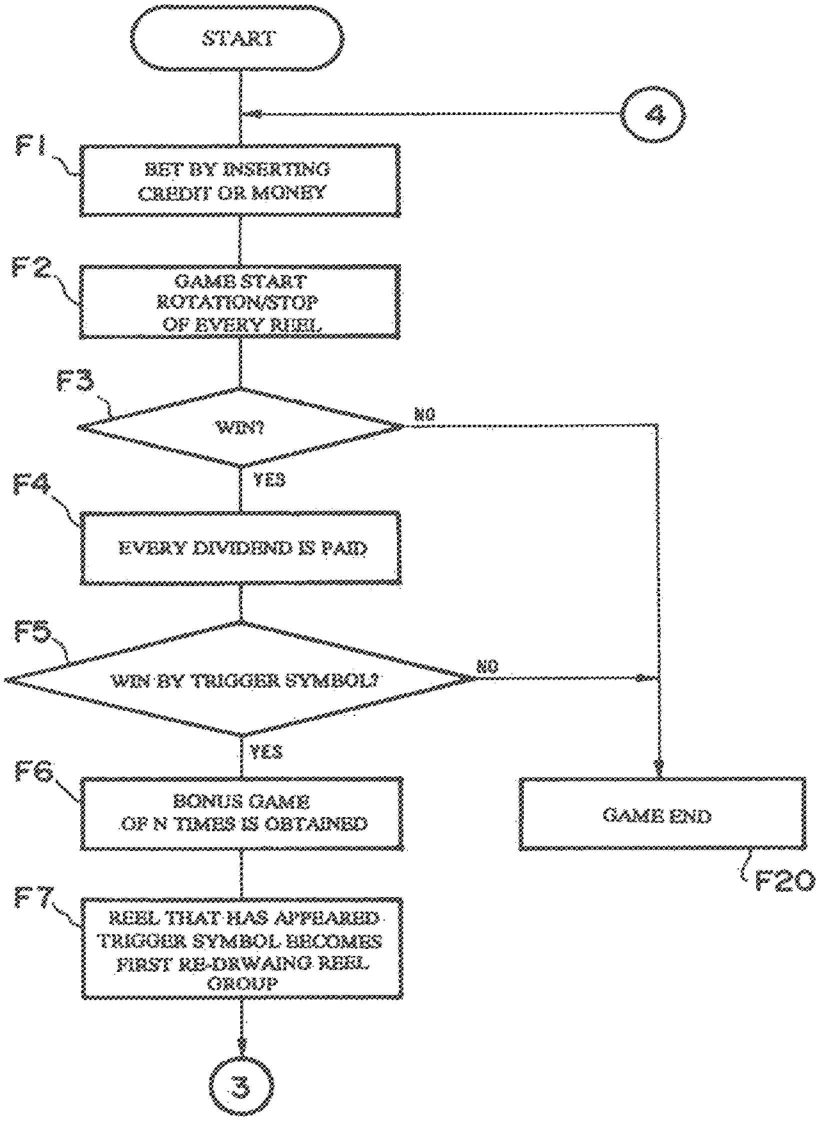
FIG. 13 is a flowchart showing performance of a gaming machine according to a second embodiment.

Performance of the gaming machine according to the second embodiment, will be described with reference to FIGS. 13 and 14. In the flowchart shown in FIG. 13, when a player inserts credits or money (these can be medals, coins, or cards), and carries out BET operation (STEP F1), a game is started (Step F2). At the same time as start of the game, each reel B1 to B9 rotates, and change displays symbols. Each reel B1 to B9 stops at predetermined timing, after a predetermined time has passed after starting rotation.

Then, it is determined whether a win situation is established or not (Step F3). In a case where a win situation is not established, the game ends (Step F20), and in a case where a win situation is established, every dividend corresponding to that win is paid (Step F4). The dividend at this time, is determined in accordance with the BET situation. For example, as shown in FIG. 15, in a case where a symbol "BAR" is adjacent in three reels B2, B6, and B9, a win situation is established by the "BAR".

Figure 16:
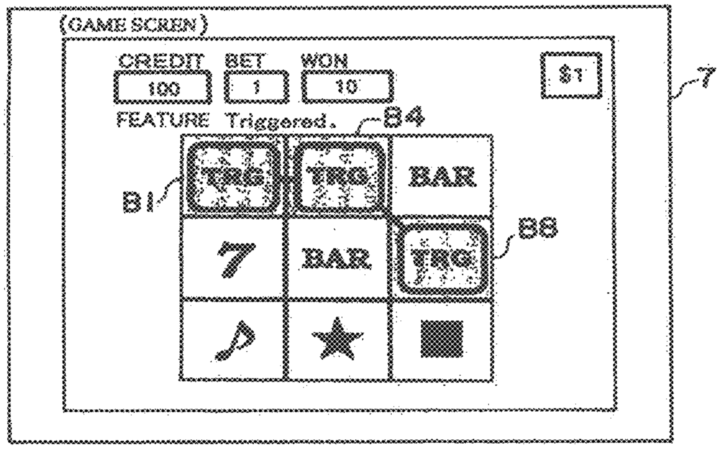
FIG. 16 is a diagram showing a screen display example of the gaming machine according to the second embodiment.

Then, it is determined whether the win is a win situation established by the trigger symbol (Step F5). In a case where the win situation is not established by the trigger symbol, the game ends (Step F20). On the other hand, as shown in FIG. 16, in a case where a win situation is established by three or more trigger symbols "TRG" being adjacent in reels B 1, B4, and B8, dividend is provided to the player, and a feature game as a bonus game starts.

Namely, the feature game is carried out in a case where a win situation is established by three ore more trigger symbols being adjacent. In the second embodiment, the number of times of the feature game is five times (Step F6). When the first free game is started, reels B1, B4, and B8 that have trigger symbols displayed, is switched to re-drawing reels (Step F7). The reels B1, B4, and B8 that become re-drawing reels are called a "first re-drawing reel group" as one group. In the same way as the first embodiment, symbol alignment is the same, and synchronously rotates and stops at the same position on the reel in each reel B1, B4, and B8 which structure the re-drawing reel group.

Figure 14:
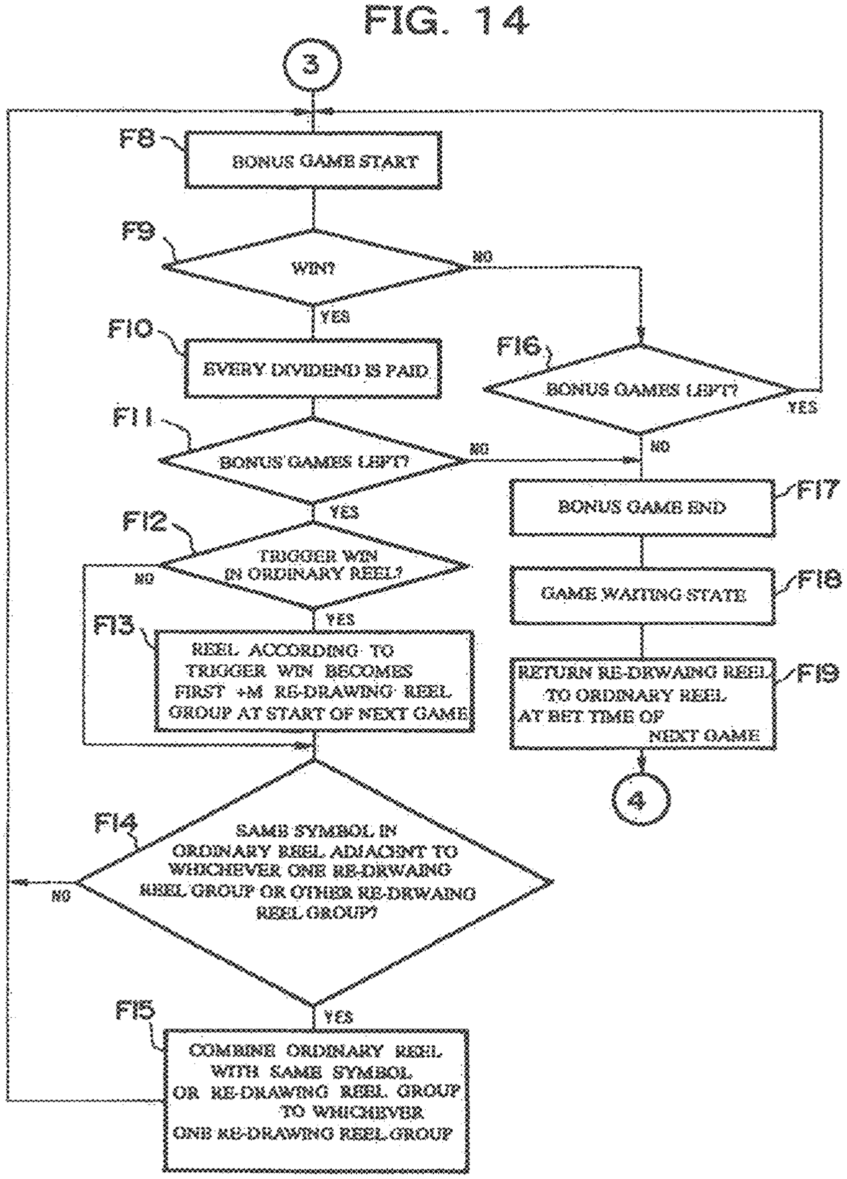
FIG. 14 is a flowchart showing performance of the gaming machine according to the second embodiment.
Figure 17:
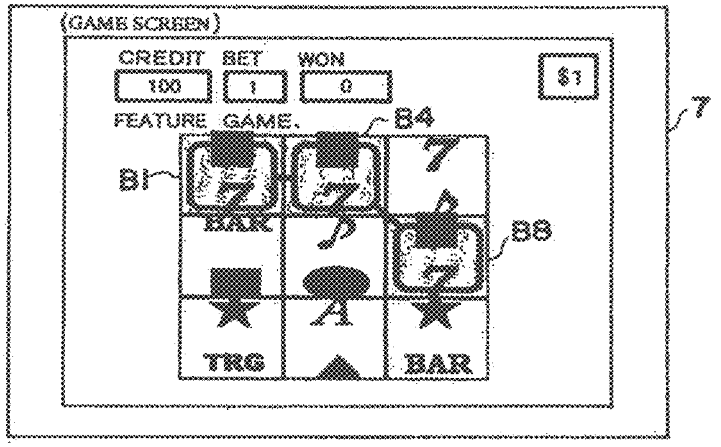
FIG. 17 is a diagram showing a screen display example of the gaming machine according to the second embodiment.
Figure 18:
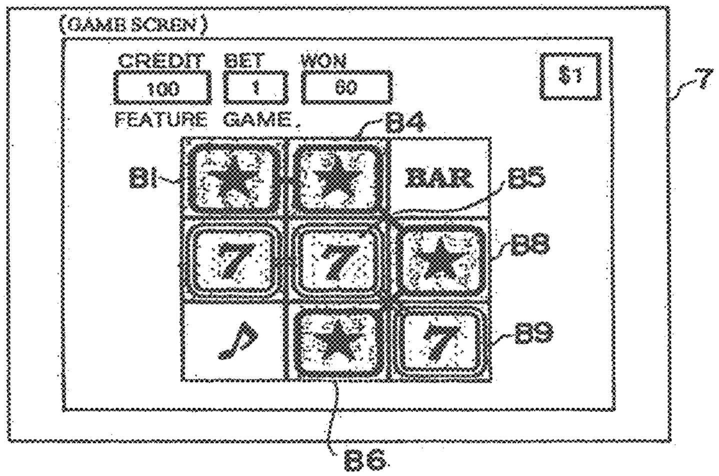
FIG. 18 is a diagram showing a screen display example of the gaming machine according to the second embodiment.

In the flowchart shown in FIG. 14, a feature game (bonus game) is started (Step F8). As shown in FIG. 17, the first re-drawing reel group (B1, B4, and B8) and other ordinary reels rotate in a direction from B to A in the drawings, but the first re-drawing reel group (B 1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step F9). In a case where a win situation is not established, the flow forwards to Step F16, and as shown in FIG. 18, in a case where a win situation is established, every dividend is paid (Step F10). The dividend at this time is set in accordance with the BET state.

For example, in FIG. 18, because four "0" symbols are displayed in the first re-drawing reel group (B1, B4, and B8) and the adjacent reel B6, a win situation by four same symbols being adjacent, is established. In the ordinary reels (B2, B5, and B9), a win situation is established by three "7" symbols being adjacent.

Then, it is determined whether there are any feature games (bonus games) left (Step F1 1). In a case where there aren't any feature games left, the flow forwards to Step F17, and in a case where there are feature games left, it is determined whether a win situation is established in the ordinary reels by a trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first+m$^{th}$ (m is a natural number) re-drawing reel group (Step F13).

Then, it is determined whether there are any same symbols in whichever one of the re-drawing reel groups and an adjacent ordinary reel, or in another re-drawing reel group (Step F14). In a case where there isn't these kinds of symbols, the flow forwards to Step F8, and in a case where there are theses kind of symbols, the ordinary reel or the re-drawing reel group that has displayed the same symbols is combined to one re-drawing reel group (Step F15).

For example, in FIG. 18, because the same symbol "0" as displayed in the first re-drawing reel group (B1, B4, and B8) is displayed in reel B6, which is adjacent to the first re-drawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating. On the other hand, in FIG. 18, a win situation is established by three "7" symbols being adjacent. However, because it is not a win situation by the trigger symbol, these ordinary reels (B2, B5, B9) do not change to re-drawing reels.

Figure 19:
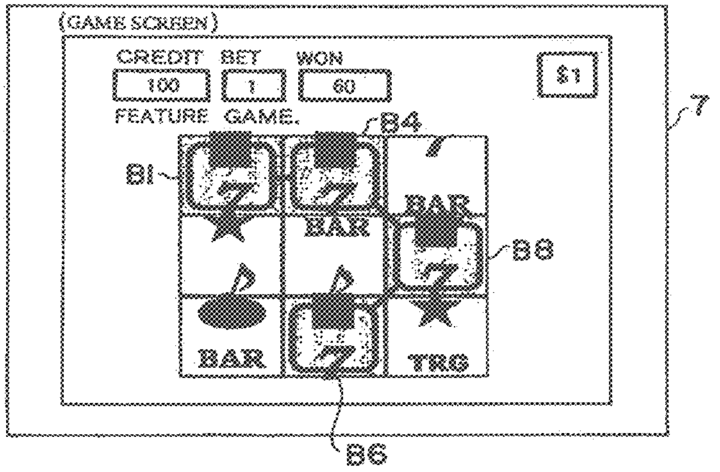
FIG. 19 is a diagram showing a screen display example of the gaming machine according to the second embodiment.
Figure 20:
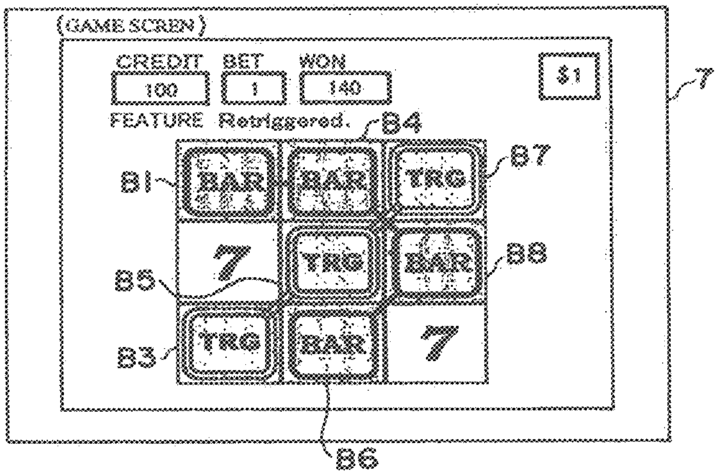
FIG. 20 is a diagram showing a screen display example of the gaming machine according to the second embodiment.

Next, the flow returns to Step F8, and a second feature game (bonus game) is carried out. Here, as shown in FIG. 19, the first re-drawing reel group (B1, B4, B6, and B8) that has the number of reels increased, and the other ordinary reels (B2, B3, B5, B7, and B9) respectively rotate independently. When every ordinary reel and re-drawing reel stops, it is determined whether a win situation is established or not (Step F9). For example, as shown in FIG. 20, in a case where a win situation is established in the first re-drawing reel group (B1, B4, B6, and B8), by a "BAR" symbol matching, and a win situation is established in the ordinary reels (B3, B5, and B7) by the "BAR" symbol matching, dividend is paid (Step F10), and it is determined whether there are any feature games (bonus games) left (Step F1 1). In a case where a feature game is left, it is determined whether a win situation is established by the trigger symbol, and when a win situation is not established, the flow forwards to Step F14, and when a win situation is established in the ordinary reels by the trigger symbol, the reels according to the win situation becomes a first+'nth (m is a natural number) re-drawing reel group (Step F13). Here, because a win situation is established in the ordinary reels (B3, B5, and B7) by the trigger symbol, a second re-drawing reel is structured by these reels (B3, B5, and B7).

In this way, during the period of a feature game, in a case where a win situation is established in whichever of the plurality of ordinary reels, by the trigger symbol being displayed, because the ordinary reels involved in the win situation are changed to independent reels other than the existing re-drawing reels, each time a win situation is established in the ordinary reels by the trigger symbol, the number of re-drawing reel groups increases. Because drawing is carried out from a plurality of types of symbols so that the same symbols are respectively stop displayed in each re-drawing reel group, the same symbol is respectively stop displayed in the re-drawing reel groups. By this, diverse re-drawing can be carried out in each-re-drawing reel group. As a result, a strong impression is provided to the players, and it is possible to arouse the player's interests.

Figure 21:
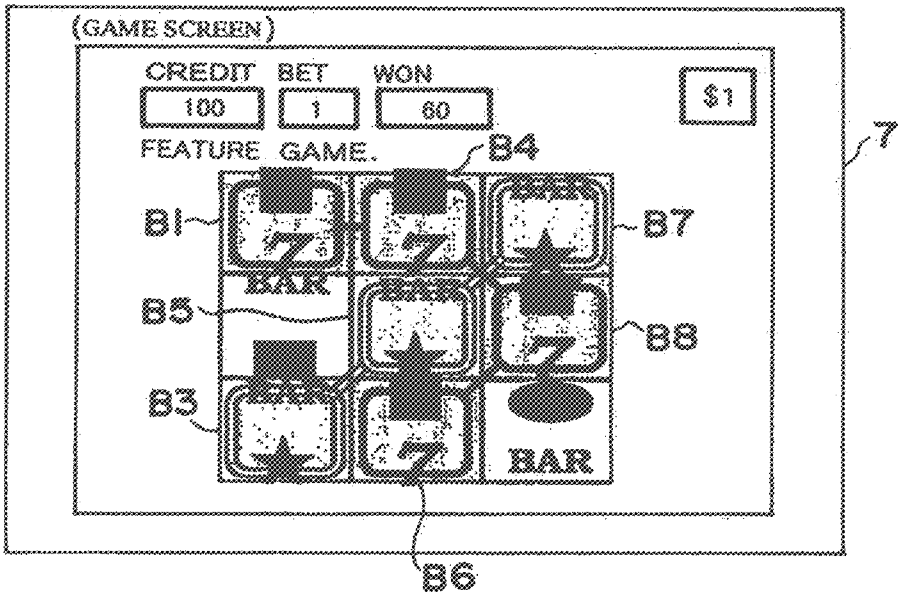
FIG. 21 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). In a case where there isn't this kind of symbol, the flow forwards to Step F8, and in a case where there is this kind of symbol, as above, the symbols are combined to the re-drawing reel group (Step F15). In the case shown in FIG. 20, this kind of symbol does not exist Next, in the third feature game, as shown in FIG. 21, the first re-drawing reel group (B1, B4, B6, and B8), the second re-drawing reel group (B3, B5, and B7), and the ordinary reels (B2, and B9) respectively rotate independently (Step F8).

When every ordinary reel and re-drawing reel stops, it is determined whether a win situation is established or not (Step F9). In a case where there is no win situation, the flow forwards to Step F16, and in a case where a win situation is established, every dividend is paid (Step F10). The dividend at this time is set in accordance with the BET state. Then, it is determined whether there are any feature games (bonus-games) left (Step F1 1). In a case where there aren't any feature games left, the flow forwards to Step F17, and in a case where there are feature games left, it is determined whether a win situation is established in the ordinary reels by the trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first+m$^{th}$ (m is a natural number) re-drawing reel group (Step F13).

Figure 22:
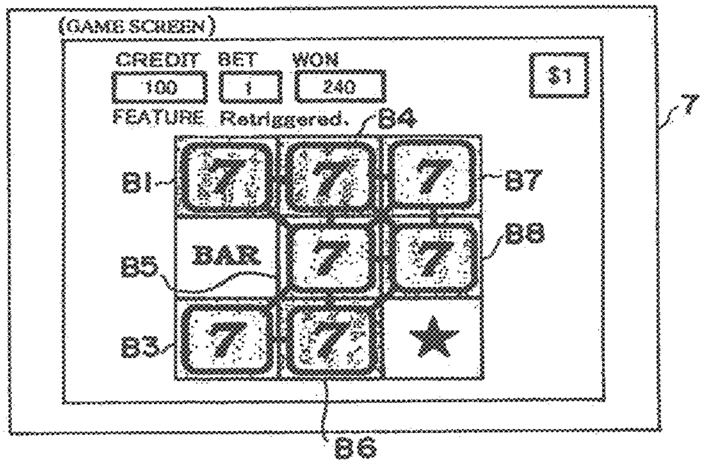
FIG. 22 is a diagram showing a screen display example of the gaming machine according to the second embodiment.
Figure 23:
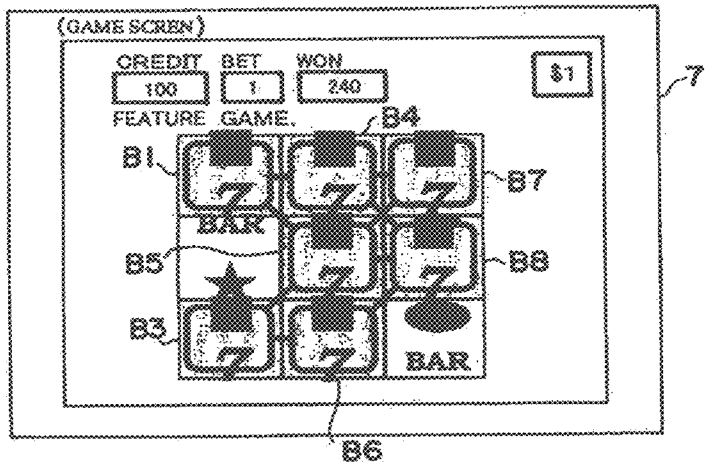
FIG. 23 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). As shown in FIG. 22, when a same symbol "7" is displayed in the first re-drawing reel group (B1, B4, B6, and B8), and the second re-drawing reel group (B3, B5, and B7), the first and the second re-drawing reel group combines, and generates one re-drawing reel group. In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step F9, in a case where a win situation is not established, it is determined whether a feature game (bonus game) is left, and in a case where there is a feature game (bonus game) left, the flow forwards to Step F8, and games are carried out until the number of feature games reaches a predetermined number (five times). In a case where there isn't a feature game (bonus game) left. In step S11, in a case where there isn't a feature game (bonus game) left, the feature game (bonus game) ends (Step F17), and moves to a game waiting state (Step F18). At the BET time of the next game, the re-drawing reel is retuned to an ordinary reel (Step F19). From the next game, an ordinary game is carried out once again.

In this way, in a case where the symbols displayed in each re-drawing reel group are the same, the re-drawing reel groups combine, and become one re-drawing reel group, and displays the same symbol. By this diverse re-drawing can be carried out in the re-drawing reel. For example, by raising the odds, accompanying the increase in number of the re-drawing reels, the player's interests can be aroused.

Third Embodiment

In the third embodiment, a win situation is established, in a case where three or more same symbols are adjacent in an ordinary game. In a case where a win situation is established by three trigger symbols being adjacent, feature games (bonus games) are carried out five games, after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. During the period of the feature game, a win situation by the trigger symbol, does not occur. The hardware structure of the gaming machine according to the third embodiment, can be structured in the same way as the first embodiment.

The performance of the gaming machine according to the third embodiment, will be described with reference to the flowcharts of FIGS. 24 and 25. In a waiting state of an ordinary game, a screen such as shown in FIG. 5 is displayed. Namely, reels A1 to A9 that have hexagon shapes, and which independently change or stop displays a symbol, is displayed in the center part of the screen. Other than that, a credit meter which displays number of credits, a BET meter which displays number of BETs, and WON meter which indicates the number of medals to be paid to a user, at a win situation are displayed. In the third embodiment, as above, a win situation is established when three or more sides of hexagons of a same symbol are adjacent, when each reel A1 to A9 stops.

Figure 24:
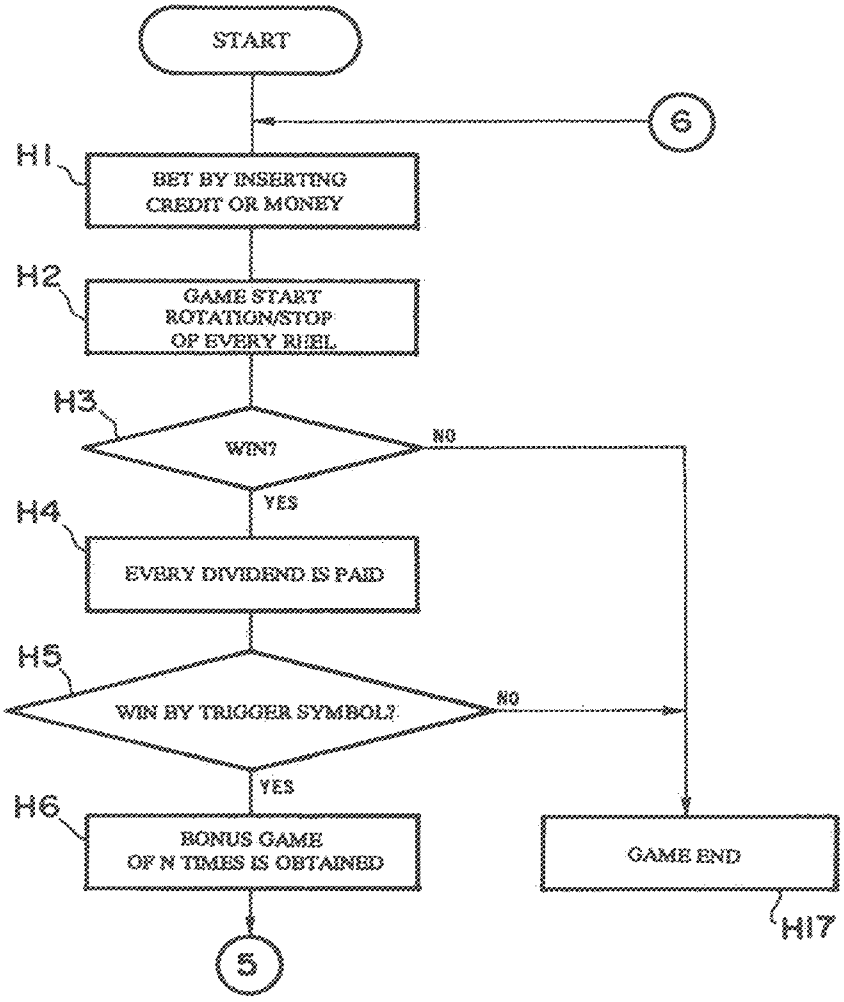
FIG. 24 is a flowchart showing performance of a gaming machine according to a third embodiment.

In the flowchart shown in FIG. 24, when a player inserts credits or money (these can be medals, coins, or cards), and carries out BET operation (STEP H1), a game is started (Step H2). At the same time as start of the game, as shown in FIG. 6, each reel A1 to A9 rotates in a direction from B to A in FIG. 6, and change displays symbols. Here, symbol alignment and rotating timing of each reel A1 to A9 differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 24, it is determined whether a win situation is established or not (Step H3). In a case where a win situation is not established, the game ends (Step H17), and in a case where a win situation is established, every dividend corresponding to that win is paid (Step H4). The dividend at this time, is determined based on the BET situation. Then, it is determined whether the win is a win situation established by the trigger symbol (Step H5). In a case where the win situation is not established by the trigger symbol, the game ends (Step H17).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the third embodiment, as above, the number of times of the feature game is five times (Step H6).

Figure 25:
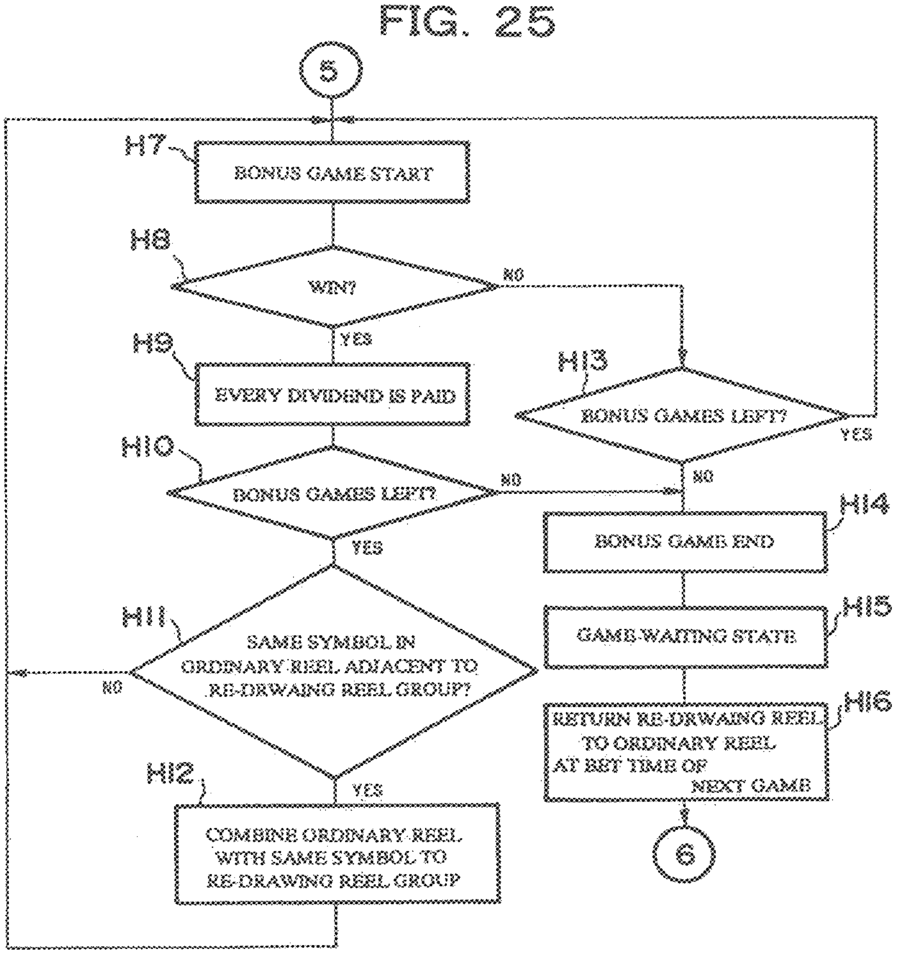
FIG. 25 is a flowchart showing performance of the gaming machine according to the third embodiment.

In the flowchart shown in FIG. 25, when a first feature game (bonus game) is started (Step H7), reels A5, A7, and A9 that have displayed trigger symbols, are switched to re-drawing reels. The reels A5, A7, and A9 that become re-drawing reels are called a "re-drawing reel group" as one group. Each reel A5, A7, and A9 that structures the re-drawing reel group have the same symbol alignment, and synchronously rotates and stops at the same position on the reel. For example, as shown in FIG. 8, the re-drawing reel group (A5, A7, A9) synchronously rotates, and the other reels independently rotate randomly. When rotation of every ordinary reel and re-drawing reel group stops, it is determined whether a win situation is established (Step H8). In a case where a win situation is not established, the flow forwards to Step H13, and as shown in FIG. 9, in a case where a win situation is established, every dividend is paid (Step H9). The dividend at this time is determined in accordance with the BET state. In FIG. 9, a win situation is established by "BAR" symbols matching in adjacent reels A1, A2, and A4. Also, a win situation is established in adjacent reels A6, A5, A7, and A9, by "7" symbols matching.

In the fourth embodiment, in a case where a win situation is established by three trigger symbols being adjacent, feature games (bonus games) are carried out five games after that game. At the starting time of these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. In a case where a plurality of re-drawing reels exist, when a same symbol is displayed in adjacent re-drawing groups, the re-drawing groups are combined, and become one re-drawing reel group. Further, in the fourth embodiment, differing from the third embodiment, a win situation is established by a trigger symbol, during the period of the feature game, and the number of feature games is added by that win. Namely, every time a win situation is established by the trigger symbol, during the period of the feature game, the number of feature games increase. In the feature game, in a case where a win situation is established in an ordinary reel by the trigger symbol, the ordinary reel according to that win, is switched to an independent re-drawing reel, which differs from the existing re-drawing reels. The hardware structure of the gaming machine according to the fourth embodiment, can be structured in the same way as the second embodiment.

Next, performance of the gaming machine according to the fourth embodiment will be described with reference to the flowcharts of FIG. 26 and FIG. 27. In the flowchart shown in FIG. 26, a feature game (bonus game) is started (Step T3). As shown in FIG. 17, the first re-drawing reel group (B1, B4, and B8) and other ordinary reels rotate in a direction from B to A in the drawings, but the first re-drawing reel group (B1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step T4). In a case where a win situation is not established, the flow forwards to Step T13, and as shown in FIG. 18, in a case where a win situation is established, every dividend is paid (Step T5). The dividend at this time is set in accordance with the BET state. Here, for example, in FIG. 18, because four "0" symbols are displayed in the first re-drawing reel group (B1, B4, and B8) and the adjacent reel B6, a win situation by four same symbols being adjacent, is established. In the ordinary reels (B2, B5, and B9), a win situation is established by three "7" symbols being adjacent.

Then, it is determined whether there are any feature games (bonus games) left (Step T6). In a case where there aren't any feature games left, and a win situation by the trigger symbol is not established, the flow forwards to Step T14, and in a case where there are feature games left, or a win situation by the trigger symbol is established, it is determined whether there are any same symbols in whichever one of the re-drawing reel groups and an adjacent ordinary reels (Step T7). In a case where there isn't this kind of symbol, the flow forwards to Step T9, and in a case where there is this kind of symbol, the ordinary reel that has displayed the same symbols is combined to the re-drawing reels (Step T8).

For example, in FIG. 18, because the same symbol "0" as displayed in the first re-drawing reel group (B1, B4, and B8) is displayed in reel B6, which is adjacent to the first re-drawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating.

Then, it is determined whether the symbols in adjacent re-drawing reel groups are the same or not (Step T9). In a case where the symbols are not the same in the adjacent re-drawing reel groups, the flow forwards to Step T11, and in a case where the symbols are the same in the adjacent re-drawing reel groups, the re-drawing groups that have displayed the same symbol, are combined to one re-drawing reel group (Step T10).

Next, it is determined whether a win situation is established by the trigger symbol (Step T12). In a case where a win situation is not established by the trigger symbol, the flow forwards to step T3, and in a case where a win situation is established by the trigger symbol, a feature game (bonus game) of an addition of n times is added to the player. The number of additional games can be for example, five times.

Figure 26:
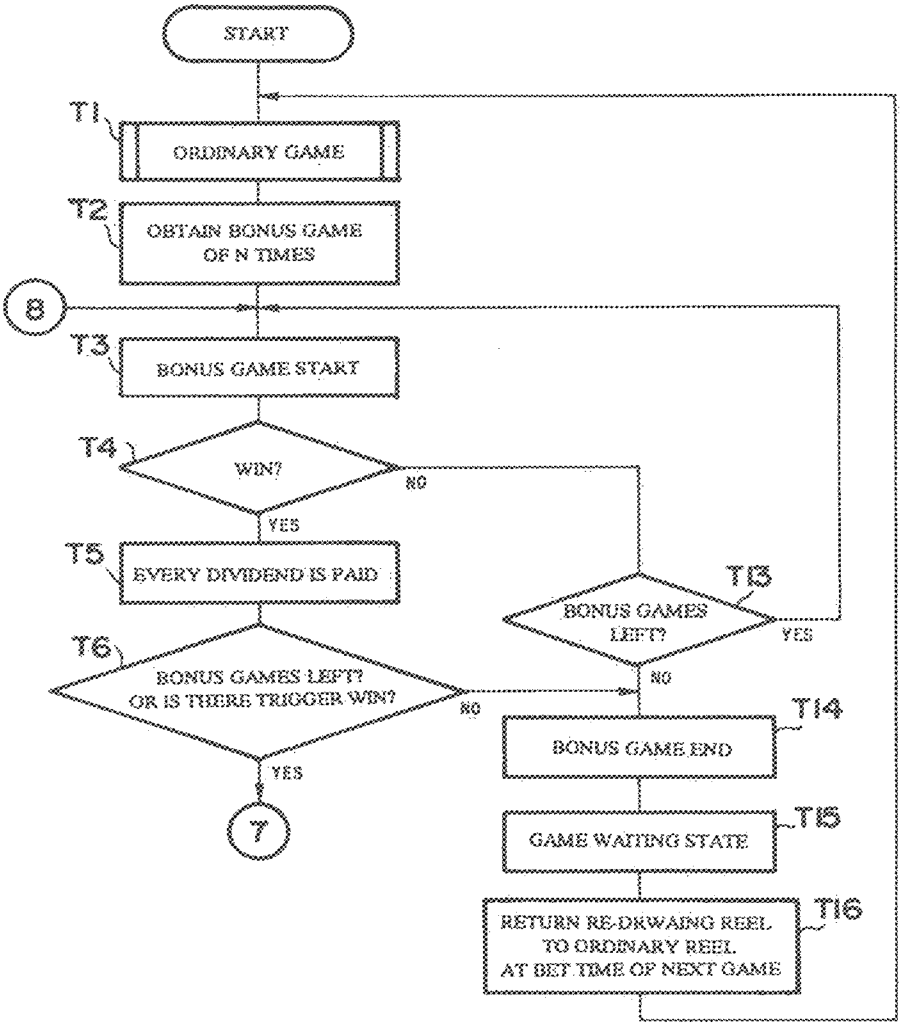
FIG. 26 is a flowchart showing performance of a gaming machine according to a fourth embodiment.
Figure 27:
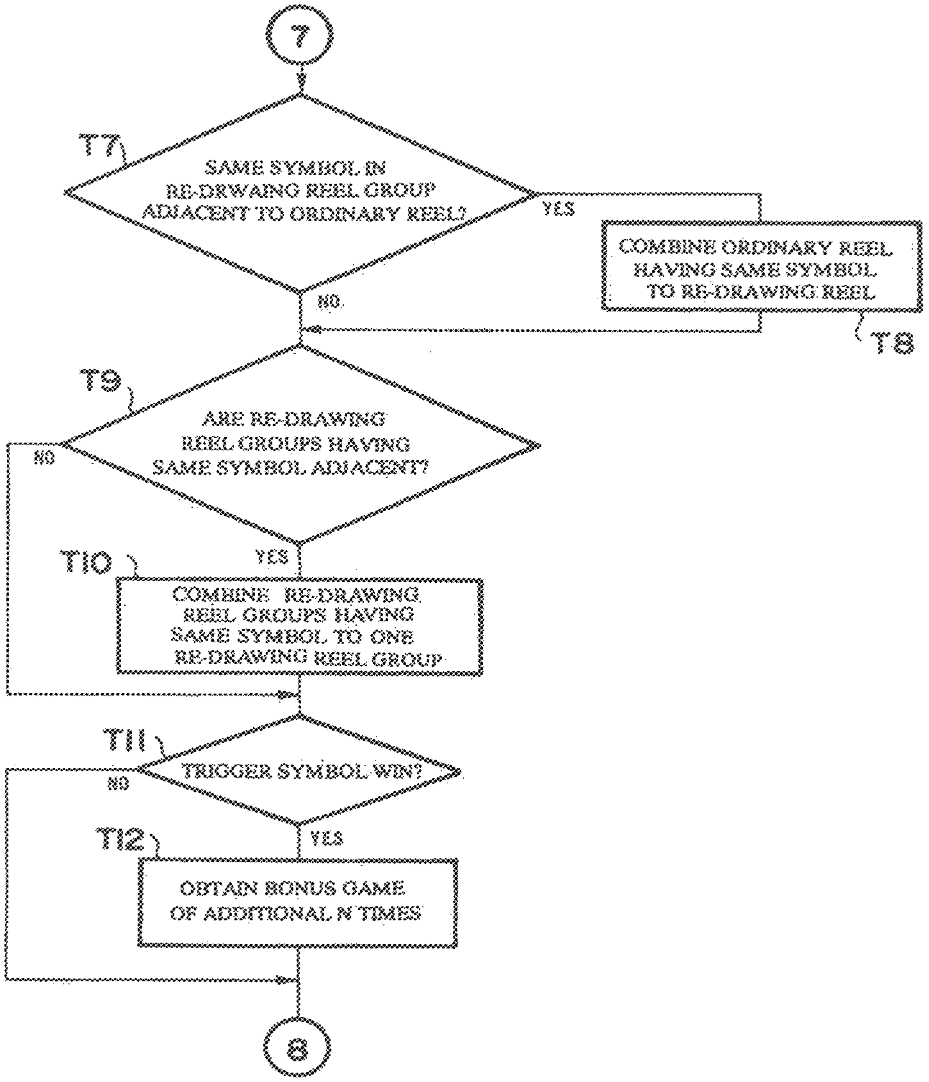
FIG. 27 is a flowchart showing performance of the gaming machine according to the fourth embodiment.

The flow returns to Step T3 in FIG. 26, and a second feature game (bonus game) is carried out. Here, as shown in FIG. 19, the first re-drawing reel group (B1, B4, B7, and B9) that has the number of reels increased, and the other ordinary reels (B2, B3, B5, B7, and B9) respectively rotate independently. When every ordinary reel and re-drawing reel stops, it is determined whether a win situation is established or not (Step T4). For example, as shown in FIG. 20, in a case where a win situation is established in the first re-drawing reel group (B 1, B4, B6, and B8), by a "BAR" symbol matching, and a win situation is established in the ordinary reels (B3, B5, and B7) by the "BAR" symbol matching, dividend is paid (Step T5), and it is determined whether there are any feature games (bonus games) left, or whether there is a win situation by the trigger symbol (Step T6). In a case where a feature game is left, or in a case where there is a win situation by the trigger symbol, it is determined whether there is a same symbol in the ordinary reels adjacent to the re-drawing reel group (Step T7).

In Step T7, in a case where there isn't a same symbol in the ordinary reels adjacent to the re-drawing reel group, the flow forwards to Step T9, and in a case where there is a same symbol in an ordinary reel adjacent to the re-drawing reel group, the ordinary reel that has displayed the same symbol, is combined to the re-drawing reel group (Step T8). Then, it is determined whether re-drawing reel groups that have the same symbol are adjacent or not (Step T9). In a case where there are no adjacent re-drawing reel groups, the flow forwards to step T11. On the other hand, in a case where there are adjacent re-drawing reel groups, the re-drawing reel groups are combined to one re-drawing reel group (Step T10).

It is determined whether a win situation is established by the trigger symbol (Step T12). In a case where a win situation is not established by the trigger symbol, the flow forwards to Step T3, and in a case where a win situation is established by the trigger symbol, the player obtains feature games (bonus games) of an additional n times (Step T12). For example, in FIG. 20, because a win situation is established in the ordinary reels (B3, B5, B7), by the trigger symbol, a second re-drawing reel group is structured by reels B3, B5, and B7.

In a third feature game, as shown in FIG. 21, the first re-drawing reel group (B 1, B4, 30 B6, and B8), the second re-drawing reel group (B3, B5, and B7), and the ordinary reels (B2 and B9) respectively rotate independently (Step F8).

When rotation of every reel stops, it is determined whether there-is a win situation or not (Step F9). In a case where a win situation is not established, the flow forwards to Step T13, and in a case where a win situation is established, every dividend corresponding to that win is paid (Step F5). The dividend at this time, is determined based on the BET situation. Then, it is determined whether there are any feature games (bonus games) left, or whether a win situation is established by the trigger symbol (Step T6). In a case where there aren't any feature games (bonus games) left and a win situation is not established by the trigger symbol, the flow forwards to Step T14. On the other hand, in a case where feature games (bonus games) are left, or a win situation is established by a trigger symbol, it is determined whether there is a same symbol in the ordinary reels adjacent to the re-drawing reel (Step T7). In a case where there isn't a same symbol in the ordinary reels adjacent to the re-drawing reel group, the flow forwards to Step T9, and in a case where there is a same symbol in an ordinary reel adjacent to the re-drawing reel group, the ordinary reel is combined to the re-drawing reel group (Step T8). Then, it is determined whether a same symbol is displayed in adjacent re-drawing reel groups (Step T10). As shown in FIG. 22, when a same symbol "7" is displayed in the first re-drawing reel group (B1, B4, B6, and B8), and the second re-drawing reel group (B3, B5, and B7), the first and the second re-drawing reel group combines, and one re-drawing reel group is generated. Next, it is determined whether a win situation is established by the trigger symbol (Step Ti), and in a case where a win situation is not established by the trigger symbol, the flow forwards to Step T3, and in a case where a win situation is established by the trigger symbol, bonus games of an additional n times is provided to the player (Step T12). Then, the flow forwards to Step T3.

In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step T4, in a case where a win situation is not established, it is determined whether a feature game (bonus game) is left (Step T13), and in a case where there is a feature game (bonus game) left, the flow forwards to Step T3, and games are carried out until the number of feature games reaches a predetermined number. In a case where there isn't a feature game (bonus game) left, the flow forwards to Step T14. In Step T6, in a case where there isn't a feature game (bonus game) left, and there isn't a win situation by the trigger symbol, the feature game (bonus game) ends (Step T14), and moves to a game waiting state (Step T15). At the BET time of the next game, the re-drawing reel is retuned to-an ordinary reel (Step T16). From the next game, an ordinary game is carried out once again.

Fifth Embodiment

In the fifth embodiment, a win situation is established, in a case where three or more same symbols are adjacent in an ordinary game. In a case where a win situation is established by three trigger symbols being adjacent, feature games (bonus games) are carried out five games after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increases. In a case where a plurality of re-drawing reels exist, when a same symbol is displayed in adjacent re-drawing groups, the re-drawing groups are combined, and becomes one re-drawing reel group. During the period of the feature game, a win situation by the trigger symbol, does not occur. The hardware structure of the gaming machine according to the fifth embodiment, can be structured in the same way as the first embodiment.

The performance of the gaming machine according to the third embodiment, will be described with reference to the flowcharts of FIGS. 28 and 29. In a waiting state of an ordinary game, a screen such as shown in FIG. 5 is displayed in the symbol display unit 7. Namely, reels A1 to A9 that have hexagon shapes, and which independently change or stop displays a symbol, is displayed in the center part of the screen. Other than that, a credit meter which displays number of credits, a BET meter which displays number of BETs, and a WON meter which indicates the number of medals to be paid to a user, at a win situation. In the fifth embodiment, as above, a win situation is established when three or more sides of hexagons of a same symbol are adjacent, when each reel A1 to A9 stops.

Figure 28:
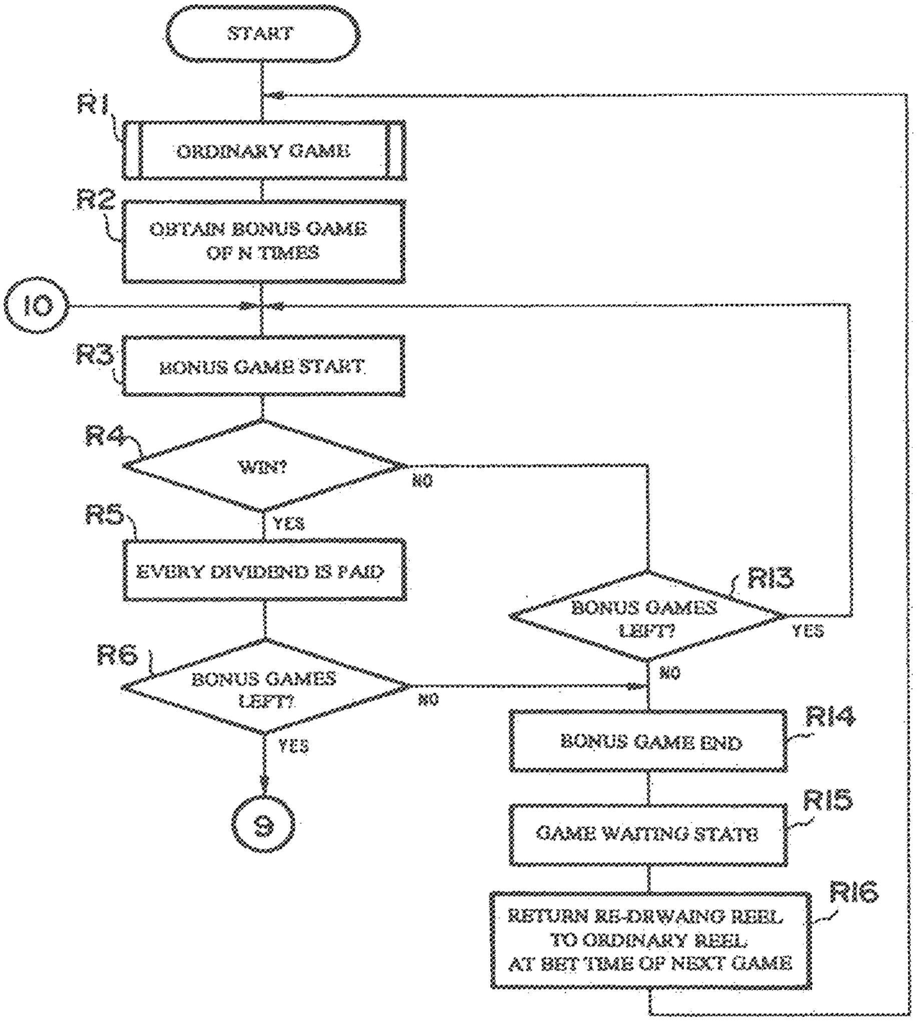
FIG. 28 is a flowchart showing performance of a gaming machine according to a fifth embodiment.
Figure 29:
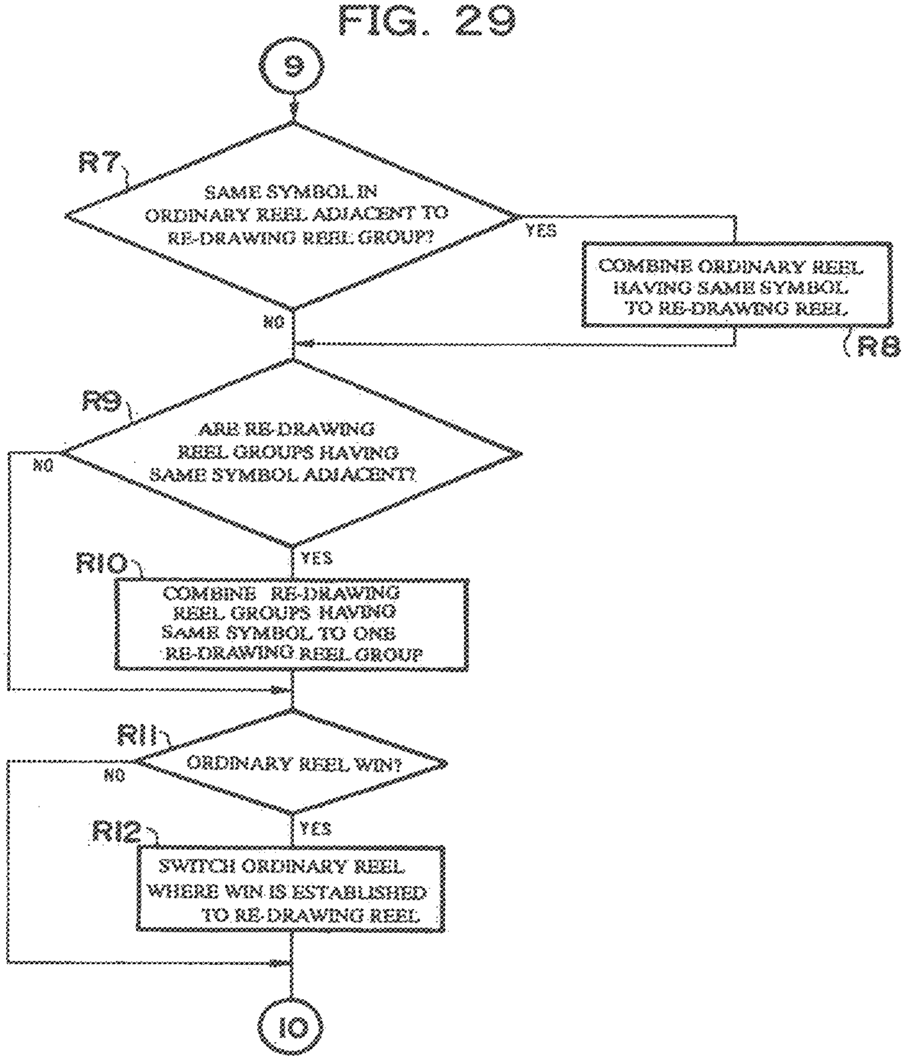
FIG. 29 is a flowchart showing performance of the gaming machine according to the fifth embodiment.

In the flowchart shown in FIG. 28, an ordinary game such as the first embodiment, is carried out (Step R1). Then, as shown in FIG. 7, in a case where a win situation is established by three or more trigger symbols "TRG" being adjacent, a dividend is provided to the player, and feature games (free games) as bonus games, are started. In the fifth embodiment, the number of feature games is five (Step R2).

When a first free game (bonus game) is started (Step R3), reels A5, A7, and A9 that have displayed trigger symbols, are switched to re-drawing reels (Step S7). The reels A5, A7, and A9 that become re-drawing reels are called a "first re-drawing reel group" as one group. Symbol alignment is the same, and synchronously rotates and stops at the same position on the reel in each reel A5, A7, and A9, which structure the re-drawing reel group.

For example, as shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step R4). In a case where a win situation is not established, the flow forwards to Step R13, and as shown in FIG. 9, in a case where a win situation is established, every dividend is paid (Step R5). The dividend at this time is set in accordance with the BET state. In FIG. 9, a win situation is established by the "BAR" symbols matching in adjacent reels A1, A2, and A4. Also, a win situation is established by "7" symbols matching in adjacent reels A6, A5, A7, and A9.

Then, it is determined whether there are any feature games (bonus games) left (Step R6). In a case where there aren't any feature games left, the flow forwards to Step R14, and in a case where there are feature games left, it is determined whether a win situation is established in the ordinary reels that are adjacent to the re-drawing reel group (Step R7). In a case where there isn't this kind of symbol, the flow forwards to Step R9, and in a case where there is this kind of symbol, the ordinary reel that has displayed the same symbol is combined to one re-drawing reel group (Step R8). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

Then, it is determined whether same symbols are displayed in adjacent re-drawing reel groups, in a case where a plurality of re-drawing reel groups exist (Step R9). In a case where same symbols are not displayed in adjacent re-drawing reel groups, the flow forwards to step R11, and in a case where same symbols are displayed in adjacent re-drawing reel groups, the re-drawing reel groups that have displayed the same symbol, are combined (Step R10). Next, it is determined whether a win situation is established in the ordinary reels (Step R11). In a case where a win situation is not established in the ordinary reels, the flow forwards to Step R3, and in a case where a win situation is established in the ordinary reels, the ordinary reels that have established a win, is switched to a re-drawing reel (Step R12). For example, in a case shown in FIG. 9, a win situation is established by the "BAR" symbols matching in adjacent reels A1, A2, and A4. Therefore, these ordinary reels are switched to re-drawing reels, and become a second re-drawing reel group.

Next, the flow returns to Step R3, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step R4). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step R5), and it is determined whether there are any feature games (bonus games) left (Step R6). In a case where a feature game is left, it is determined whether same symbols have appeared in ordinary reels adjacent to the re-drawing reel groups (here, it is the first and second re-drawing reel group) (Step R7). In a case where the same symbols have not appeared in the ordinary reels adjacent to the re-drawing reels, the flow forwards to Step R9, and in a case where the same symbols appear in the ordinary reels adjacent to the re-drawing reels, the ordinary reel that has the same symbol, is combined to the adjacent re-drawing reel group (Step R8).

In a case where a plurality of re-drawing reel groups exist, it is determined whether same symbols appear in adjacent re-drawing reel groups (Step R9). In a case where same symbols do not appear in adjacent re-drawing reel groups, the flow forwards to Step R10, and in a case where same symbols appear in adjacent re-drawing reel groups, the re-drawing reel group that has appeared the same symbol, is combined to one re-drawing reel group (Step R10). For example, as shown in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group). Namely, as shown in FIG. 11, reels (A1, A2, A4, A5, A6, A7, and A9) structure a new re-drawing reel group.

Next, it is determined whether a win situation is established in the ordinary reels (Step R11), and in a case where a win situation is not established, the flow forwards to Step R3, and in a case where a win situation is established, the reels according to that win are switched to re-drawing reels (Step R12). The case shown in FIG. 11, is a case where a win situation is not established in the ordinary reels.

In the next game, as shown in FIG. 12, a new re-drawing reel group (A1, A2, A4, A5, 5 A6, A7, and A9) and the ordinary reels (A3 and A8) respectively rotate independently.

As the above, third to fifth feature games are further carried out. Namely, in Step R4, in a case where a win situation is not established, it is determined whether a feature game (bonus game) is left (Step R13), and in a case where there is a feature game (bonus game) left, the flow forwards to Step R3. On the other hand, in Step R13, in a case where there isn't a feature game (bonus game) left, the flow forwards to Step R14. In Step R6, in a case where there isn't a feature game (bonus game) left, the feature game (bonus game) ends (Step R14), and moves to a game waiting state (Step R15). At the BET time of the next game, the re-drawing reel is returned to an ordinary reel (Step R15). From the next game, an ordinary game is carried out once again.

As described in the first to fifth embodiment, by the condition of re-drawing reels appearing, the condition of reels that structure the re-drawing reels increasing, and the number of the re-drawing reels themselves increasing, the game variation increases. By applying a plurality of trigger symbols, a more diverse game can be carried out.

Sixth Embodiment

A gaming machine according to a sixth embodiment, differs from the above first to fifth embodiments, in that the gaming machine comprises a reel that displays three-position reels, i.e., a reel that can display symbols in three columns, up, medium, and bottom, in one reel. This gaming machine determines whether it is a win situation or not, by a win line. The reel that the gaming machine comprises may be a rotating drum type, or a video type.

Figure 32:
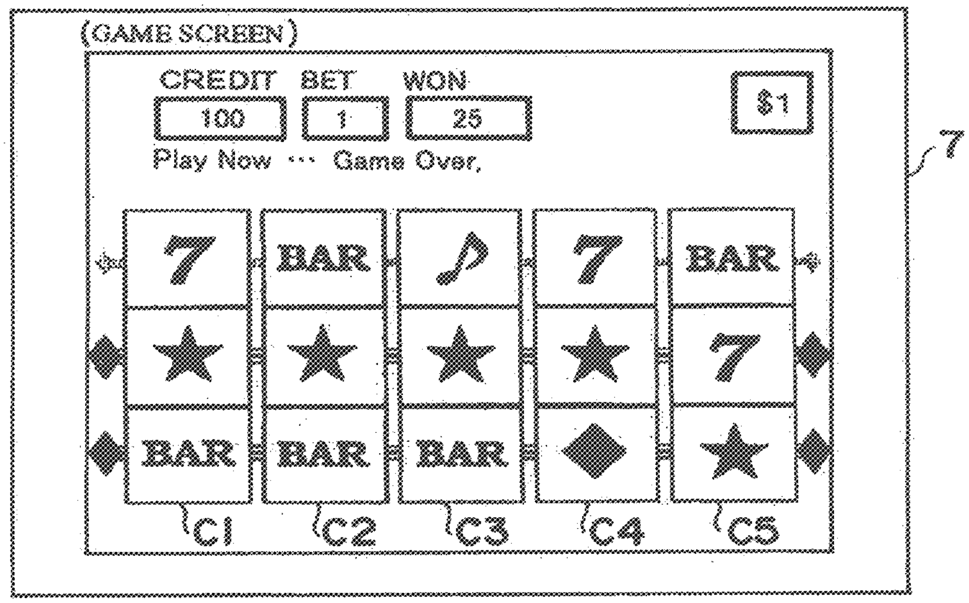
FIG. 32 is a diagram showing a screen display example of the gaming machine according to the sixth embodiment.

In a waiting state of an ordinary game, a screen such as shown in FIG. 32, is displayed in a symbol display unit 7. Namely, five independent reels C 1 to C5 that have different symbol alignment are displayed in a center part of the screen. These reels C1 to C5 structure a display region. There are symbol stop positions in up, middle, down column of the three columns, in each of the reels C1 to C5. A win line is set in each column. Betting on a pre-set win line is carried out, and a win situation in a game in the sixth embodiment is established in a case where a combination of equal to or more than a predetermined number of symbols match. For example, it can be set so that a win situation is established when three or more symbols appear on the win line.

In the case shown in FIG. 32, a win is situation is established by four "EI" symbols matching in the win line of the middle column. Also, a win situation is established by three "BAR" symbols matching.

Ways for the symbols to match, for a win situation to be established may be for example, "the symbols may be in any place, as long as it is on the win line", "the symbols are adjacent on the win line", "the symbols are adjacent in an order from left end to the right direction", "the symbols are adjacent in an order from the right end to the left direction", and "the symbols are adjacent in an order from left end to right direction and right end to left direction", etc.

In the reels C1 to C5, a "scatter symbol" which is effective just by appearing in any reel, not concerning the win line. In the symbol display unit 7, a credit meter which displays number of credits, a BET meter which displays number of BETs, and a WON meter which shows the number of medals to be paid to the player when a win situation is established, are displayed.

In the sixth embodiment, in a case where three or more "trigger symbols", which are scatter symbols, appear in any of three or more reels, feature games (bonus games) are carried out five games after that game. In these feature games, reels where the trigger symbols appeared in the ordinary game, are switched to re-drawing reels. The reel that has displayed a trigger symbol during a feature game, is switched to a re-drawing reel from the next game. Namely, the number of re-drawing reels that structure one re-drawing reel group increases. The hardware structure of the gaming machine according to the sixth embodiment, can be structured in the same way as the first embodiment.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5). In a case where the win situation is not established by the trigger symbol, the game ends (Step S20).

Performance of the gaming machine according to a sixth embodiment structured as above, will be described with reference to flowcharts in FIGS. 30 and 31.

Figure 30:
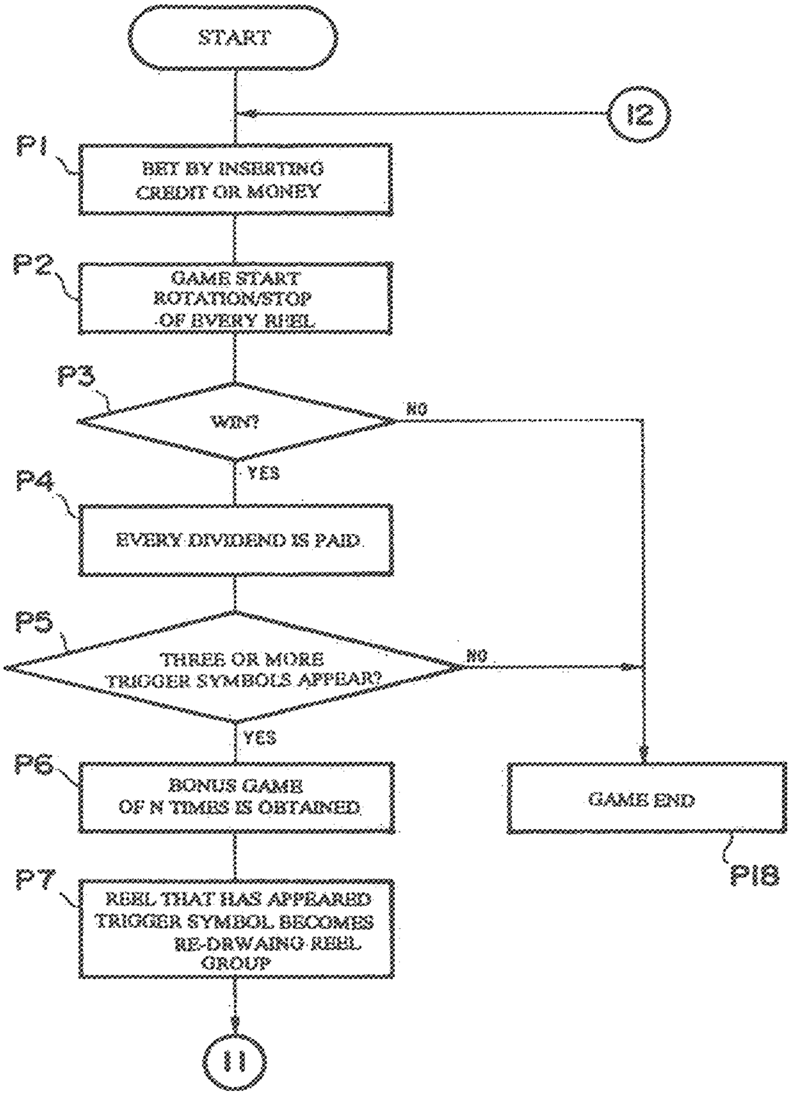
FIG. 30 is a flowchart showing performance of a gaming machine according to a sixth embodiment.
Figure 31:
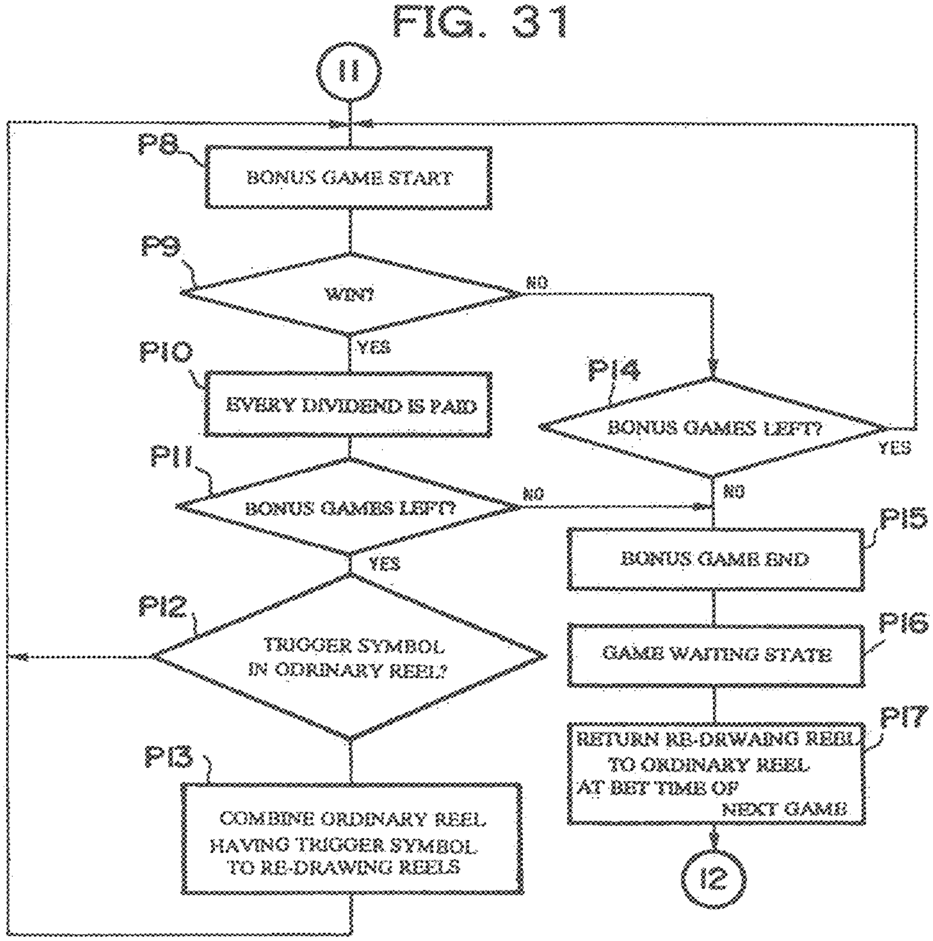
FIG. 31 is a flowchart showing performance of the gaming machine according to the sixth embodiment.

In the flowchart shown in FIG. 30, when a player inserts credits or money (these can be medals, coins, or cards), and carries out BET operation (STEP P1), a game is started (Step P2). At the same time as start of the game, each reel C 1 to C5 rotates, and change displays symbols. Here, symbol alignment and rotating timing of each reel C 1 to C5 each differ. Therefore, while the reels are rotating, it is unlikely that one reel becomes the same situation as another reel. Each reel C1 to C5 stops at a predetermined timing, after a predetermined time has passed after starting rotation. Then, it is determined whether a win situation is established or not (Step P3). In a case where a win situation is not established, the game ends (Step P18), and in a case where a win situation is established, every dividend corresponding to that win is paid (Step P4). The dividend at this time, is determined in accordance with the BET situation. Then, it is determined whether the win is a win situation established by three or more trigger symbols appearing (Step P5). In a case where the win situation is not established by the three or more trigger symbols appearing, the game ends (Step P18).

Figure 33:
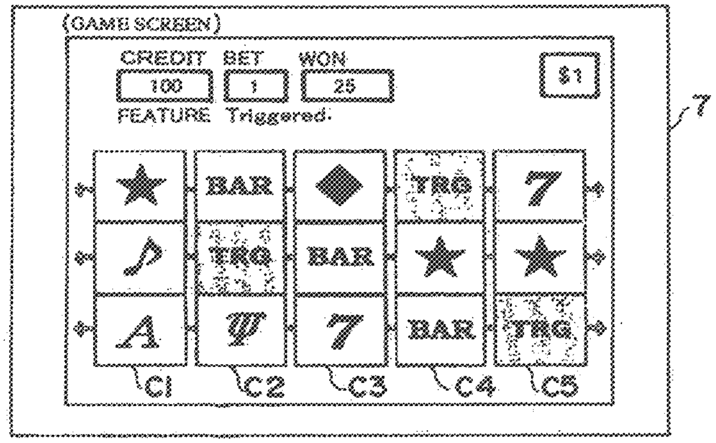
FIG. 33 is a diagram showing a screen display example of the gaming machine according to the sixth embodiment.

On the other hand, as shown in FIG. 33, in a case where a win situation is established by a total of three trigger symbols appearing in reels A5, A7, and A9, a feature game as a bonus game is started. Namely, the feature game is carried out in a case where three ore more trigger symbols appear in three or more of any reels. The number of times of the feature game is n (n is a natural number) times from the next game. In the sixth embodiment, the number of times of the feature game is five times (Step P6).

Figure 34:
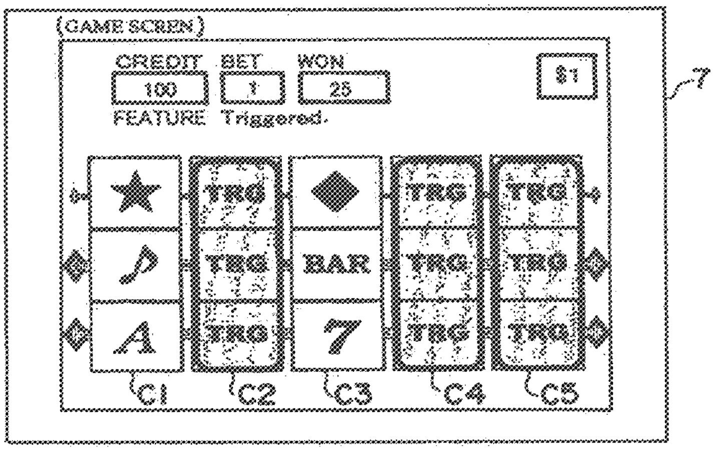
FIG. 34 is a diagram showing a screen display example of the gaming machine according to the sixth embodiment.

Reels C2, C4, and C5 that have displayed trigger symbols when a first free game is started, are switched to re-drawing reels. The reels C2, C4, and C5 that become re-drawing reels are called a "re-drawing reel group" as one group. As shown in FIG. 34, in the re-drawing reels, three same symbols are placed sequentially, and is set so that only the same symbols always stop on the reel. The re-drawing reels maintain a situation where the same symbols appear in every position, and carries out re-drawing of the symbols. Symbol alignment of the re-drawing reels and the ordinary reels are completely different. Here, because a win situation is not necessarily established in a maintained state, it does not necessarily mean that a win situation is maintained. Reels, wherein trigger symbols appeared, during the feature game period, are switched to re-drawing reels.

Figure 35:
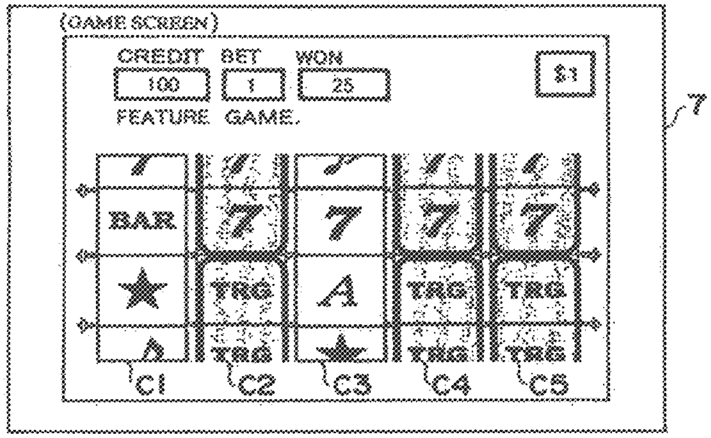
FIG. 35 is a diagram showing a screen display example of the gaming machine according to the sixth embodiment.

When a feature game (bonus game) is started (Step P8), as shown in FIG. 35, the re-drawing reel group (C2, C4, and C5) synchronously rotates the three sequential symbols, and the other reels (C1 and C3) independently rotate randomly. When the rotation of every ordinary reel and the re-drawing reel group stops, it is determined whether a win situation is established or not (Step P9). In a case where a win situation is not established, the flow forwards to Step P14. In a case where a win situation is established, every dividend is paid (Step P10). The dividend at this time is set in accordance with the BET state. For example, as shown in FIG. 36, when five "0" symbols match on the middle win line, a win situation corresponding to that symbol, and the number thereof is established.

Then, it is determined whether there are any feature games (bonus games) left (Step P11). In a case where there aren't any feature games left, the flow forwards to Step P15, and in a case where there are feature games left, it is determined whether a trigger symbol appeared in the ordinary reels or not (Step P12). In a case where a trigger symbol does not appear in the ordinary reels, the flow forwards to Step P8, and in a case where a trigger symbol appears in the ordinary reels, the ordinary reel that has appeared a trigger symbol is switched to a re-drawing reel, and combined (Step P13).

Figure 36:
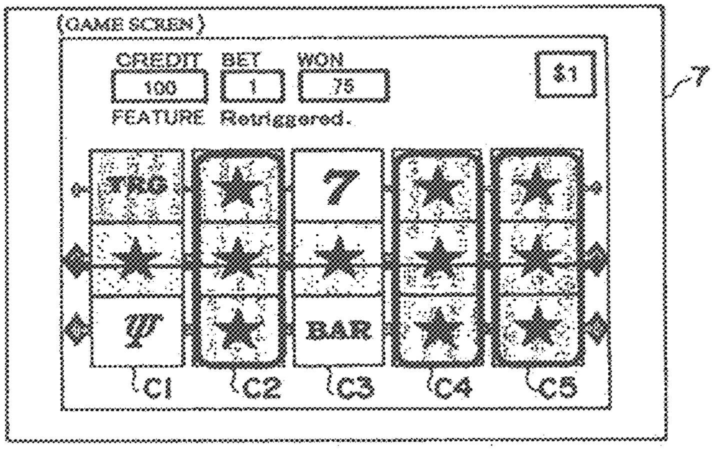
FIG. 36 is a diagram showing a screen display example of the gaming machine according to the sixth embodiment.

For example, in the case shown in FIG. 36, a trigger symbol appears in an ordinary reel C1, at the same time a win situation is established by five "0" symbols matching. Therefore, the reel C1 is switched to a re-drawing reel. Then, in the next feature game, the reel C 1 has the same symbol alignment as the other re-drawing reels, and synchronously rotates, and stops at the same position on the reel. Namely, in the feature game, re-drawing reels structured by redrawing reels (C1, C2, C4, and C5), and an ordinary reel C4, co-exist.

Figure 37:
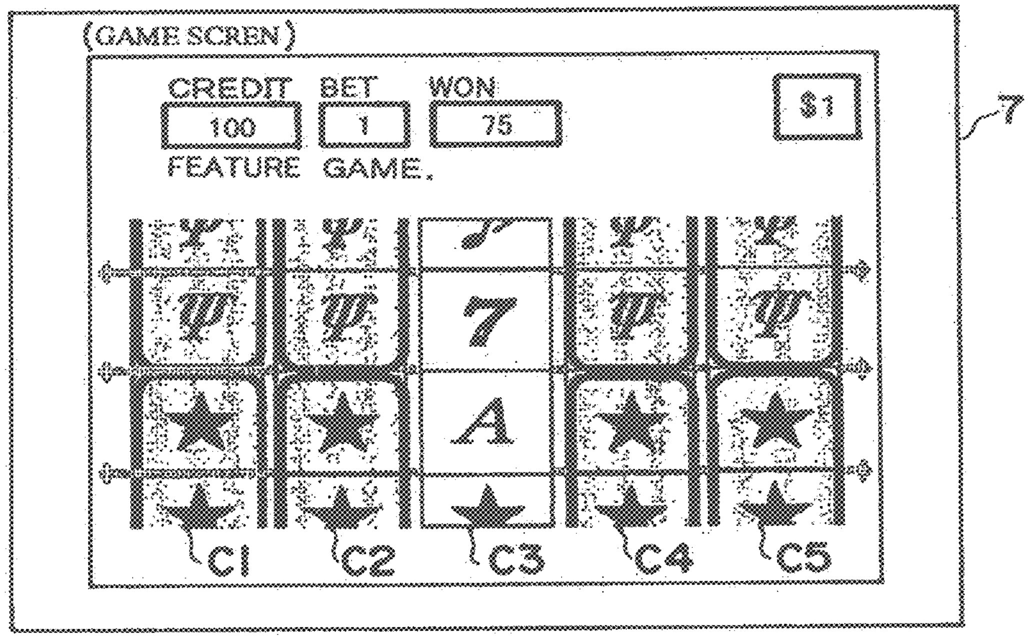
FIG. 37 is a diagram showing a screen display example of the gaming machine according to the sixth embodiment.

Next, the flow returns to Step P8, and as the above, the second to fifth feature games are carried out. As shown in FIG. 37, the re-drawing reels (C1, C2, C4, and C5) and the ordinary reel C3 respectively rotate independently. When every rotation of the reels stop, it is determined whether a win situation is established (Step P9), and in a case where win situation is not established, it is determined whether any feature games (bonus games) are left (Step P 14), and in a case where feature games (bonus games) are left, the flow forwards to Step P8. On the other hand, in Step P14, in a case where there aren't any feature games (bonus games), the flow forwards to Step P15. In Step P11, in a case where there aren't any feature games (bonus games) left, the feature game (bonus game) ends (Step P15), and moves to a game waiting state (Step P16). At the BET time of the next game, the re-drawing reel is retuned to an ordinary reel (Step P 17). From the next game, an ordinary game is carried out once again.

Seventh Embodiment

The seventh embodiment is also a gaming machine that comprises five reels, in the same way as the sixth embodiment. However, symbol alignment in the re-drawing reels and the ordinary reels are completely the same. Namely, the re-drawing reels in the seventh embodiment, do not have placed three same symbols sequentially, but have the same symbol alignment as the ordinary reels. In the seventh embodiment, when a trigger symbol appears in an ordinary reel during a feature game, the ordinary reel is switched to a re-drawing reel. Namely, the number of re-drawing reels that structure one re-drawing reel group increases. Other structure in the seventh embodiment, is the same as the sixth embodiment.

Figure 38:
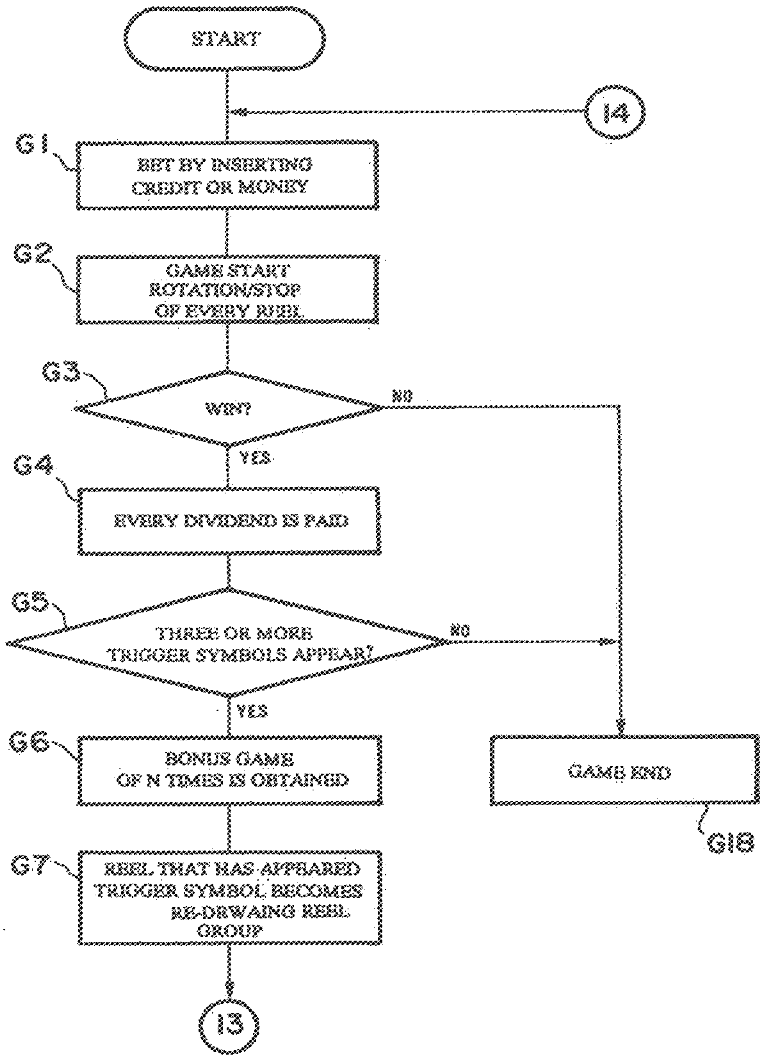
FIG. 38 is a flowchart showing performance of a gaming machine according to a seventh embodiment.
Figure 39:
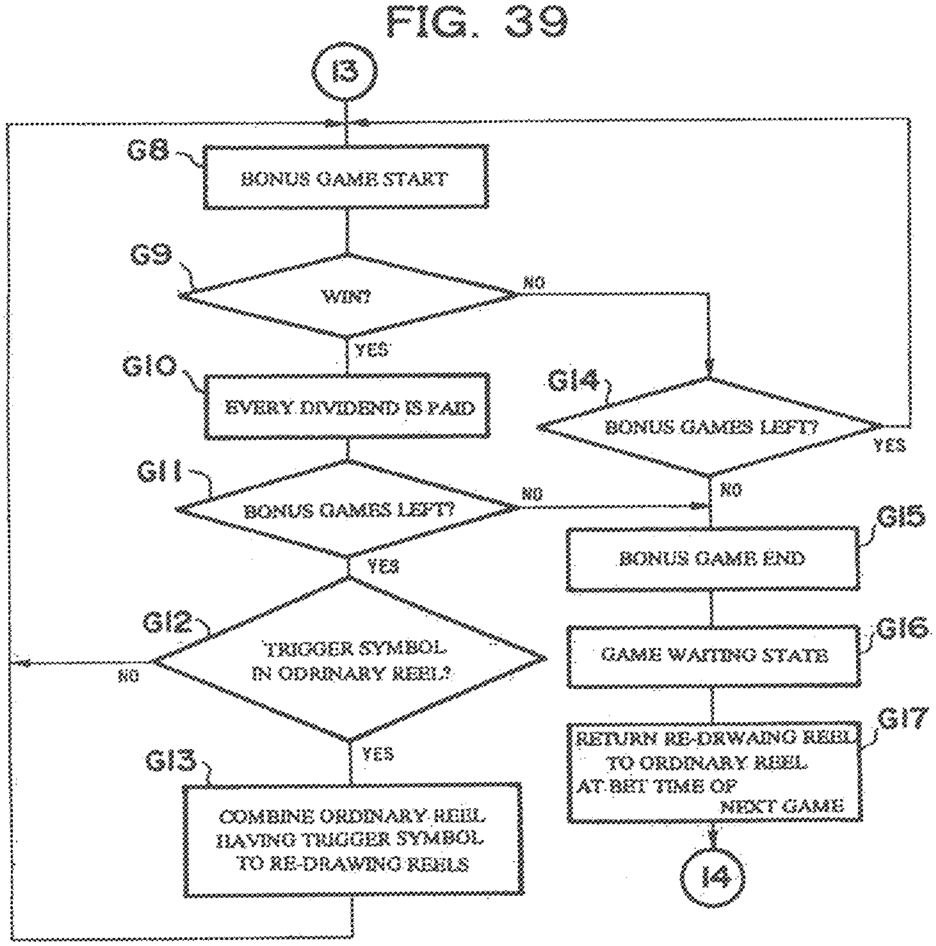
FIG. 39 is a flowchart showing performance of the gaming machine according to the seventh embodiment.
Figure 40:
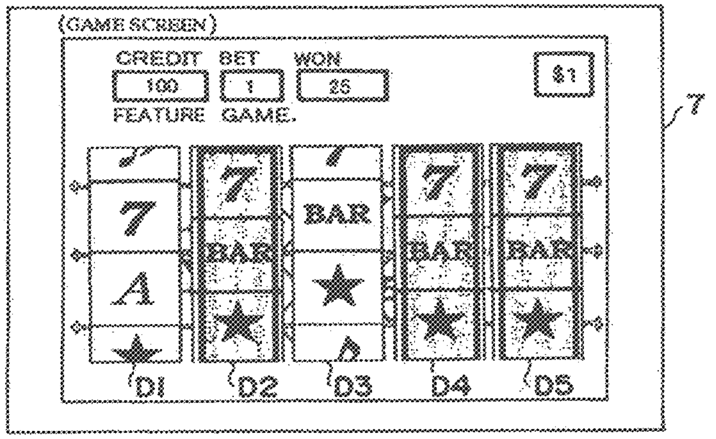
FIG. 40 is a diagram showing a screen display example of a gaming machine according to the seventh embodiment.

Performance of the gaming machine according to the seventh embodiment, will be described with reference to FIGS. 38 and 39. In the flowchart shown in FIG. 38, when a player inserts credits or money (these can be medals, coins, or cards), and carries out BET operation (STEP G1), a game is started (Step G2). At the same time as start of the game, as shown in FIG. 40, each reel D1 to D5 rotates, and change displays symbols. The reels D1 to D5 structure a display region. Here, symbol alignment and rotating timing of each reel D1 to D5 differ. Therefore, while the reels are rotating, it is unlikely that one reel becomes the same situation as another reel. Each reel D1 to D5 stops at a predetermined timing, after a predetermined time has passed after starting rotation. Then, it is determined whether a win situation is established or not (Step G3). In a case where a win situation is not established, the game ends (Step G18), and in a case where a win situation is established, every dividend corresponding to that win is paid (Step G4). The dividend at this time, is determined in accordance with the BET situation. Then, it is determined whether the win is a win situation established by three or more trigger symbols appearing (Step G5). In a case where the win situation is not established by three or more trigger symbols appearing, the game ends (Step G18).

On the other hand, in a case where a win situation is established by three or more trigger symbols appearing, a feature game as a bonus game is started. Namely, the feature game is carried out in a case where three ore more trigger symbols appear on whichever three or more reels. The number of times of the feature game is n (n is a natural number) times from the next game. In the seventh embodiment, the number of times of the feature game is five times (Step G6).

Figure 41:
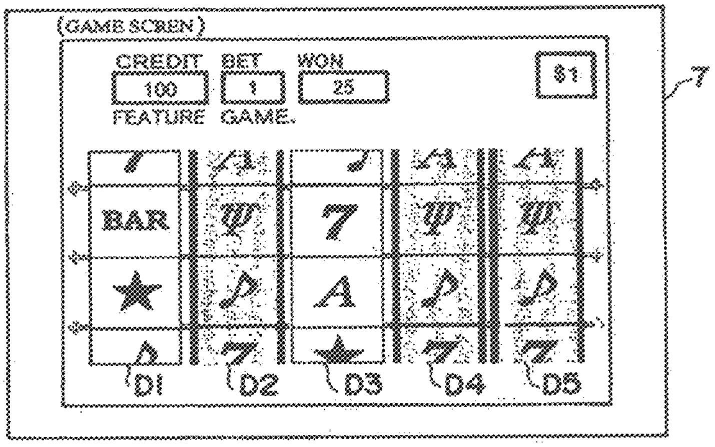
FIG. 41 is a diagram showing a screen display example of the gaming machine according to the seventh embodiment.

Reels that have displayed trigger symbols when a first free game (bonus game) is started (for example, reels D2, D4, and D5), are switched to re-drawing reels. The reels D2, D4, and D5 that become re-drawing reels are called a "re-drawing reel group" as one group. As shown in FIG. 41, the re-drawing reels are set so that only the same symbols always stop on the same win line. The re-drawing reels maintain a situation where the same symbols appear in every position, and carries out re-drawing of the symbols. Here, because a win situation is not necessarily established in a maintained state, it does not necessarily mean that a win situation is maintained. Reels, wherein trigger symbols appeared, during the feature game period, are switched to re-drawing reels.

When a feature game (bonus game) is started (Step G8), as shown in FIG. 41, the re-drawing reel group (D2, D4, and D5) synchronously rotates, and the other reels (ordinary reels: D1 and D3) independently rotate randomly. When the rotation of every ordinary reel and the first re-drawing reel group stops, it is determined whether a win situation is established or not (Step G9). In a case where a win situation is not established, the flow forwards to Step G14. In a case where a win situation is established, every dividend is paid (Step G10). The dividend at this time is set in accordance with the BET state. For example, as shown in FIG. 42, when five "BAR" symbols match in the bottom column, a win situation in accordance with that symbols and the number of symbols, is established.

Then, it is determined whether there are any feature games (bonus games) left (Step G11). In a case where there aren't any feature games (bonus games) left, the flow forwards to Step G15, and in a case where there are feature games (bonus games) left, it is determined whether triggers symbols have appeared in the ordinary reels (Step G 12). In a case where trigger symbols have not appeared in the ordinary reels, the flow forwards to Step G15, and in a case where trigger symbols have appeared in the ordinary reels, the ordinary reel that has appeared a trigger symbols is switched to a re-drawing reel, and combined (Step G13).

Figure 42:
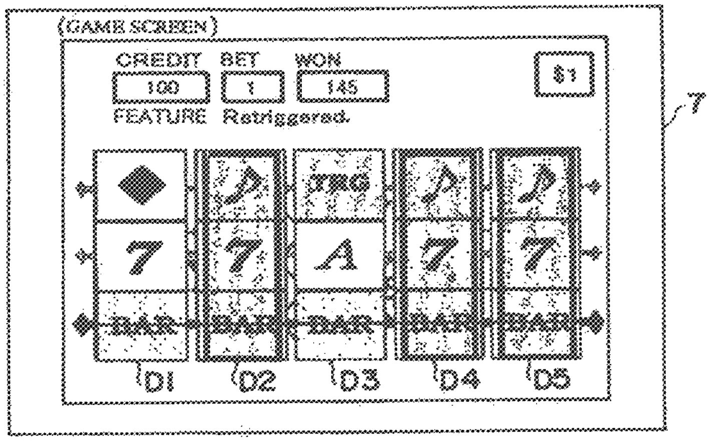
FIG. 42 is a diagram showing a screen display example of the gaming machine according to the seventh embodiment.
Figure 43:
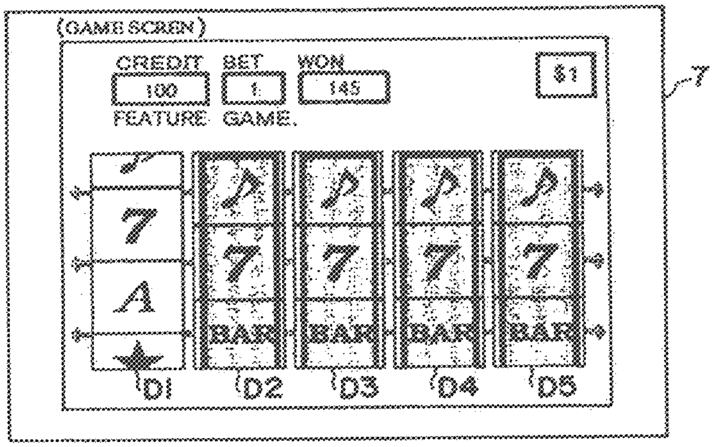
FIG. 43 is a diagram showing a screen display example of the gaming machine according to the seventh embodiment.

For example, in the case shown in FIG. 42, a win situation is established by five "BAR" symbols matching in the bottom column, and a trigger symbol appearing in an ordinary reel D3. Therefore, the reel D3 is switched to a re-drawing reel. Then, in the next feature game, the reel D3 has the same symbol alignment as the other re-drawing reels, and synchronously rotates, and stops at the same position on the reel. Namely, as shown in FIG. 43, in the next feature game, re-drawing reels structured by re-drawing reels (D2, D3, D4, and D5), and an ordinary reel D1, co-exist.

Figure 44:
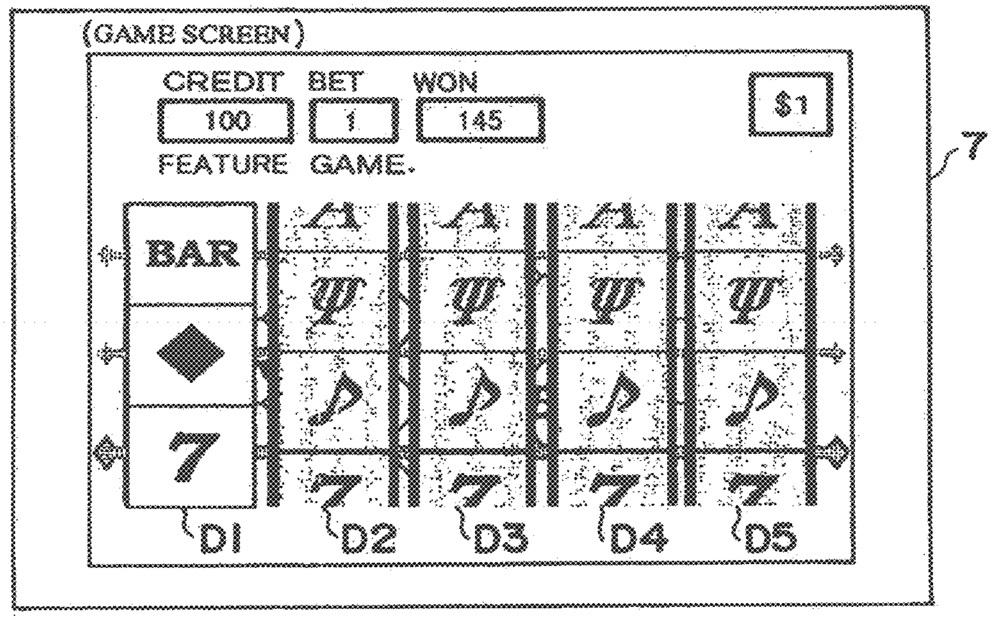
FIG. 44 is a diagram showing a screen display example of the gaming machine according to the seventh embodiment.

Next, the flow returns to Step G8, and as the above, the second to fifth feature games are carried out. As shown in FIG. 44, the re-drawing reels (D2, D3, D4, and D5) and the ordinary reel D1 respectively rotate independently. When every rotation of the reels stop, it is determined whether a win situation is established (Step G9), and in a case where win situation is not established, it is determined whether any feature games (bonus games) are left (Step G14), and in a case where feature games (bonus games) are left, the flow forwards to Step G8. On the other hand, in Step G14, in a case where there aren't any feature games (bonus games), the flow forwards to Step G15. In Step G11, in a case where there aren't any feature games (bonus games) left, the feature game (bonus game) ends (Step G15), and moves to a game waiting state (Step G16). At the BET time of the next game, the re-drawing reel is retuned to an ordinary reel (Step G17). From the next game, an ordinary game is carried out once again.

Eighth Embodiment

In the eighth embodiment, an embodiment where the number of re-drawing reel groups increase during a feature game, will be described. The structure of the gaming machine, is the same as the sixth embodiment.

Figure 45:
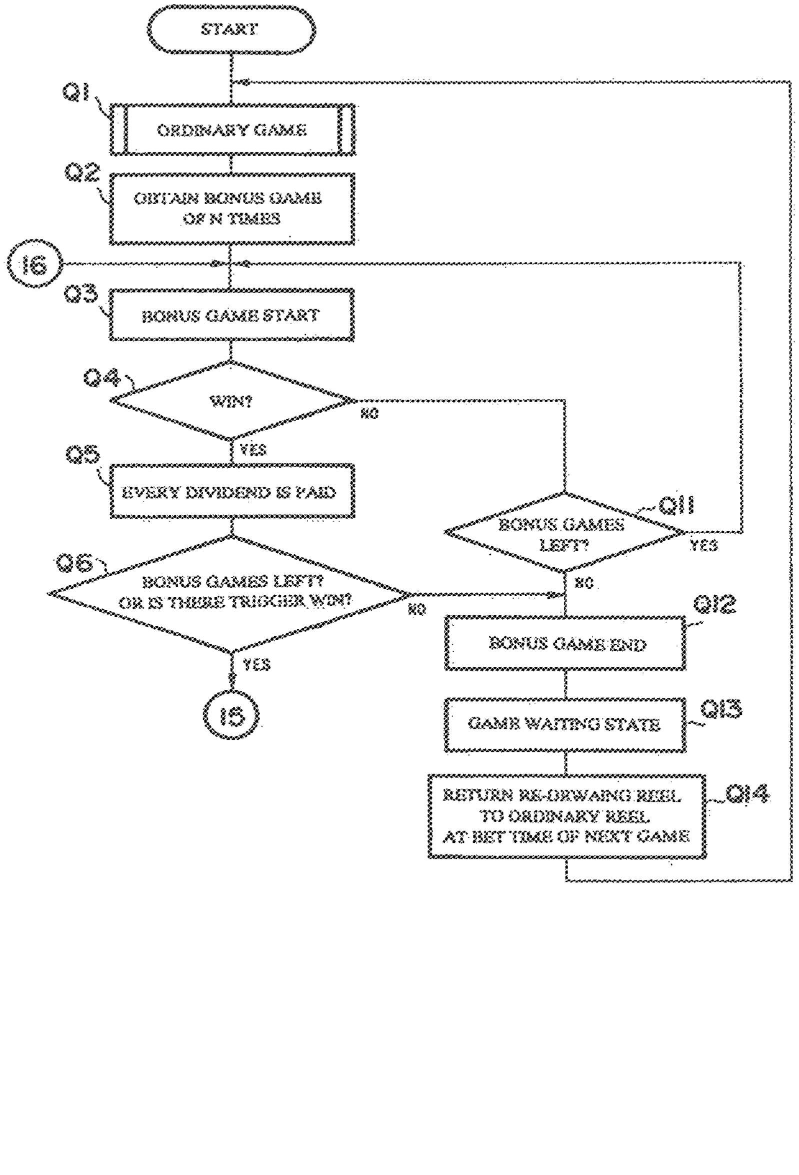
FIG. 45 is a flowchart showing performance of a gaming machine according to an eighth embodiment.
Figure 46:
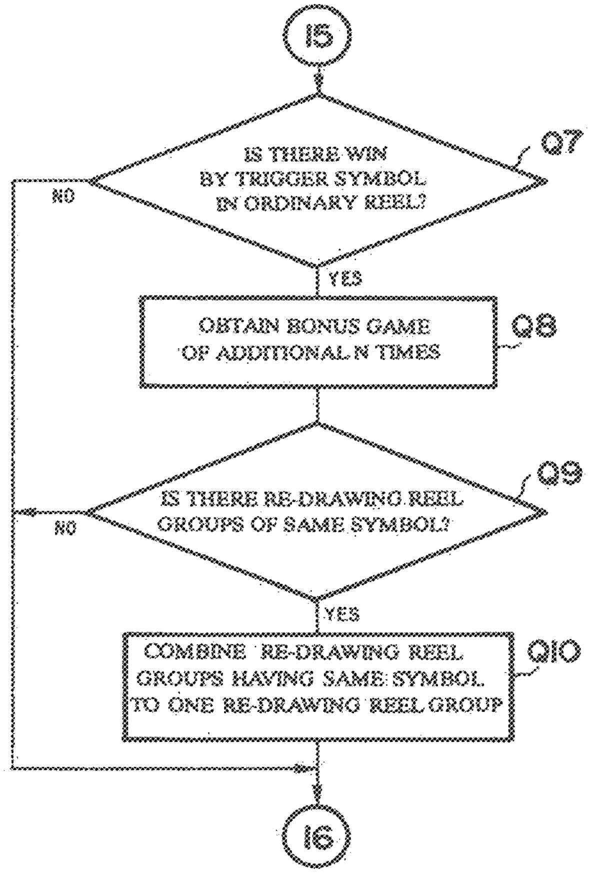
FIG. 46 is a flowchart showing performance of the gaming machine according to the eighth embodiment.

The performance of the gaming machine according to the eighth embodiment, will be described with reference to the flowcharts of FIGS. 45 and 46. In the flowchart shown in FIG. 45, in the same way as the sixth embodiment and the seventh embodiment, an ordinary game is carried out (Step Q1). Then, in a case where a win situation is established by a total of three trigger symbols appearing, feature games as bonus games start. The number of times of the feature game is n (n is a natural number) times from the next game. In the eighth embodiment, the number of times of the feature game is five times (Step Q2).

When a first free game (bonus game) starts, the reel that has displayed a trigger symbol, is switched to a re-drawing reel. The reels that become re-drawing reels, are called a "redrawing reel group" as one group. Three same symbols may be placed sequentially in the redrawing reels, in the same way as the sixth embodiment, and may have the same symbol alignment as the ordinary reels, in the same way as the seventh embodiment. The re-drawing reels are set so that only the same symbols always stop on the reel. The re-drawing reels maintain a situation where the same symbols appear in every position, and carries out re-drawing of the symbols. Here, because a win situation is not necessarily established in a maintained state, it does not necessarily mean that a win situation is maintained.

When a feature game (bonus game) is started (Step Q3), the re-drawing reels (C2, synchronously rotate three sequential symbols, and the other reels independently rotate randomly. When the rotation of every ordinary reel and the re-drawing reel group stops, it is determined whether a win situation is established or not (Step Q4). In a case where a win situation is not established, the flow forwards to Step Q11. In a case where a win situation is established, every dividend is paid (Step Q5). The dividend at this time is set in accordance with the BET state.

Then, it is determined whether there are any feature games (bonus games) left, or whether there is a win situation by the trigger symbol (Step Q6). In a case where there aren't any feature games left and there isn't a win situation by the trigger symbol, the flow forwards to Step Q12, and in a case where there are feature games left, or there is a win situation by the trigger symbol, it is determined whether a win situation is established by the trigger in an ordinary reel (Step Q7). In a case where a win situation by a trigger symbol is not established in an ordinary reel, the flow forwards to step Q3, and in a case where a win situation by a trigger symbol is established in an ordinary reel, the player obtains a feature game (bonus game) of an addition of n times (Step Q8). Then, in the next game, the ordinary reel that has established a win situation by the trigger symbol, is switched to an independent re-drawing reel, which differs from the already existing re-drawing reels.

Then, it is determined whether same symbols are displayed in re-drawing reel groups, in a case where a plurality of re-drawing reel groups exist (Step Q9). In a case where there aren't 5 any re-drawing reel groups, wherein the same symbols appear, the flow forwards to Step Q3. On the other, in a case where there are re-drawing reel groups, wherein the same symbols appear, the re-drawing reel groups having the same symbols are combined to one re-drawing reel group (Step Q10). Because it is the first feature game, combining in Step Q10 is not carried out.

Next, the flow returns to Step Q3, and a second feature game is carried out. The re-drawing reel groups and the ordinary reels respectively rotate independently. When every ordinary reel and re-drawing reel stops, it is determined whether a win situation is established or not (Step Q4). In a case where win situation is established, every dividend is paid (Step Q5), and is determined whether any feature games (bonus games) are left, or whether there is a win by a trigger symbol (Step Q6). In a case where there aren't any feature games (bonus games) left, and there isn't a win by the trigger symbol, the flow forwards to Step Q12. On the other hand, in a case where a feature game (bonus game) is left, or there is a win by the trigger symbol, it is determined whether there is a win by the trigger symbol in and ordinary reel (Step Q7). In a case where there isn't a win by the trigger symbol in the ordinary reel, the flow forwards to Step Q3, and in a case where there is a win by the trigger symbol in the ordinary reel, the player obtains feature games (bonus games) of an additional n times, and the ordinary reel according to the win by the trigger symbol, is switched in the next game, to an independent re-drawing reel, different from the already existing re-drawing reels.

In a case where a plurality of re-drawing reel groups exist, it is determined whether same symbols appear in the re-drawing reel groups (Step Q9). In a case where there are re-drawing reel groups wherein a same symbol appears, the re-drawing reel group that has appeared the same symbol, is combined to one re-drawing reel group (Step Q10).

The flow forwards to step Q3, and feature games from the third feature game and later, are carried out. Namely, after the feature game is started (Step Q3), it is determined whether a win situation is established or not (Step Q4). In a case where a win situation is not established, it is determined whether any feature games (bonus games) are left (Step Q11), and in a case where there is a feature game (bonus game) left, the flow forwards to Step Q3. On the other hand, in Step Q11, in a case where there isn't a feature game (bonus game) left, the flow forwards to. Step Q12. In step Q6, in a case where there isn't a feature game (bonus game) left, the feature game (bonus game) ends (Step Q12), and moves to a game waiting state (Step Q13). At the BET time of the next game, the re-drawing reel is retuned to an ordinary reel (Step Q14). From the next game, an ordinary game is carried out once again.

Other than the above described sixth to ninth embodiments, reels that simply have a few same symbols sequentially placed can be used as re-drawing reels, and can carry out re-drawing so that a situation where same symbols appear in the positions of the up, middle and down column.

Ninth Embodiment

In the ninth embodiment, in a case where a symbol that establishes a specific win is top displayed in whichever of a plurality of ordinary reels, the ordinary reel that has displayed the symbols that establish a specific win are switched to re-drawing reels, in a predetermined number of games from the next game. Drawing from a plurality of types of symbols is carried out, so that at least one win from a same win group as the win group that the specific win belongs to, is established in the re-drawing reel.

Figure 49:
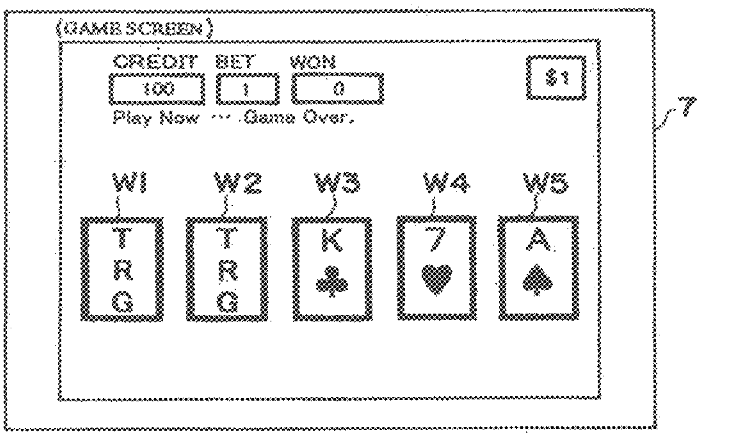
FIG. 49 is a diagram showing a screen display example of a gaming machine according to a ninth embodiment.

For example, a poker game is carried out. As shown in FIG. 49, either a symbol drawn on a card or a trigger symbol is displayed by five reels W1 to W5. The reels W1 to W5 structure a display region. Each reel W1 to W5 is displayed in a state where the cards are turned face down, so that the symbols can not be seen at a start of the game. After the game starts, symbols are displayed in each reel W1 to W5 in a way that the cards are sequentially turned over. When a win situation is established by a trigger symbol, feature games (bonus games) are carried out five games after that game. At the start of the feature game, the ordinary reels (W1 and W2) that had displayed trigger symbols, are switched to re-drawing reels.

Figure 52:
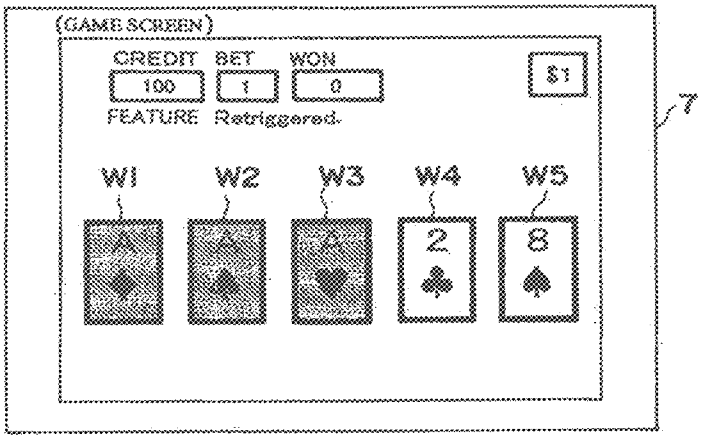
FIG. 52 is a diagram showing a screen display example of the gaming machine according to the ninth embodiment.

In the first feature game, symbols are drawn so that a win situation by two cards is established in the re-drawing reels (W1 and W2). In a poker game, it is "one pair". During the feature game period, as shown in FIG. 52, in a case where a win situation is established in the ordinary reel W2 by the combination of re-drawing reels (W1 and W2), the ordinary reel W3 is combined as a re-drawing reel. Namely, in the next feature game, symbols are drawn so that a win situation is established in three cards. In a poker game, it corresponds to "three of a kind".

FIG. 54 shows the kinds of well-known wins in for example, a poker game. First, "no pair" corresponds to a situation where none of the below wins exist. "One pair" is a situation where there are two cards (one pair) of a same number in the five cards. "Two pair" is a situation where there are two kinds of pairs in the five cards. "Three card" is a situation where there are three cards of a same number in the five cards. "Straight" is a situation where numbers are sequential in all five cards. "Flush" is a situation where all five cards are of a same suit (for example, spades, or diamonds).

"Full house" is a situation where there is a "pair" and a "three card" in the five cards. "Four of a kind" is a situation where there are four cards of a same number in the five cards. "Straight flush" is a situation where the five cards are a "flush" and a "straight". These plurality of types of wins structure a "win group".

In a gaming machine according to a ninth embodiment, in a case where there are for example, two re-drawing reels, symbols that have the possibility of being "one pair" is drawn. In a case where there are four re-drawing reels, symbols that have the possibility of being "two pair" or "four of a kind" is drawn. In a case where there are five re-drawing reels, symbols that have the possibility of being "straight", "flush", "full house" or "straight flush" is drawn.

The hardware structure of the gaming machine according to the ninth embodiment, is the same as the first embodiment.

Figure 47:
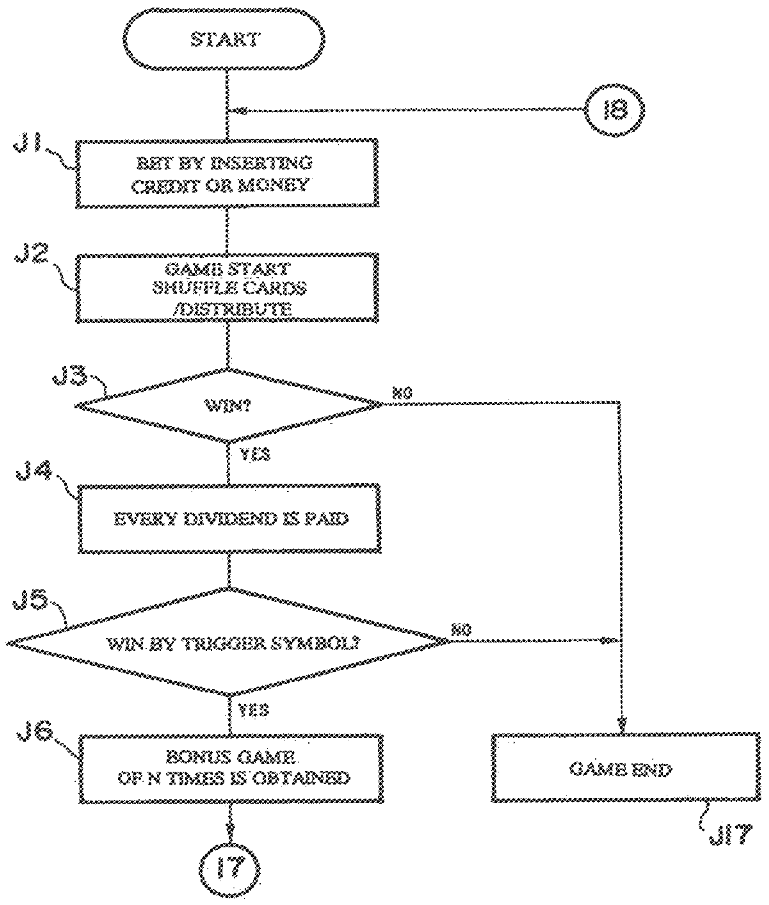
FIG. 47 is a flowchart showing performance of a gaming machine according to a ninth embodiment.
Figure 48:
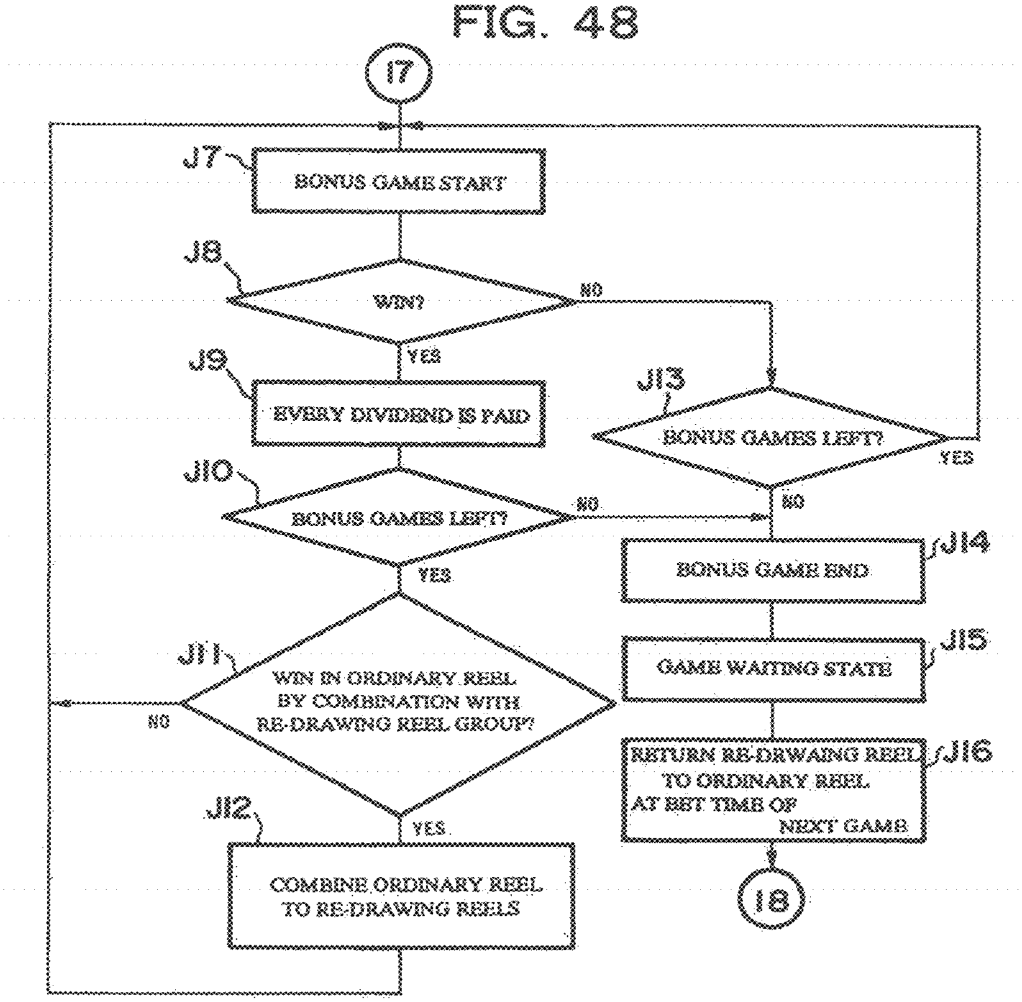
FIG. 48 is a flowchart showing performance of the gaming machine according to the ninth embodiment.

Performance of the gaming machine according to the ninth embodiment will be described. FIGS. 47 and 48 are flowcharts showing performance of the gaming machine according to the ninth embodiment, and FIGS. 49 to 53 are diagrams showing screen display examples of a symbol display unit 7. In a wait state of an ordinary game, a screen such as shown in FIG. 49 is displayed in the symbol display unit 7. Namely, reels W1 to W5 having a shape of a rectangle, which independently change or stop displays symbols, is displayed in a center part of a screen, as cards. Other than the reels W1 to W5, a credit meter which displays number of credits, a BET meter which displays number of BETs, and a WON meter which indicates number of medals that are paid off to a player at a time of a win situation. In the ninth embodiment, as above, a win situation occurs when a win in a poker game is established.

In the flowchart shown in FIG. 47, when a player inserts credits or money (these can be medals, coins, or cards), and carries out BET operation (STEP J1), a game is started (Step J2). At the same time as start of the game, each reel W1 to W5 change displays symbols, as though shuffling is carried out. Here, symbol alignment and change display timing of each reel W1 to W5 differ. Therefore, while the reels are changing, it is unlikely that one reel becomes the same situation as another reel. Each reel A1 to A9 stops at a predetermined timing, after a predetermined time has passed after starting change display.

Then, it is determined whether a win situation is established or not (Step J3). In a case where a win situation is not established, the game ends (Step J17), and in a case where a win situation is established, every dividend corresponding to that win is paid (Step J4). The dividend at this time, is determined in accordance with the BET situation. Then, it is determined whether the win is a win situation established by the trigger symbol (Step J5). In a case where the win situation is not established by the trigger symbol, the game ends (Step J17).

On the other hand, as shown in FIG. 49, in a case where a win situation is established by two trigger symbols being displayed (one pair) in reels W1 and W2, a feature game as a bonus game is started. Namely, the-feature game is carried out in a case where a win situation is established by the trigger symbols. Here, the win situation by the trigger symbols, is established in a case where a plurality of trigger symbols appear. The number of times of the feature game is n (n is a natural number) times from the next game. In the ninth embodiment, the number of times of the feature game is five times (Step J6).

When a first feature game (bonus game) is started, reels W1 and W2 that have displayed trigger symbols, are switched to re-drawing reels (Step J7). The reels W1 and W2 that become re-drawing reels are called a "re-drawing reel group" as one group. Each reel W1 and W2 that structures the re-drawing reel group have the same symbol alignment, and synchronously rotates and stops at the same position on the reel, so as to stop display a symbol that establishes "one pair".

Figure 50:
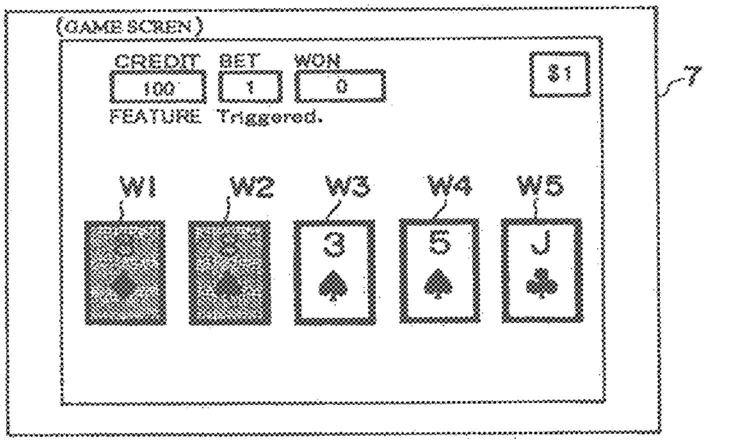
FIG. 50 is a diagram showing a screen display example of the gaming machine according to the ninth embodiment.
Figure 51:
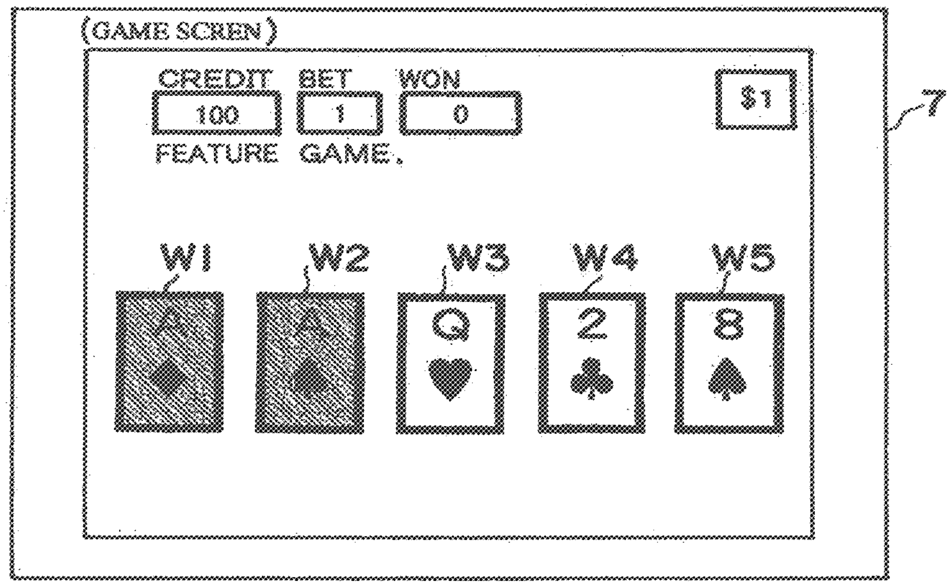
FIG. 51 is a diagram showing a screen display example of the gaming machine according to the ninth embodiment.

A feature game (bonus game) is started, and the re-drawing reels (W1 and W2) synchronize and change display symbols, and the other reels respectively change display symbols randomly. When change display of every ordinary reel and re-drawing reel group stops, it is determined whether a win situation is established (Step J8). In a case where a win situation is not established, the flow forwards to Step J13, and as shown in FIG. 50, in a case where a win situation is established, every dividend is paid (Step J9). The dividend at this time is determined in accordance with the BET state. In FIG. 50, a win situation of "one pair" is established by "8" symbols matching in the re-drawing reels (W1 and W2). For example, in FIG. 51, a win situation of "one pair" is established by "A" symbols matching in the re-drawing reels (W1 and W2). Then, it is determined whether there are any feature games (bonus games) left (Step J10). In a case where there aren't any feature games left, the flow forwards to Step J14, and in a case where there are feature games left, it is determined whether a win situation is established in an ordinary reel by a combination with the re-drawing reels (Step J11). In Step J11, in a case where a win situation is not established in the ordinary reel with the combination of the re-drawing reels, the flow forwards to Step J7, and in a case where a win situation is established in the ordinary reel with the combination of the re-drawing reels, the reels according to that win is combined to the re-drawing reel group at the start of the next game (Step J12).

Next, the flow returns to Step J7, and a second feature game (bonus game) is carried out. The re-drawing reel group (W1 and W2) and the other ordinary reels (W3 to W5) respectively change display symbols independently. When every ordinary reel and re-drawing reel stops, it is determined whether a win situation is established or not (Step J8). For example, as shown in FIG. 52, in a case where a win situation of "three card" is established by an "A" symbol matching in the re-drawing reel group (W1 and W2) and the ordinary reel W3, dividend corresponding to that win is paid (Step J9), and it is determined whether there are any feature games (bonus games) left (Step J10). In a case where a feature game is left, it is determined whether a win situation is established in the ordinary reel, and when a win situation is not established, the flow forwards to Step J7, and when a win situation is established, the reel W3 according to the win situation, is combined to the re-drawing reel group from the next game (Step J12).

Figure 53:
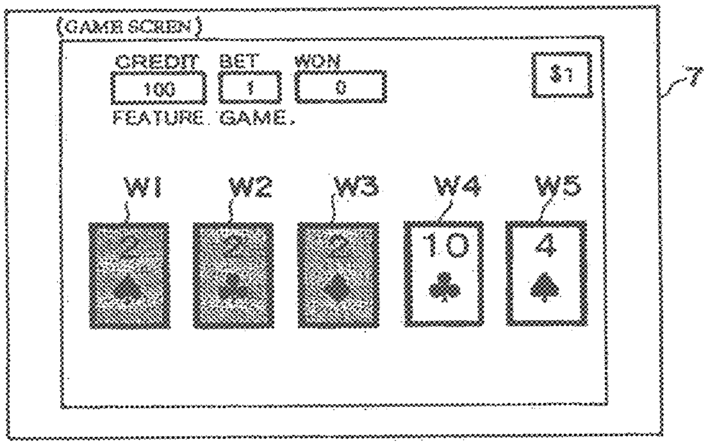
FIG. 53 is a diagram showing a screen display example of the gaming machine according to the ninth embodiment.

In the next game, the reel group (W1, W2, and W3) and the ordinary reels (W4 and W5) independently change displays and stop displays symbols. Then, in the re-drawing reel group (W1, W2, and W3), drawing is carried out from a combination of symbols that can establish for example, "three card", as shown in FIG. 53, and change display and stop display of symbols are carried out.

As the above, third to fifth feature games are carried out. Namely, in Step J8, in a case where a win situation is not established, it is determined whether there are any feature games (bonus games) left (Step J13), and in a case where feature games (bonus games) are left, the flow forwards to Step J7. On the other hand, in a case where there aren't any feature games (bonus games) left, the flow forwards to Step J14. In Step J10, in a case where there aren't any feature games (bonus games) left, the feature game (bonus game) ends (Step J14), and moves to a game waiting state (Step J15).

At the BET time of the next game, the re-drawing reel is retuned to an ordinary reel (Step J16). From the next game, an ordinary game is carried out once again.

In this way, according to the ninth embodiment, in a case where symbols that establish a specific win are stop displayed in whichever of a plurality of ordinary reels, because drawing is carried out from a plurality of types of symbols so that any one win of a same win group as the win group that the specific win belongs to (group to which the win belongs to) is established, the win can be changed, maintaining the win situation. By this, players feel intrigued, and the player's interest towards the game can be raised. In the ordinary reels that have displayed symbols other than symbols that establish a specific win, because drawing is carried out from a plurality of types of symbols, so that arbitrary symbols are respectively displayed independently, ordinary reels and re-drawing reels independently exist and co-exist. Namely, re-drawing is not carried out using every reel, but re-drawing results are displayed in re-drawing reels, which are part of the display region, and ordinary drawing results are displayed in one part of the remaining display region. By this, because drawing results are displayed by two types of regions: the re-drawing reels and the ordinary reels, existing, a new kind of game that arouses the player's interests can be realized. Every display region can become a re-drawing reel, in accordance with the course of the game.

Besides the embodiments described above, as a result of drawing, in a case where a symbol that is to be displayed in whichever ordinary reel is the same as the symbol to be displayed in the re-drawing reel, in special games of a predetermined number of times after the next game, the ordinary reel and the re-drawing reel may be combined. Namely, in a case where a symbol that is the same as the re-drawing reel is displayed in an ordinary reel that is not necessarily adjacent, the ordinary reel and the re-drawing reel are combined.

By this, during the period of the feature game, every time a same symbol as the re-drawing reel is displayed-in an ordinary reel, the number of reels that structure the re-drawing reel group increases. Because drawing is carried out from a plurality of types of symbols so that the same symbol is stop displayed in every re-drawing reel, the same symbols are stop displayed in the re-drawing reel group. By this, diverse re-drawing can be carried out in the re-drawing reels. As a result, a strong impression can be provided to the players, and it is possible to arouse the player's interests.

Characteristic performance of the present invention such as above, can be carried out by controlling a computer to execute a control program. Namely, this control program is structured so that a series of processing including: a processing of displaying a plurality of types of symbols in a plurality of display regions (for example, A1 to A9 shown in FIG. 5), upon starting a game; and in a case of stop displaying a predetermined symbol (for example TRG shown in FIG. 7), in the plurality of display regions, a processing of setting the display regions that stop display the predetermined symbol as specific display regions (for example, A5, A7, and A9), and in a predetermined times of games after the first game, draws for the specific display regions, symbols from the plurality of types of symbols that are to be displayed, so that there is a specific relationship among the symbols in each game, and at the same time setting the display regions other than the specific display region as a general display region, and draws for the general display region, a symbol from the plurality of types of symbols that are to be displayed, so that there isn't a predetermined relationship among the symbols, as an instruction group that can be executed by the computer.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and coexist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying changing display which displays, constantly changing a plurality of symbols in a stopped state to a plurality of types of symbols on a plurality of display regions (for example, A1 to A9 shown in FIG. 5), upon starting of a game, and stop display which once again stops the symbols that are changing at each display region, setting the display regions where the predetermined symbols are to be displayed stopped, as a specific display region, and in a predetermined times of games after the first game, draws for the specific display region (for example, A5, A7, and A9 shown in FIG. 7), symbols from the plurality of types of symbols that are to be displayed, so that there is a specific relationship among the symbols in each game, and draws in a case where predetermined symbols (for example, TRG shown in FIG. 7) are to be displayed stopped on a plurality of the display regions, and at the same time setting the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying a plurality of types of symbols in a plurality of display regions (for example W1 to W5 in FIG. 49) upon starting of a game, and setting the display regions where the predetermined symbols are to be displayed stopped, as specific display regions (W1 and W2) for a predetermined number of games after the next game, in a case where symbols that establish a specific win is stop displayed in the plurality of display regions (for example, W1 and W2, shown in FIG. 49), and drawing for the specific display region, symbols from the plurality of types of symbols, so that at least one same win from a win group that the specific win belongs to is established, and at the same time, setting the display regions other than the specific display region as a general display region, and draws for the general display region, a symbol from the plurality of types of symbols that are to be displayed, so that symbols are displayed independently in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The above program can be obtained by being recorded in a recording medium such as a CD-ROM and DVD, etc. This kind of program can also be obtained by receiving a signal sent by a computer that is a sending device, via communication networks, etc., constituted of a public telephone line, a dedicated phone line, a cable television circuit, or a radio communication line, etc., that structures a network. This signal is a computer data signal converted by a predetermined carrier wave that includes the program. At the time of sending, at the least, one part of the above program needs to be transmitted. Namely, every data that structures the above program, does not need to exist in the transmission media at one time. In a sending method for sending the program from the above computer, a case of sequentially sending data that structures the program, and a case of intermittently sending is included.

As described above, the gaming machine of the present invention comprises a display unit which can display a plurality of types of symbols on a plurality of display regions, upon starting a game, and a draw control unit which in a case where predetermined symbols are to be displayed stopped on a plurality of the display regions, sets the display regions where the predetermined symbols are to be displayed stopped, as a specific display region, and in a predetermined times of games after the first game, draws for the specific display region, symbols from the plurality of types of symbols that are to be displayed, so that there is a specific relationship among the symbols in each game, and at the same time which sets the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Figure 55:
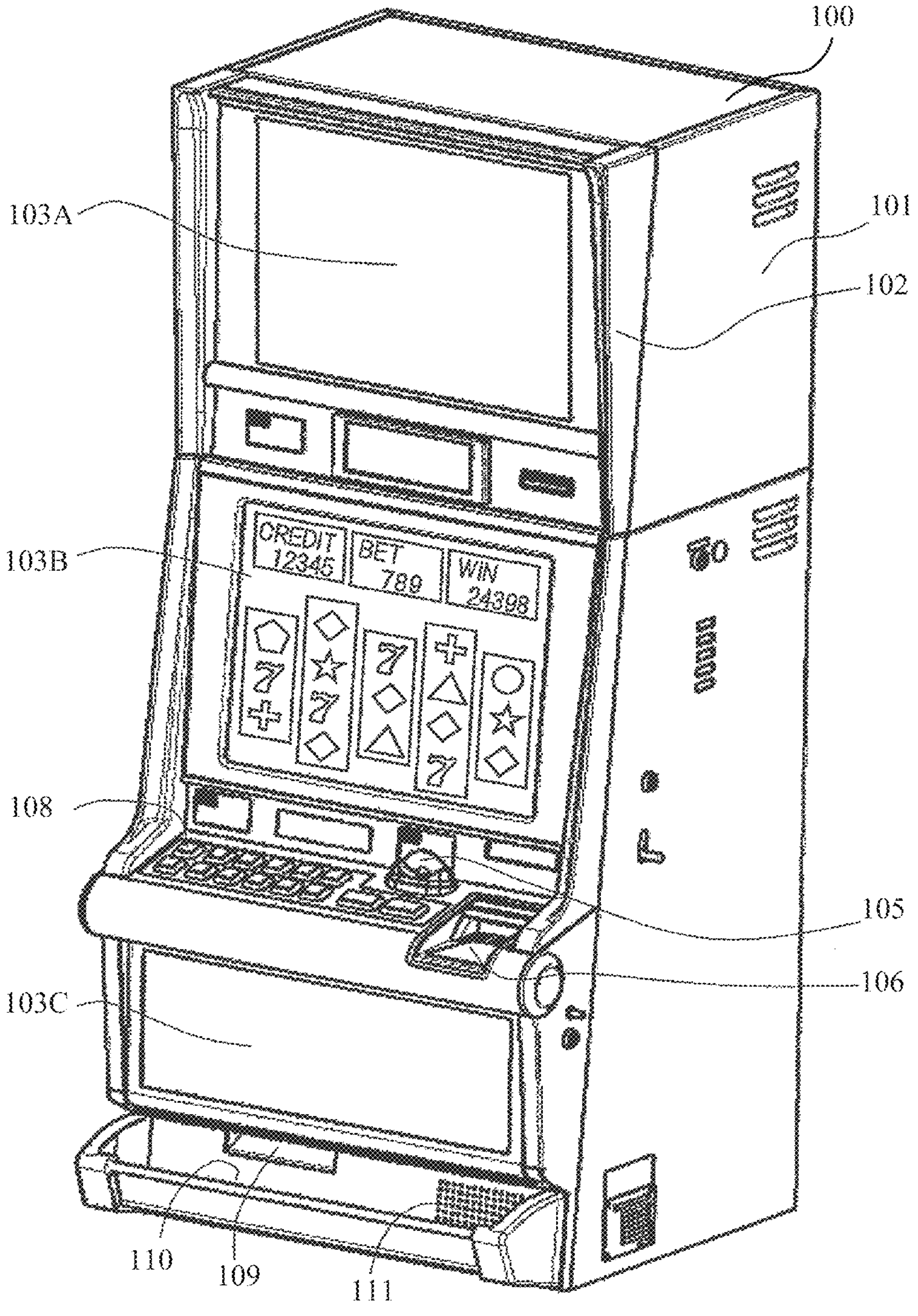
FIG. 55 is a perspective view of the appearance of a gaming machine according to an embodiment of the present invention.

In another embodiment of the present invention described herein includes a video gaming machine 100 preferably installed in a casino. Referring to FIG. 55, the gaming machine 100 comprises a box-shaped cabinet 101 with an openable and closable front panel 102. Three display units 103A, 103B, and 103C are mounted on the upper portion, the middle portion, and the lower portion of the front panel 102, respectively. A coin slot 105, a bill slot 106, and various push buttons 108 are mounted between the middle display window 103B and the lower display window 103C. A coin chute 109, a coin tray 110, and a speaker 111 are installed below the lower display window 103C.

The three display units 103A, 103B, and 103C each include a flat display device preferably, or a liquid crystal display device more preferably. The display units 103A, 103B, and 103C produce various images, for example, images for use in decoration and advertisements, e.g., the logo of a game developer, images for use in visual effects in games, and visualized information on games, e.g., pay tables, illustrations of game content, and jackpot meters.

Figure 57:
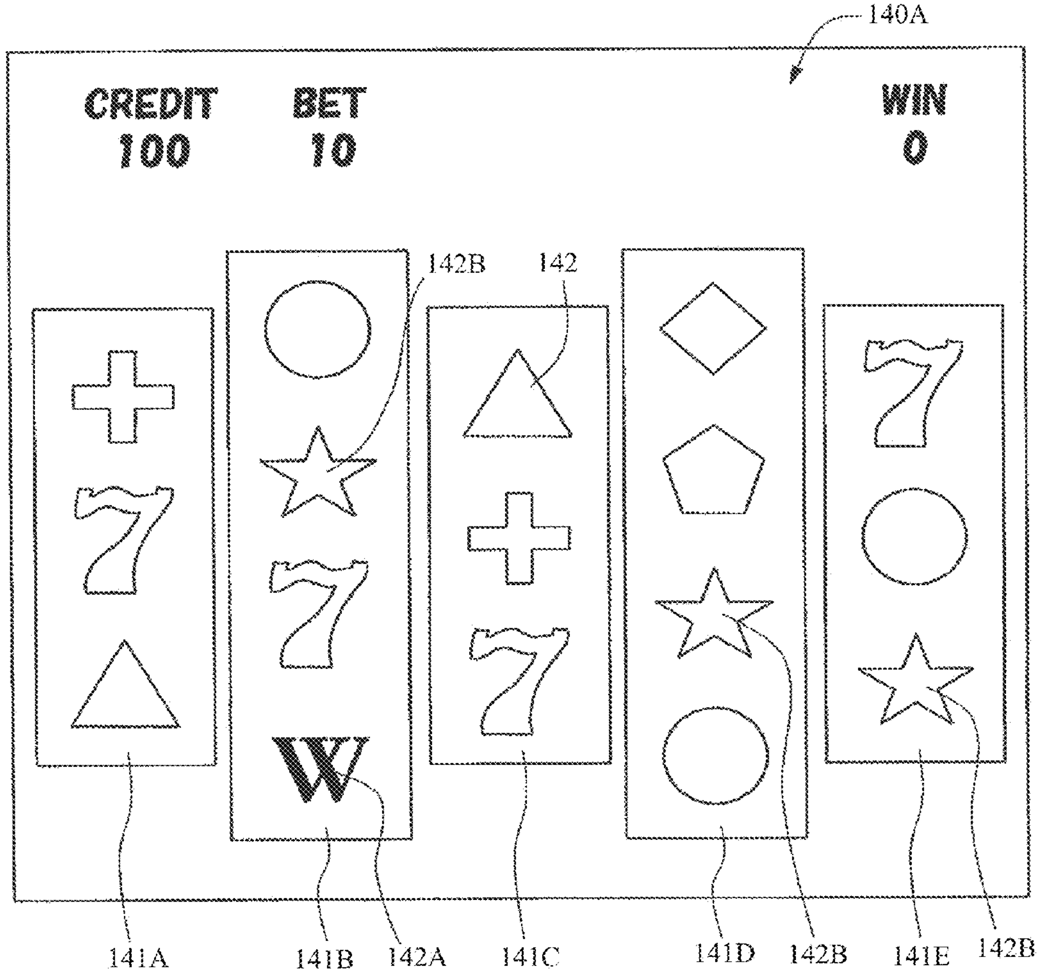
FIG. 57 shows an example of a game screen at a normal round, which is displayed on the gaming machine shown in FIG. 55.

In particular, the middle display unit 103B displays a game screen. FIG. 57 shows an example of a game screen 140A. The game screen 140A preferably including five video reels 141A-141E, i.e., five columns of symbols 142. Note that the number of video reels may be changed from five to other number, e.g., three. The game screen 140A also includes three meters that indicate the number of available credits of a player, the amount of a bet placed at a round, and the amount of a payout that the player has won at the round.

On each video reels 141A-141E, symbols 142 can be repeatedly moved and stopped in a vertical direction at each round of game. In other words, the video reels 141A-141E can separately spin and stop at each round. In a spin of each video reel, different types of symbols 142 appear in a predetermined order. The order preferably varies with video reels. After a predetermined time has elapsed from the start of the spin of the video reels 141A-141E, symbols 142 will be stopped column by column in an arrangement. The arrangement is randomly changed at every round of game. On each video reel 141A-141E in a stop position, preferably three or more symbols 142 are aligned in a column. The video reels 141A-141E are preferably divided into two types, i.e., a long type and a short type. A long-type video reel 141B and 141D preferably includes one more symbols than a short type video reel 141A, 141C, and 141E. Long- and short-type video reels are alternately arranged on the game screen 140A. As a result, all symbols 142 are preferably arranged on a honeycomb or hexagonal lattice when all the video reels 141A-141E are stopped. Note that symbols 142 may be arranged on another type of lattice, e.g., a square lattice.

The gaming machine 100 preferably conducts a game having two modes, i.e., a normal mode and a bonus mode. Details of rounds in the two modes will be described below. The appearances of the video reels 141A-141E are preferably changed depending on whether a round of game is in a normal or bonus mode.

Figure 58:
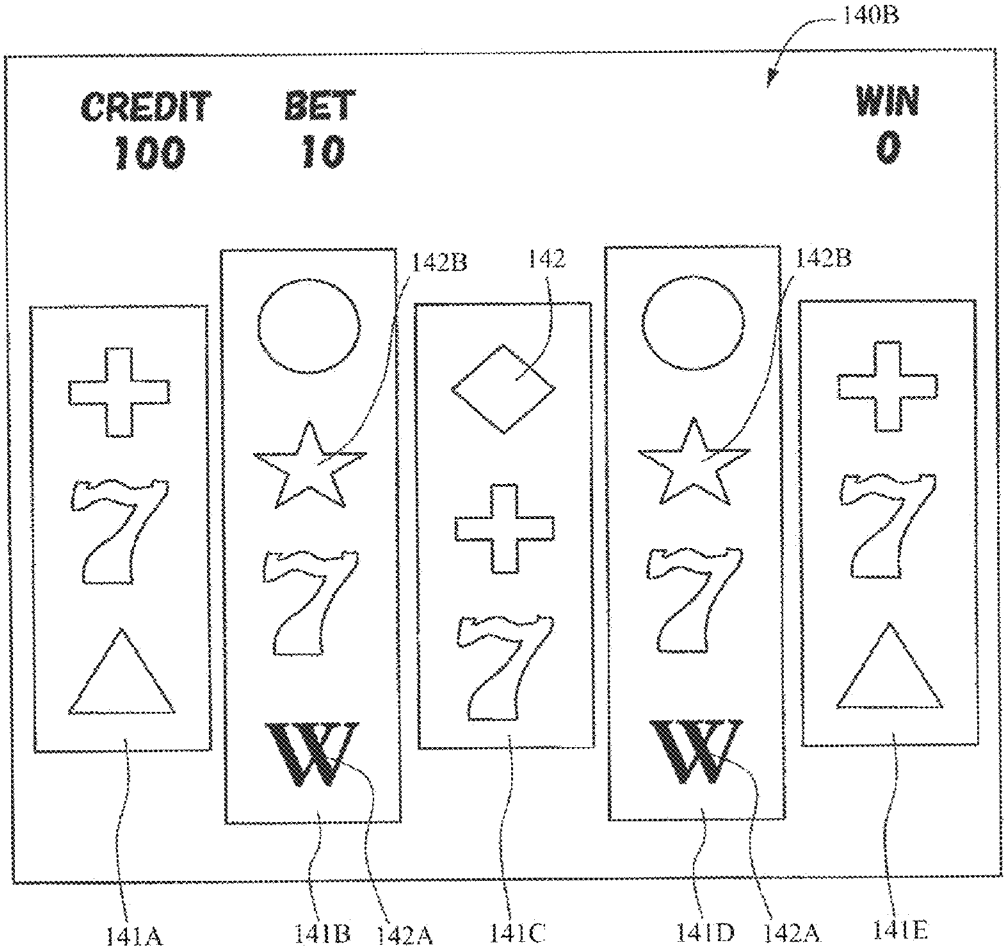
FIG. 58 shows an example of a game screen at a bonus round, which is 30 displayed on the gaming machine shown in FIG. 55.

FIG. 57 shows a game screen 140A displayed in a normal round. In spins of the video reels 141A-141E, symbols 142 appear in different orders on different video reels 141A-141E. FIG. 58 shows an example of a game screen 140B displayed in a bonus round. In the game screen 140B displayed in a bonus round, two or more video reels are grouped. Preferably, a left end video reel is paired with a right end video reel in turn, starting from the outmost video reels. Referring to FIG. 58, when the video reels 141A-141E are numbered from left to right starting at 1, the first video reel 141A is paired with the fifth video reel 141E, and the second video reel 141B is paired with the fourth video reel 141D. The third video reel 141C is by itself classified into a single group. Note that different two video reels, e.g., two adjacent video reels or two video reels separated by one other video reels may be paired. Alternatively, any three of the video reels 141A-141E may constitute a single group. In each pair of the video reels 141A-141E, symbols 142 are arranged in the same order and the same positions. Furthermore, each pair of the video reels 141A-141E spins from the same position in synchronization with each other, and stops at the same positions. In other words, a symbol arrangement on the video reels 141A-141E is left-right symmetric throughout a bonus round, regardless of whether the video reels 141A-141E spin or stop.

The gaming machine 100 provides a player with an award depending on a winning combination of symbols appearing on stopped video reels. Types of winning combinations can be determined by various rules. Each winning combination preferably pay from left to right in both of normal and bonus rounds. In the case of the video reels 141A-141E shown in FIGS. 57 and 58, if symbols of the same type appear on three or more consecutive video reels starting from the left end column 141A, the symbols constitute a winning combination. Alternatively, a winning combination may be formed by symbols of the same type scattered on any three or more video reels. Types of awards preferably include an amount of a payout and a right to play a bonus round. Types of awards vary with amounts of bets, and types and numbers of symbols included in winning combinations.

As easily understood through a comparison between FIGS. 57 and 58, there is a much better chance that three or more symbols of the same type appear on the stopped video reels 141A-141E at a bonus round than at a normal round. As a result, the player has a much better chance of winning a larger amount of payouts at a bonus round than at a normal round.

The coin slot 105 and the bill slot 106 allow a player to enter coins and bills thereinto, respectively. The entered coins and bills are counted by a counter and validated by an acceptor. The counter and the acceptor are preferably installed inside the cabinet 101. The total amount of the validated coins and bills are displayed on the middle display unit 103B as credits available to the player. A coin hopper installed inside the cabinet 101 stores a large number of coins and bills together with the coins and bills entered by the player. The coin hopper discharges coins or bills equivalent to credits that a player has won on a game through the coin chute 109 into the coin tray 110 or through the bill slot 106, respectively. Note that the gaming machine 100 may support a ticket-in/ticket-out system, i.e., accept and print a bar-coded paper ticket. A bar code printed on the ticket represents monetary data available to a player.

The push buttons 108 allow a player to operate the gaming machine 100. For example, by using the push buttons 108, a player can place a desired amount of a bet on each round of game. The player then pushes a spin button included in the push buttons 108 to cause the video reels 141A-141E to start spinning. After a predetermined time has elapsed, if the arrangement of stopped symbols 142 includes a winning, combination, the player will win an award depending on the amount of the bet and the type of the winning combination. The player will be allowed to push a cash-out button included in the push buttons 108, and then receive coins or bills equivalent to his/her credits from the coin chute 109 or the bill slot 106, respectively. The player may also use a push button 108 to select coins or bills into which his/her credits are to be converted. The push buttons 108 are preferably lamp buttons, which each include a light-emitting device and lights up when pushed by a player or used in lighting effects during game play.

The speaker 111 is installed inside the cabinet 101, and generates voice announcements and sound effects during game play.

The above-described components of the gaming machine 100 are preferably controlled by a game controller unit that is preferably installed inside the cabinet 101. Alternatively, the game controller unit may be separated from the cabinet 101, and connected through a network to the components of the cabinet 101.

Figure 56:
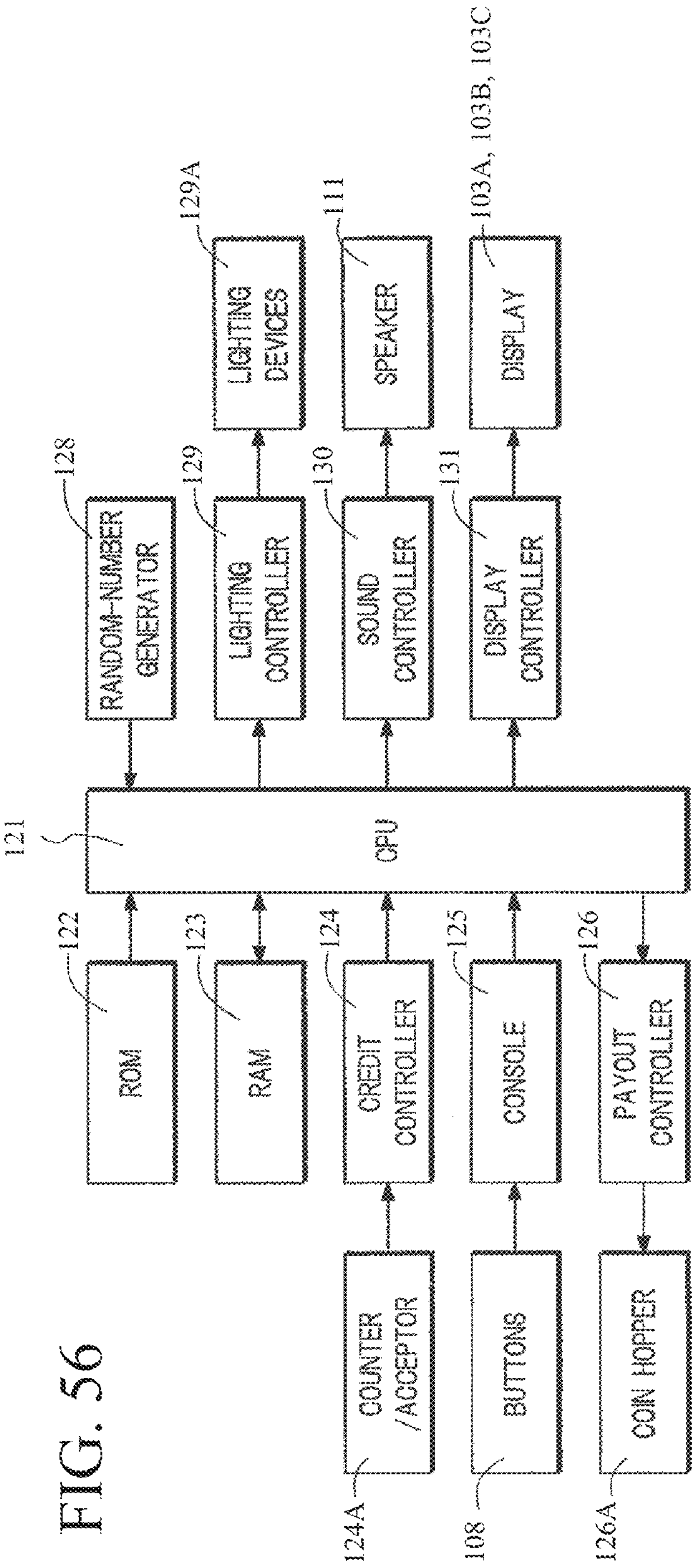
FIG. 56 is a block diagram of the hardware configuration of a game controller unit included in the gaming machine shown in FIG. 55.

Referring to FIG. 56, the game controller unit includes a CPU 121, a ROM 122, a RAM 123, a credit controller unit 124, a console unit 125, a payout controller unit 126, a random-number generator unit 128, a lighting controller unit 129, a sound controller unit 130, and a display controller unit 131.

The CPU 121 executes various programs, and thereby controls other components of the game controller unit according to instructions and data accepted by the console unit 125. The CPU 121 in particular executes a game program, and thereby conducts a game having normal and bonus modes. The ROM 122 stores programs and databases used by the CPU 121. The ROM 122 in particular stores image data for producing two types of game screens 140A and 140B and various symbols 142 on the middle display unit 103B. The RAM 123 temporarily stores variables, parameters, and the like that are used by the CPU 121.

The credit controller unit 124 manages the amount of player's credits, which is equivalent to the amount of coins and bills counted and validated by the counter/acceptor 124A. The console unit 125 monitors the push buttons 108 and accepts various instructions and data that a player enters through the push buttons 108. The payout controller unit 126 changes player's credits to coins, bills, or other monetary data by using the coin hopper 126A or the like.

The random-number generator unit 128 generates and outputs random numbers to the CPU 121 preferably at the start of each round of game. The CPU 121 uses the random numbers to randomly select an arrangement of symbols 142 to be displayed on the video reels 141A-141E when they will stop. Each of the random numbers is uniquely assigned to one of the video reels 141A-141E. The CPU 121 retrieves stop positions of the video reels 141A-141E linked to the random numbers from respective stop position tables. Here, the stop position of a video reel corresponds to types of symbols 142 to be displayed on the video reel when it stopped. The stop position tables are preferably stored in the ROM 122. Each of the stop position tables is assigned to one of the video reels 141A-141E, and represents relationship between random numbers and stop positions of the video reel. Thus, the CPU 121 selects stop positions of the video reels 141A-141E at random.

The random-number generator unit 128 preferably generates the same number of random numbers as the video reels 141A-141E at each normal round, and the same number of random numbers as groups of the video reels 141A-141E at each bonus round. In the case where five video reels 141A-141E are prepared as shown in FIG. 57 and divided into three groups as shown in FIG. 58, the random-number generator unit preferably generates five or three random numbers in each normal or bonus round, respectively. Accordingly, the CPU 121 randomly selects stop positions of all the five video reels 141A-141E or only three thereof 141A-141 C in each normal or bonus round, respectively.

The CPU 121 preferably uses the random numbers to determine whether or not to provide an award to a player at random in the following manner. The CPU 121 retrieves the random numbers from a winning combination table stored in the ROM 122. The winning combination table represents relationship between combinations of random numbers and types of awards. Here, in the stop position tables, the same combination of random numbers as that included in the winning combination table is linked to a stop position of the video reels 141A-141E in which a winning combination appears. Accordingly, a type of an award is assigned to each winning combination appearing on the stopped video reels 141A-141E. Note that the ROM 122 preferably stores two different types of winning combination tables, one used in the normal mode and the other used in the bonus mode. The CPU 121 preferably selects a type of a winning combination table depending on whether a round is in the normal or bonus mode. If the CPU 121 retrieves an award linked to the combination of the random numbers from the selected winning combination table, the CPU 121 then decides to provide the award to a player. More specifically, the CPU 121 will increase the player's credits by a payout, or change the normal mode to the bonus mode.

In the case of the video reels 141A-141E shown in FIGS. 57 and 58, if symbols of the same type appear on three or more consecutive video reels starting from the left end column 141A, the symbols constitute a winning combination. Referring to FIG. 57, three "seven" symbols appear on the stopped video reels consecutively from the first video reel 141A through the third video reel 141C. In this case, the CPU 121 will increase the player's credits by a payout equal to a bet times a factor that corresponds to the three "seven" symbols.

Wildcard symbols can preferably appear on the video reels 141A-141E. Referring to FIG. 57, a "W" symbol 142A represents a wildcard symbol, which can preferably appear on long-type video reels 141B and 141D. A wildcard symbol substitutes for any other type of symbol. If one or more wildcard symbol appear on the video reels 141A-141E in stop positions linked to the random numbers, and if a winning combination is formed by replacing the wildcard symbols with a type of symbols, the combination of the random numbers is preferably assigned to a payout two or four times as much as a payout corresponding to the winning combination. The assignment is achieved in the combination of the winning combination table and the stop position table. The factor of two or four is selected when the winning combination includes one or two wildcard symbols, respectively. In the case of FIG. 57, the "W" symbol 142A substitutes for a "cross" symbol or a "triangle" symbol, whichever is advantageous for a player, preferably. Then, the CPU 121 increases the player's credits by a payout equal to a bet times a factor twice as many as a factor corresponding to three "cross" or "triangle" symbols.

Trigger symbols can preferably appear on the video reels 141A-141E. Referring to FIG. 57, a "star" symbol 142B represents a trigger symbol, which can preferably appear on any video reels 141A-141E. As three "star" symbols 142B shown in FIG. 57, if three or more trigger symbols are scattered on the video reels 141A-141E in stop positions linked to the random numbers in the stop position table, the combination of the random numbers is assigned to a right to play a bonus round in the winning combination table. When the CPU 121 retrieves the right linked to the combination of the random numbers from the winning combination table, the CPU 121 then changes the normal mode to the bonus mode.

At a bonus round, the CPU 121 uses only three random numbers to determine stop positions of the video reels 141A-141E and decide whether or not to provide an award. The types of random numbers are reduced on a condition that symbols 142 are arranged in the same order and at the same positions in each pair or group of the video reels 141A-141E as shown in FIG. 58. Since a symbol arrangement on the video reels 141A-141E is left-right symmetric, the CPU 121 preferably has to determine stop positions of the left three video reels 141A, 141B, and 141C only, and check if symbols of the same type appear on all the three video reels 141A, 141B, and 141C in stop positions. If so, symbols of the same type necessarily appear on other two video reels 141D and 141E because of the left-right symmetry of the symbol arrangement. Accordingly, there is a much better chance that five symbols of the same type appear on all the stopped video reels 141A-141E at a bonus round than at a normal round. As a result, the player has a much better chance of winning a larger amount of payouts at a bonus round than at a normal round.

Referring to FIG. 58, five "seven" symbols appear. In addition, two wildcard symbols, i.e., "W" symbols 142A always appear at the same time in a bonus round, as shown in FIG. 58. In FIG. 58, the two "W" symbols 142A constitute a winning combination together with three "cross" symbols appearing on other three video reels 141A, 141C, and 141E. In this case, the CPU 121 will increase the player's credits by a payout equal to a bet times a factor corresponding to the five "seven" symbols or the group of the three "cross" symbols and the two "W" symbols 142A, whichever is advantageous for a player, preferably. Note that the factor corresponding to the group is four times as many as a factor corresponding to five "cross" symbols, since the group includes two wildcard symbols 142A.

Preferably, trigger symbols, e.g., "star" symbols 142B in FIG. 58, can also appear on the video reels 141A-141E in a bonus round. If three or more trigger symbols appear on the video reels 141A-141E in stop positions linked to the random numbers in the stop position table, the combination of the random numbers is assigned to a right to play a bonus round in the winning combination table. In the case of FIG. 58, if any symbol were replaced with a "star" symbol, the right to play a bonus round would be assigned to the same random numbers as those assigned to the corresponding stop positions of the video reels 141A-141E. When the CPU 121 retrieves the right linked to the combination of the random numbers from the winning combination table, the CPU 121 then continues a next round in the bonus mode.

The lighting controller unit 129 controls lighting devices 129A installed in the three display units 103A, 103B, and 103C, the push buttons 108, and other lumps mounted on the cabinet 101 during game play. The lighting controller unit 129 thereby causes the lighting devices 129A to blink and/or change brightness and color in specific patterns in order to produces lighting effects. The sound controller 130 controls the speaker 111 to output voice announcements and sound effects during game play.

The display controller unit 131 controls the three display units 103A, 103B, and 103C to display various images on screens preferably by using computer graphics and image data stored in the ROM 122. The display controller unit 131 in particular controls video reels in a game screen displayed on the middle display unit 103B by using computer graphics and the image data.

The display controller unit 131 further controls video reels in different manners depending on whether a round of game is in a normal or bonus mode.

On a game screen 140A in a normal round shown in FIG. 57, the display controller unit 131 preferably causes symbols 142 to appear in different orders on different video reels 141A-141E when spinning. Here, information on the orders is preferably stored in the ROM 122. After a predetermined time has elapsed from the start of the spin of the video reels 141A-141E, the display controller unit 131 will preferably stop the video reels 141A-141E one by one in their respective stop positions that the CPU 121 randomly selects at the start of each flotilla' round.

On a game screen 140B in a bonus round shown in FIG. 58, the display controller unit 131 preferably pairs the first video reel 141A with the fifth video reel 141E, and the second video reel 141B with the fourth video reel 141D. Then, the display controller unit 131 preferably arranges symbols 142 in the same order in each pair of video reels. Furthermore, the display controller unit 131 preferably spins each pair of video reels from the same position in synchronization with each other. Here, the display controller unit 131 preferably starts spinning each pair of video reels from the same stop position. Alternatively, the CPU 121 or the display controller unit 131 may adjust the rotation speeds of spinning video reels, and thereby synchronize each pair of video reels from a certain moment when both the video reels locate at the same position. After a predetermined time has elapsed the display controller unit 131 stops the pairs of video reels at the same positions. In other words, the display controller unit 131 maintains a symbol arrangement on the video reels 141A-141E left-right symmetric throughout a bonus round, regardless of whether the video reels 141A-141E spin or stop.

Referring to FIGS. 59 through 64, operations of the gaming machine will be explained below in the order of processes in a round of game.

A player inserts coins or bills into the coin slot 105 or the bill slot 106, respectively. Then, the counter/acceptor 124A validates the coins and bills, and counts the valid coins and bills. The game controller unit reads the count and updates credit data stored in the RAM 123 to increase player's credits by the number corresponding to the count. Then, the game controller unit starts a normal round of game. When the console unit 125 accepts a bet placed by the player through the buttons 108, the game controller unit enables the console unit 125 to accept a cue to start spinning of video reels 141A-141E from a spin button, one of the buttons 108. When the console unit 125 detects a push of the spin button 108, the game controller unit updates the credit data stored in the RAM 123 to decrease the amount of the credits by the amount of the bet.

The game controller unit causes the random number generator unit 128 to generate five random numbers. The game controller unit then retrieves stop positions of the video reels 141A-141E linked to the five random numbers from respective stop position tables. Thus, the game controller unit selects stop positions of the video reels 141A-141E at random, and stores data representing the stop positions into the RAM 123, preferably.

The game controller unit also retrieves the five random numbers from a winning combination table for use in the normal mode. If the game controller unit retrieves an award linked to the combination of the five random numbers from the winning combination table, the game controller unit then decides to provide the award to the player.

Figure 59:
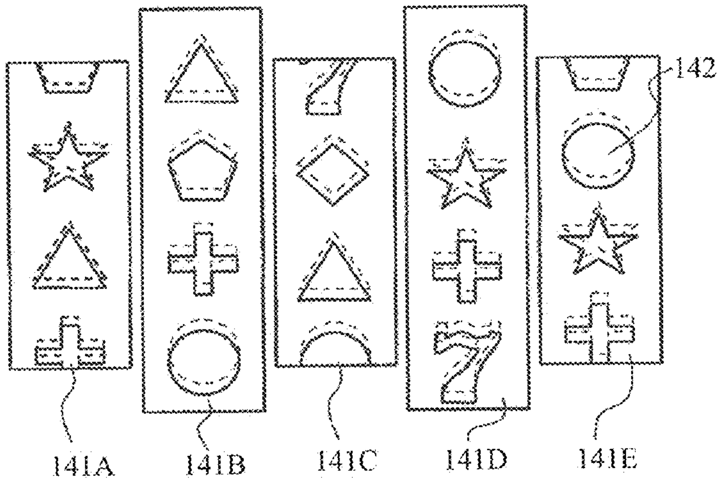
FIG. 59 shows an example of moving symbols at a normal round.

The game controller unit instructs the display controller unit 131 to cause the middle display unit 103B to start spinning the video reels 141A-141E. Then, the video reels 141A-141E start spinning as shown in FIG. 59. Symbols 142 appear in different orders on different video reels 141A-141E.

Figure 60:
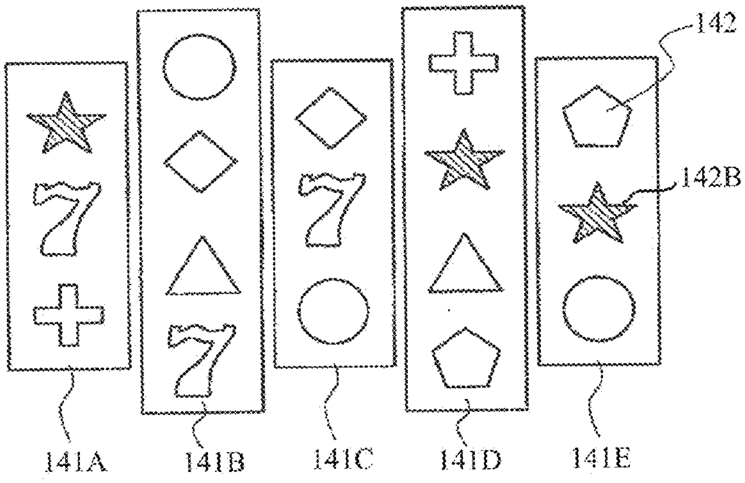
FIG. 60 shows an example of stopped symbols at a normal round.

At predetermined time intervals, the display controller unit 131 causes the middle display unit 103B to stop the video reels 141A-141E one by one into their respective stop positions selected by the game controller unit. Then, the video reels 141A-141E stop in positions as shown in FIG. 60. If the game controller unit has decided to provide no award to the player, the game controller unit finishes the normal round, and then waits until the console unit 125 accepts a new bet or an instruction from the player. If instructed by the player, the game controller unit may convert his/her credits into cash or the like by using the payout controller unit 126.

If the game controller unit has decided to provide the player with a payout, a corresponding winning combination appears on the stopped video reels 141A-141E. Referring to FIG. 60, three "seven" symbols appear consecutively from the first video reel 141A through the third video reel 141C. The game controller unit then controls visual and sound effects representing the winning of the payout by providing the lighting controller unit 129 and the sound controller unit 130 with commands. The lighting controller unit 129 then turns on and off the lighting devices 129A in patterns represented by the commands. The sound controller unit 130 changes sounds produced from the speaker 111 to the sound effects represented by the commands. After that, the game controller unit updates the credit data stored in the RAM 123 to increase the player's credits by a payout to be provided as an award. In the case of FIG. 60, the payout is equal to a bet times a factor that corresponds to three "seven" symbols. If instructed by the player, the game controller unit may provide him/her with the payout in cash or the like by using the payout controller unit 126.

If the game controller unit has decided to provide the player with a right to play a bonus round, three or more trigger symbols are scattered on the stopped video reels 141A-141E. Referring to FIG. 60, three "star" symbols 142B appear as the trigger symbols on the first video reel 141A, the fourth video reel 141D, and the fifth video reel 141E. The game controller unit then instructs the lighting controller unit 129 and the sound controller unit 130 to produce specific visual and sound effects. The game controller unit further starts a bonus round.

The game controller unit preferably conducts a bonus round for free, i.e., allows a fixed bet to be placed without reducing the player's credits. Note that the game controller unit may use a portion of the player's credits as a bet.

At the start of a bonus round, the game controller unit enables the console unit 125 to accept a cue to start spinning of video reels 141A-141E from a spin button. When the console unit 125 detects a push of the spin button 108, the game controller unit causes the random number generator unit 128 to generate three random numbers. The game controller unit then retrieves stop positions of the left three video reels 141A-141 C linked to the three random numbers from respective stop position tables. Thus, the game controller unit stores data representing the stop positions into the RAM 123, preferably.

The game controller unit also retrieves the three random numbers from a winning combination table for use in the bonus mode. If the game controller unit retrieves an award linked to the combination of the three random numbers from the winning combination table, the game controller unit then decides to provide the award to the player.

Figure 61:
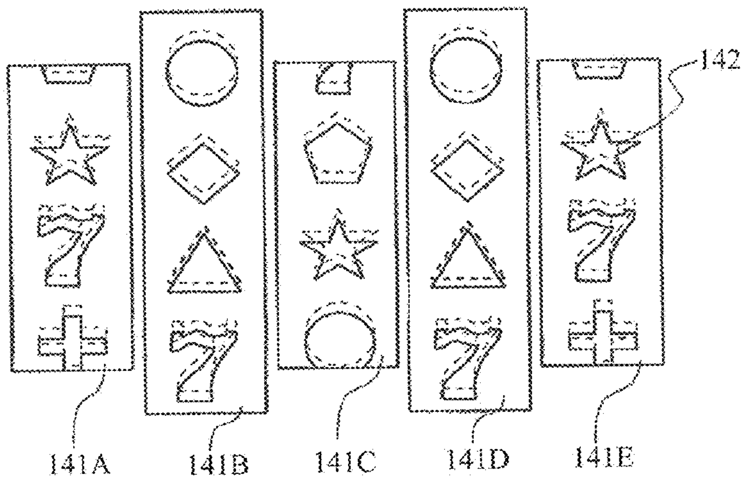
FIG. 61 shows an example of moving symbols at the start of a bonus round.

The game controller unit instructs the display controller unit 131 to cause the middle display unit 103B to start spinning the video reels 141A-141E. Then, the video reels 141A-141E start spinning as shown in FIG. 61. Here, the display controller unit 131 pairs the first video reel 141A with the fifth video reel 141E, and the second video reel 141B with the fourth video reel 141D. Then, the display controller unit 131 arranges symbols 142 in the same order in each pair of video reels. Furthermore, the display controller unit 131 starts spinning each pair of video reels from the same stop position in synchronization with each other. More specifically, the display controller unit 131 always causes the same symbols to appear on the pair of the first video reel 141A and the fifth video reel 141E. Similarly, the display controller unit 131 always causes the same symbols to appear on the pair of the second video reel 141B and the fourth video reel 141D. Alternatively, the display controller unit 131 may adjust the rotation speeds of the video reels 141A-141E after they start spinning, and thereby synchronize each pair of video reels from a certain moment when both the video reels locate at the same position. As a result, the display controller unit 131 maintains a symbol arrangement on the video reels 141A-141E left-right symmetric throughout a spin of the video reels 141A-141E as shown in FIG. 61.

At predetermined time intervals, the display controller unit 131 causes the middle display unit 103B to stop the video reels 141A-141E pair by pair into their respective stop positions selected by the game controller unit. Preferably, the display controller unit 131 stops the pairs in the order from outermost to innermost as follows.

Figure 62:
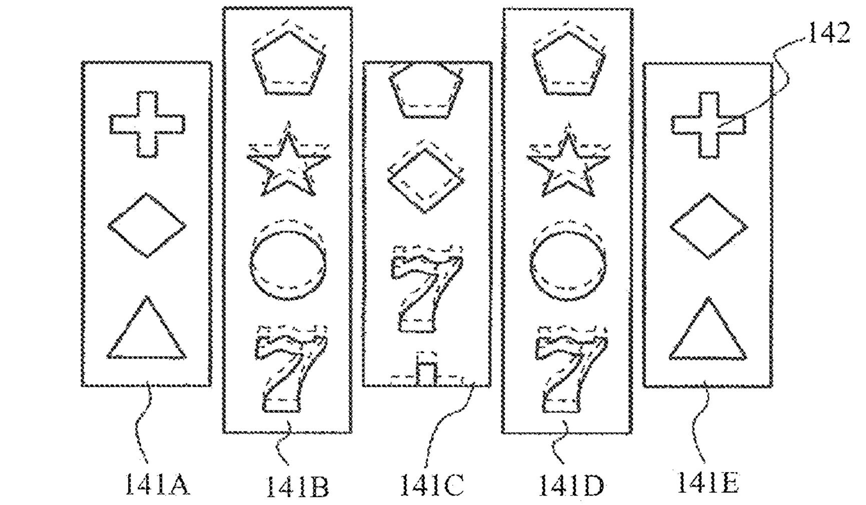
FIG. 62 shows an example of symbols displayed at the stop of symbols in the outermost columns in the bonus round.

First, the display controller unit 131 stops the outermost pairs, i.e., the pair of the first video reel 141A and the fifth video reel 141E in the same stop position as shown in FIG. 62. Here, the game controller unit has determined only the stop position of the first video reel 141A. Accordingly, the game controller unit instructs the display controller unit 131, or the display controller unit 131 itself decides to match the stop position of the fifth video reel 141E with the stop position of the first video reel 141A.

Figure 63:
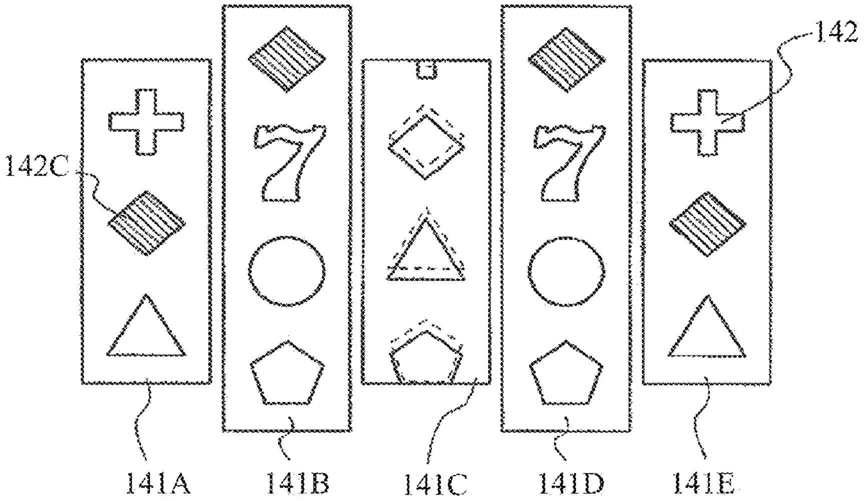
FIG. 63 shows an example of symbols displayed at the stop of symbols in the next inner columns in the bonus round.

Second, the display controller unit 131 stops the next inner pairs, i.e., the pair of the second video reel 141B and the fourth video reel 141D in the same stop position as shown in FIG. 63. Here, the game controller unit has determined only the stop position of the second video reel 141B. Accordingly, the game controller unit instructs the display controller unit 131, or the display controller unit 131 itself to match the stop position of the fourth video reel 141D with the stop position of the second video reel 141B.

Referring to FIG. 63, four "diamond" symbols 142C has already appeared on the stopped four video reels 141A, 141B, 141D, and 141E, before the stop of the third video reel 141C. If a "diamond" symbol appear on the third video reel 141C when it will be stopped, a payout equal to a bet times a factor that corresponds to five "diamond" symbols promises to be provided to the player. In this manner, if two symbols of the same type appear on the first video reel 141A and the second video reel 141B, chances are much better that a larger amount of a payout corresponding to five symbols of the same type is won, since two symbols of the same type also appear on the fourth video reel 141D and the fifth video reel 141E. Thus, the left-right symmetric arrangement of symbols as shown in FIG. 63 effectively raises player's expectations for winning a larger amount of payouts.

Finally, the display controller unit 131 stops the third video reel 141C in a stop position determined by the game controller unit in advance.

If the game controller unit has decided to provide no award to the player in advance, at most two symbols of the same type appear on the stopped video reels 141A-141E. The game controller unit finishes the bonus round, and then starts the next bonus round.

Figure 64:
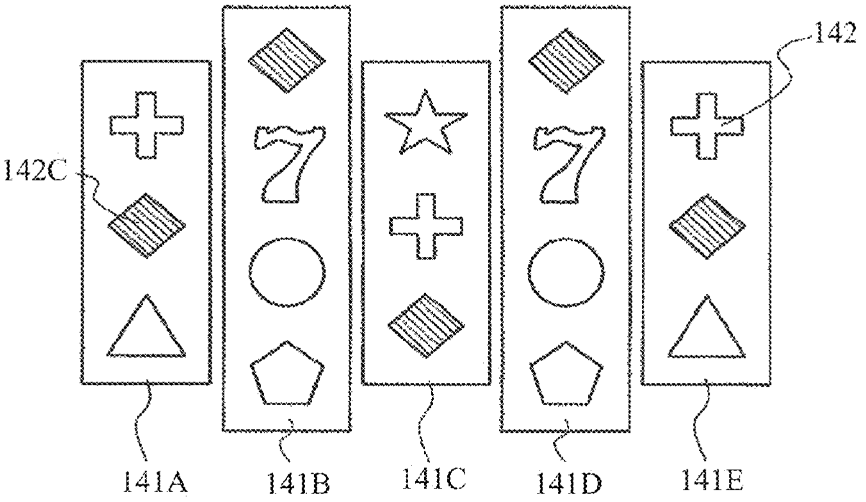
FIG. 64 shows an example of stopped symbols displayed in the bonus round.

If the game controller unit has decided to provide the player with a payout, a corresponding winning combination appears on the stopped video reels 141A-141E. Referring to FIG. 64, five "diamond" symbols 142C appear on all the stopped video reels 141A-141E. The game controller unit then instructs the lighting controller unit 129 and the sound controller unit 130 to produce visual and sound effects for informing a player of winning an award. After that, the game controller unit updates the credit data stored in the RAM 123 to increase the player's credits by a payout to be provided as an award. In the case of FIG. 64, the player wins a payout equal to a bet times a factor that corresponds to five "diamond" symbols. In such a manner, there is a much better chance that a player wins a larger amount of payouts in a bonus round than in a normal round. If the game controller unit has decided to provide the player with a right to play a bonus round, three or more trigger symbols 142B are scattered on the stopped video reels 141A-141E in a similar manner to FIG. 60. The game controller unit then instructs the lighting controller unit 129 and the sound controller unit 130 to produce specific visual and sound effects. The game controller unit further starts the next bonus round.

If a predetermined times of bonus rounds has been finished, the game controller unit changes the bonus mode to the normal mode, and waits until the console unit 125 accepts a new bet or an instruction from the player. If instructed by the player, the game controller unit may convert his/her credits into cash or the like by using the payout controller unit 126.

In the above-described manner, the game controller unit determines an arrangement of symbols on the condition that symbols are arranged in the same order and at the same positions in two or more columns at a bonus round. Accordingly, chances are fairly better that a winning combination will appear in the arrangement in a bonus round than in a normal round. Furthermore, the display controller unit 131 causes the middle display unit 103B to spin the two or more columns of symbols from the same position in synchronization with each other as shown in FIGS. 61-63. This effectively raises player's expectations for winning an award. On the other hand, the condition is easy to impose on the game controller unit. The display controller unit 131 can easily control the two or more columns of symbols spinning in the above-mentioned synchronized manner. Thus, the gaming machine can provide a player with a better chance of winning an award in a simple manner, and cause the player to recognize the chance through simple and clear visual effects, without any heavy burden on game designers and developers.

Note that symbols may be arranged in a square lattice on a game screen. In this case, each vertical line of the square lattice forms a video reel. All horizontal lines and/or slanted lines of the square lattice are preferably selectable as paylines. A player guesses on which payline a winning combination, e.g., three or more aligned symbols of the same type will appear, and then places a bet on a desired payline before symbols are changed in their arrangement. If a winning combination appears on the payline where the player has placed a bet, the player will win an amount of a payout that depends on the amount of the bet and the type of the winning combination. When a game is conducted by this rule, the gaming machine arranges symbols on left-right symmetric video reels in a bonus round. This also enables the gaming machine to provide a player with a better chance of winning an award in a simple manner, and cause the player to recognize the chance through simple and clear visual effects, without any heavy burden on game designers and developers.

The video reels 141A-141E may be replaced with mechanical reels. In this case, the same symbol sequences are displayed or printed on the circumferential surfaces of the first and fifth reels. Similar is true for the second and fourth reels.

Figure 65:
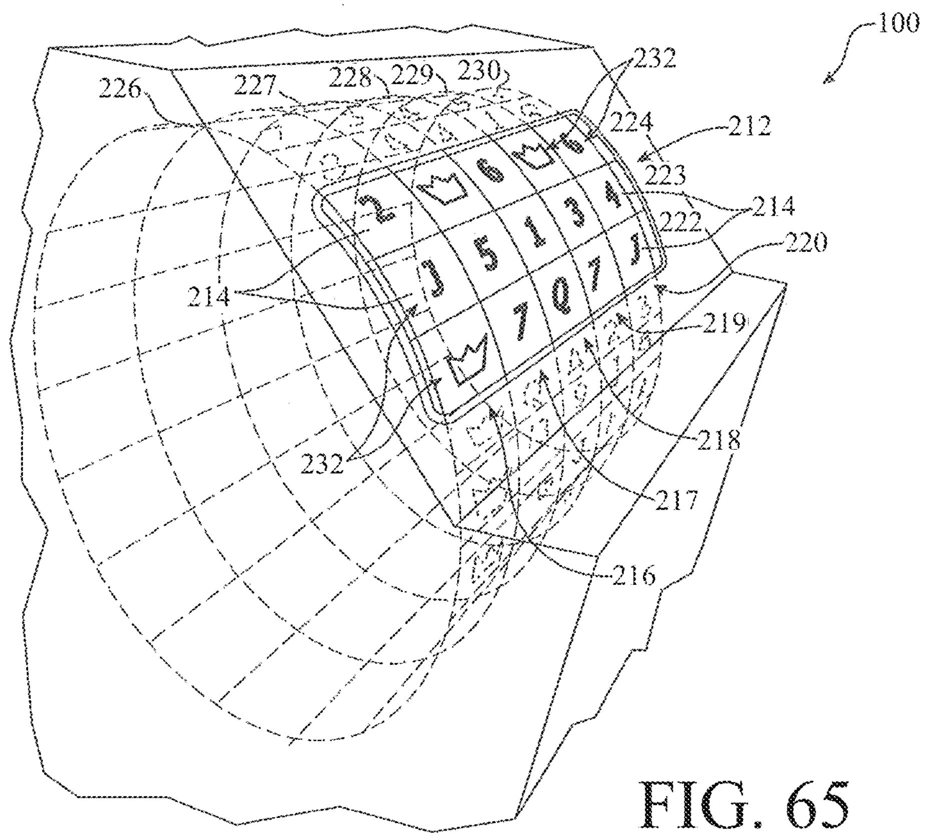
FIG. 65 is a partial view of a gaming machine with a display showing a matrix of elements and symbols comprising portions of simulated rotatable reels.
Figure 66:
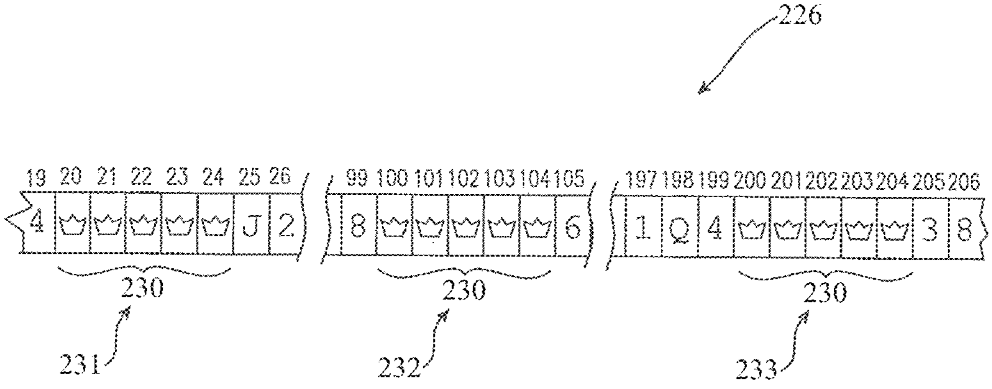
FIG. 66 is a schematic representation of the elements and symbols of portions of the first or left-most rotatable reel of FIG. 65.

With reference to FIGS. 65 and 66, in the illustrated embodiment the gaming machine 100 is provided with a display 212, showing portions of a number of adjoining simulated rotatable reels 226 to 230. Each reel is divided into a given number of elements, for example 256 elements. In this example, when rotatable reels 226 to 230 are at rest, the display shows a matrix of elements 214 in five columns, 216 to 220 and three rows, 222 to 224, so that each column comprises a three-element portion of the respective simulated rotatable reel. Each element 214 of simulated rotatable reels 226 to 230 is arranged to display a symbol 232. With some exceptions, as explained below, the sequence of symbols within the elements of a reel remains fixed for all games played.

A game controller (not shown) pre-selects at random, at the initiation of a game sequence, a potential win element for each reel from the set of elements. That is, the game controller predetermines which element, and therefore which symbol, will be displayed in a pay line position at the end of a game sequence, and may therefore contribute to a winning outcome.

In this first preferred embodiment of the invention, at least one reel, the first left-most reel, is arranged to have at least one run of an identical symbol in each of a number of consecutive elements. The arrangement is shown schematically in FIG. 66 where portions of the left-most reel 226 are shown in strip form and, for example, a run of kings (crown symbol) is arranged for display in runs of five consecutive elements 230 at three locations 231 to 233 respectively. The three runs of consecutive elements in this example are elements 20 to 24, 100 to 104 and 200 to 204, within the 256-element length of the strip. In this preferred embodiment, the number of elements in a run and the location of the consecutive run or runs within the strip are predetermined and remain constant for each game played on the machine. The identical symbol which populates these consecutive run or runs of elements may be considered as one of a set of "inner reel" symbols.

Figure 67:
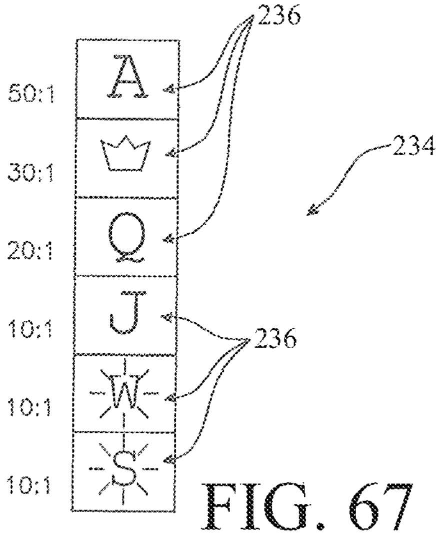
FIG. 67 is a schematic representation of an “inner reel” or look-up table.

The game controller (not shown) determines the identical symbol to be displayed in each consecutive element of the run or runs of consecutive elements in which the symbol is to be shown. The selection of the identical symbol is through a notional rotation of an "inner reel" 234 shown as a strip of elements and symbols in FIG. 67. This "inner reel" is in effect a look-up table and is not displayed, but its simulated rotation and "coming to rest" determines which symbol will populate the run or runs of consecutive elements of the left-most reel.

The symbols of the "inner reel" or look-up table from which the selection is made, are a sub-set of the set of symbols displayed in the remaining non-"inner reel" elements of the left-most reel. Thus, where the symbols are those of a suit of cards, the "inner reel" symbols may be those of the Ace, King, Queen and Jack, sometimes called the trump or court cards. The look-up table could also include a "wild" or "scatter" symbol. As previously noted, the arrangement or ordering of the symbols in the elements of the reel, other than the consecutive run or runs of elements, remain constant for every game, only the selection of the identical symbol from the look-up table is performed anew for each new play of a game.

The symbols 236 of the look-up table 234 need not all have the same probability of selection but may be assigned a hierarchy of probability. Thus for example, those symbols for which a winning combination confers on the player of a game a relatively higher value prize, such as the ace and the king, may have an inversely proportional probability of being selected as an "inner reel" symbol.

The reels are now spun as normal. The player will notice the run or runs of identical symbols passing through the display 212 for each revolution of the left-most reel 226, thereby providing a heightening of interest, since the odds of a winning arrangement of symbols appearing on a pre-defined pay line in the matrix at the conclusion of the game sequence will be increased.

In another embodiment of the invention, the second reel, that is the second reel from the left in this example, may also be modified to include at least one run of consecutive elements displaying the same "inner reel" symbol as that used to populate the elements of the consecutive run or runs of the left-most reel. As for the first, left-most reel, the number and location of the consecutive elements of the potential run or runs within the strip of elements forming the simulated reel, is predetermined and remains constant.

Prior to modification, all the elements of the second reel (and likewise those of the third fourth and fifth reel) are randomly populated with symbols from the set of available symbols. Unless modification is triggered in the manner explained below, the ordering of these symbols within the elements of the reels remains constant for every game; only those symbols of the potential run or runs being displaced should a modifying event occur.

Figure 68:
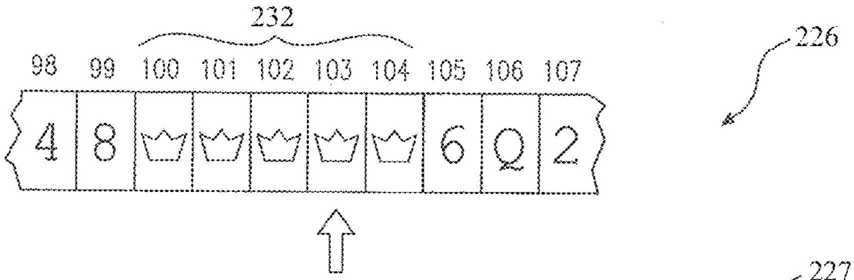
FIGS. 68-70 are schematic representations of portions of the reel of FIG. 66 and of the adjoining second reel for a particular game situation.
Figure 69:
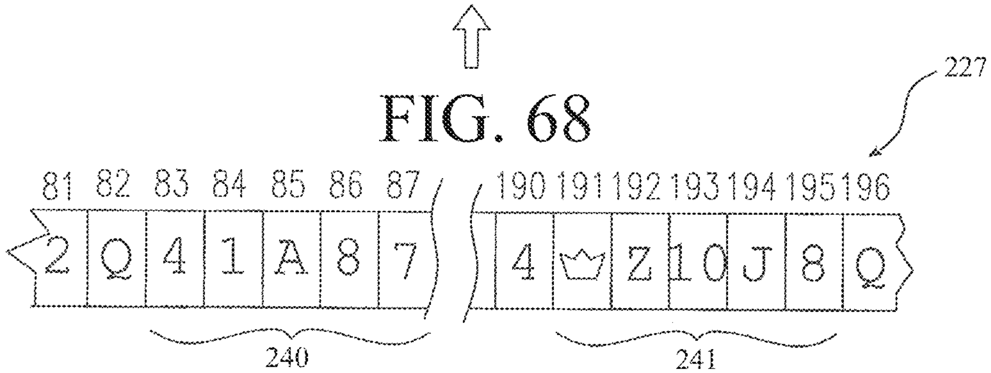
Figure 70:
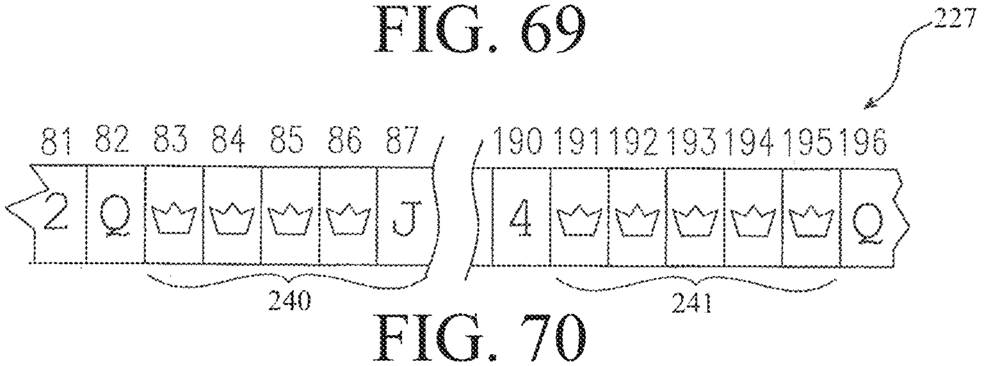

The populating of the potential "inner reel" elements of the second reel, and of any subsequent reels, is dependent on the potential win element for the first, or preceding reel, which was randomly selected by the game controller, lying within a run of consecutive elements of that reel. For example if, as shown in FIG. 68, in the left-most reel 226, which has consecutive runs comprising the elements as numbered in the embodiment above, the potential win element selected is element number 103, the second reel 227 will be modified. Second reel 227 in this example has two potential runs 240 and 241 of consecutive "inner reel" elements, element numbers 83 to 87 and 191 to 195 respectively, which in a default state are randomly populated from the set of available symbols as shown in FIG. 69. However, because the selected potential win element 103 of reel 226 falls within run 232, the potential "inner reel" elements 83 to 87 and 191 to 195 of reel 227 are replaced with the same identical symbol as used for the consecutive run or runs of the left-most reel 226 as shown in FIG. 70.

A player will now discern a bias of symbols, (in our example crown symbols), in both the first, left-most, and second reels as these are spun during the play of a game. The effect is clearly an increase in the probability of a winning combination of symbols appearing along a pre-defined pay line within the matrix and consequently a raised level of interest in the outcome of the game for the player.

The same process of populating potential "inner reel" elements with the "inner reel" symbol of the preceding reel, may be sequentially applied to the third, fourth and fifth reels. As described for the second reel, the modification of a succeeding reel depends on the selected potential win element of the preceding reel falling within a run of "inner reel" elements of that reel.

In another embodiment of the present invention, a player is made aware of the populating of one or more consecutive runs of the left-most reel with the identical symbol. This may be done prior to the main game sequence, for example, by a slower pre-spin of only the left-most reel. If any further reels are so populated, each may be pre-spun sequentially.

The displayed game rules and experience will alert a player to the fact that the potential winning element for a given reel is positioned somewhere within the run, or one of the runs of consecutive elements populated with the identical symbol if the second and any subsequent reels are also pre-spun to display a run or runs of that symbol. The player will appreciate that the probability of a winning combination occurring increases with each additional reel which is pre-spun to display its run or runs of elements with the same symbol.

The above described embodiments may be applied to a main game of a gaming machine or to a feature game offered as a result of some triggering event in a main game.

In a preferred embodiment of the invention as adapted for a feature game, the number of elements comprising a run of identical "inner reel" symbols and the number of such runs in any given reel is not constant but may be determined in a number of ways. Thus, in at least one preferred embodiment, the number of elements comprising a run may be a function of the amount of a bet placed by the player on the main game which triggered the feature game, or as a function of accumulated throughput of bets over a given time period. In one special case, all the elements of the first left-most reel may be populated by the same "inner reel" symbol.

Likewise, the number of runs in a given reel may be a function also of the betting pattern preceding the conferring of the feature game or alternatively, may be a function of the particular triggering event of the main game which led to the feature game.

Figure 71:
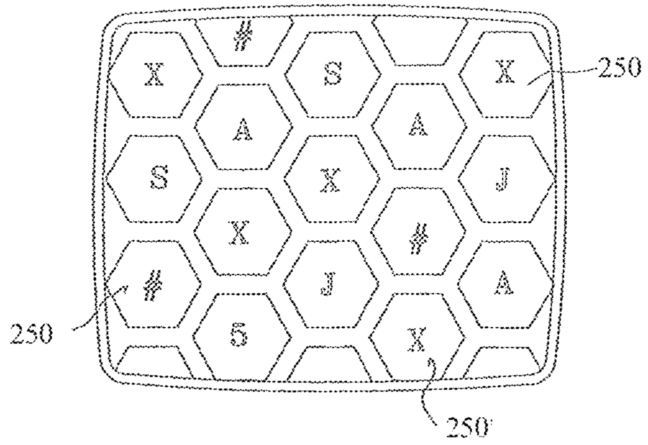
FIGS. 71 and 72 show examples of the display of FIG. 65 during play of a game using hexagonal elements.
Figure 72:
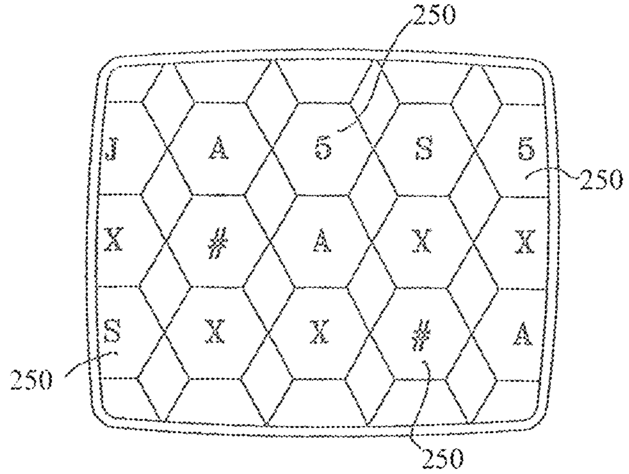

In another embodiment, the elements comprising the matrix of elements of any of the above described embodiments may also be of conventional rectangular configuration, but in at least one preferred embodiment the delineation of an element, that is, the boundary defining the field containing a symbol, may be any N-sided figure, where N may take the value 1 (thus a circular field) or any value from 3 to 20. In at least one preferred form of N-sided element, as shown in FIGS. 71 and 72, the elements 250 are hexagon shape for the value of N=6.

Game Implementation

Figure 73:
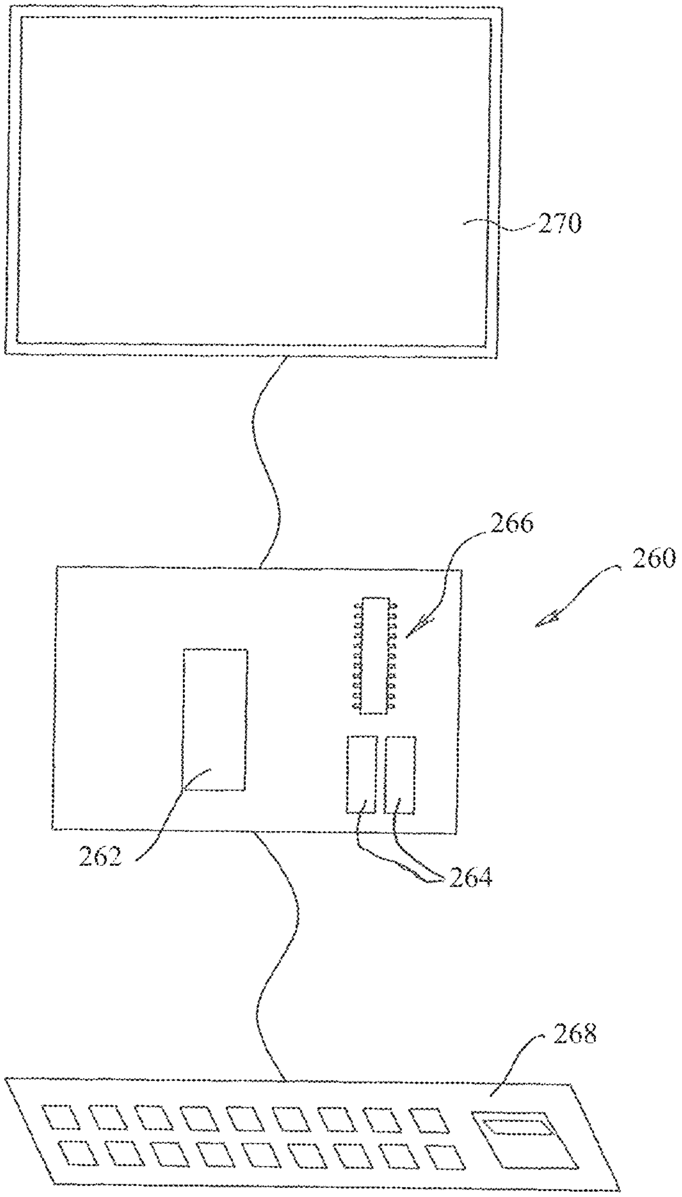
FIG. 73 is a schematic representation of a control module, input keyboard and display for implementing the game embodiments of FIGS. 65-72.

Any of the above described embodiments may be implemented on any gaming machine or group of gaming machine provided with a control module. As shown in FIG. 73, a control module 260 is provided with a microprocessor 262 and working random access memory (RAM) 264. The program code driving any of the described embodiments may be introduced into the control module 260 by connection of a data storage device 266. The device may take any of a number of forms, such as read only memory (ROM), erasable read only memory (EPROM), Compact Flash Card, PCMCIA card and the like. Alternatively, control module 260 may incorporate a hard disc drive to which the code may be written via a suitable input device.

Control module 260 acts to implement appropriate elements of the program code according to inputs from a user keyboard 268 and outputs video imagery to at least a main display module 270.

1. Stand-Alone Gaming Machines

Figure 74:
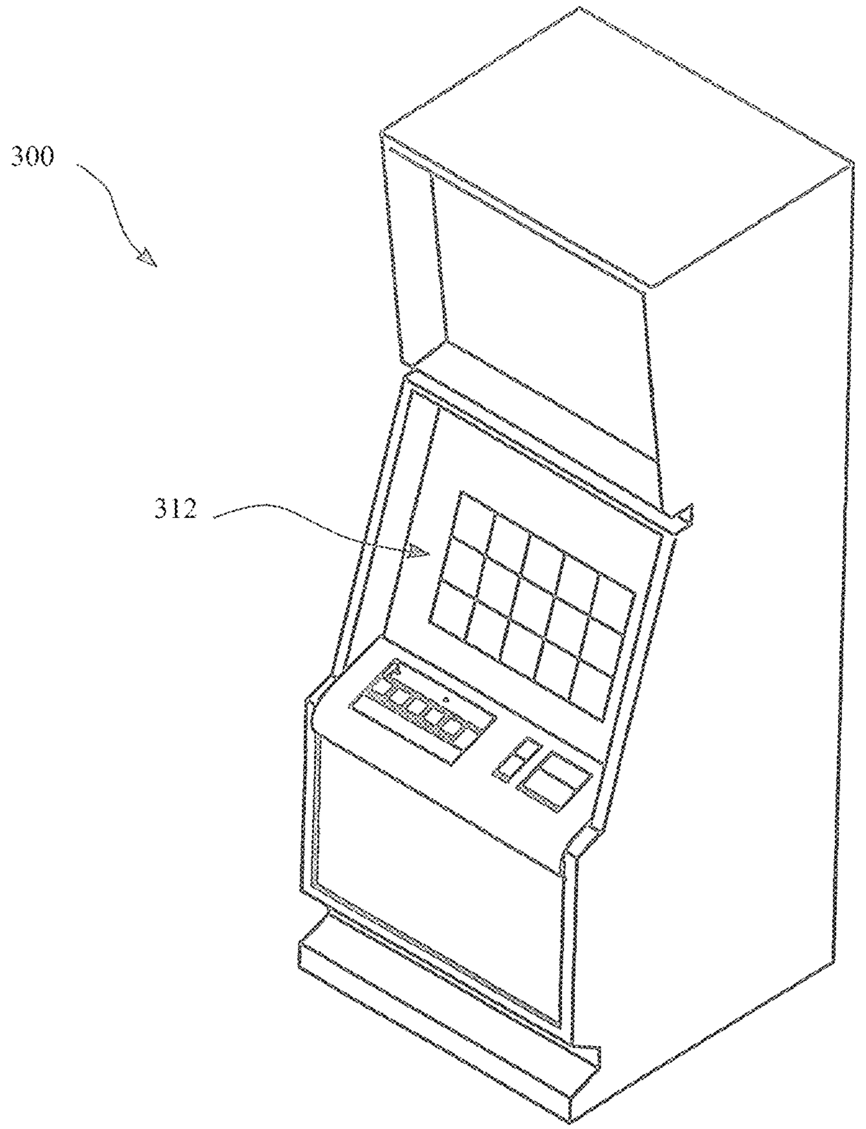
FIG. 74 is a perspective view of a stand-alone gaming machine with a single display unit.

As shown in FIG. 74, any of the above described embodiments for use on electronic display gaming machines may be incorporated into a stand-alone gaming machine 300 provided with a single display unit 312. In this implementation of games according to the invention, both main games and feature games (if offered) are displayed on the single display unit.

2. Stand-Alone Gaming Machines with Secondary Display Unit

Figure 75:
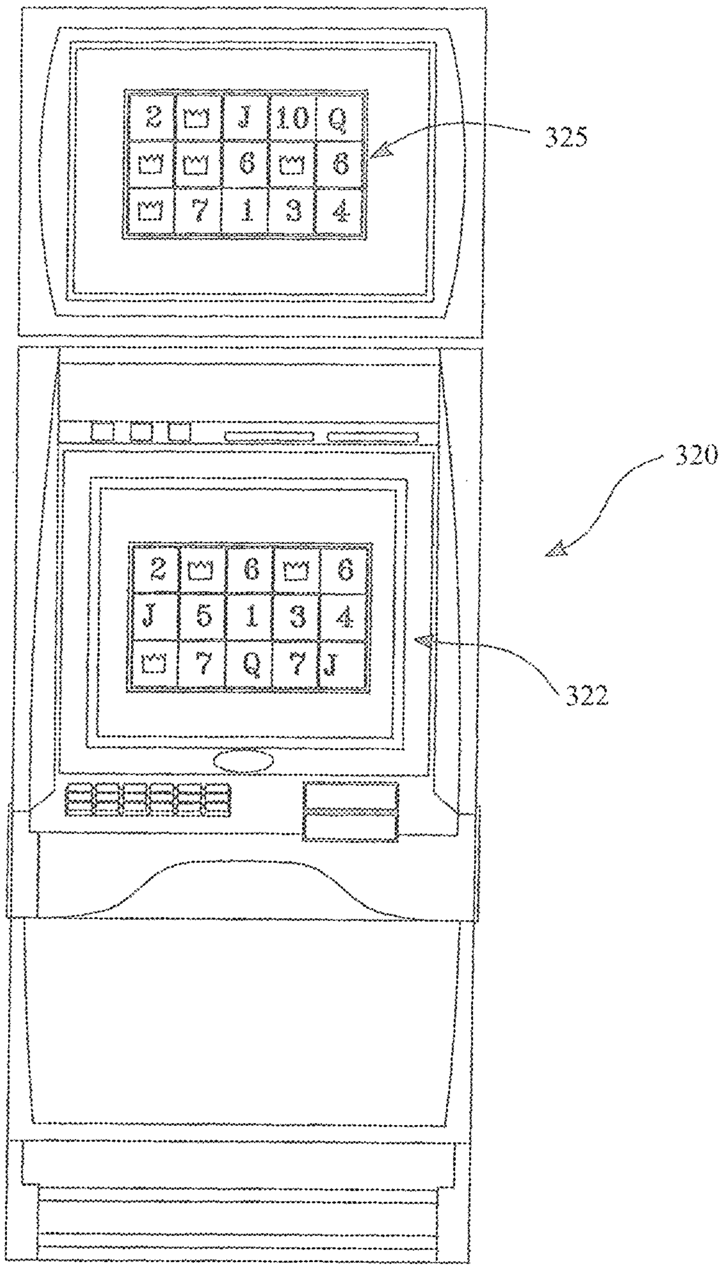
FIG. 75 is a front view of a stand-alone gaming machine with a main display and a secondary display unit.

In a further preferred embodiment of the invention as shown in FIG. 75, a stand-alone gaming machine 320 is provided with a secondary display unit 325 as well as a main display unit 322. In this embodiment the main game played on the primary display unit may take the form of either the first or second preferred embodiments described above. It is then a triggering event in the main game which offers a player a feature game as described in the third preferred embodiment above.

3. Gaming Machines Linked to Progressive Jackpot System

Figure 76:
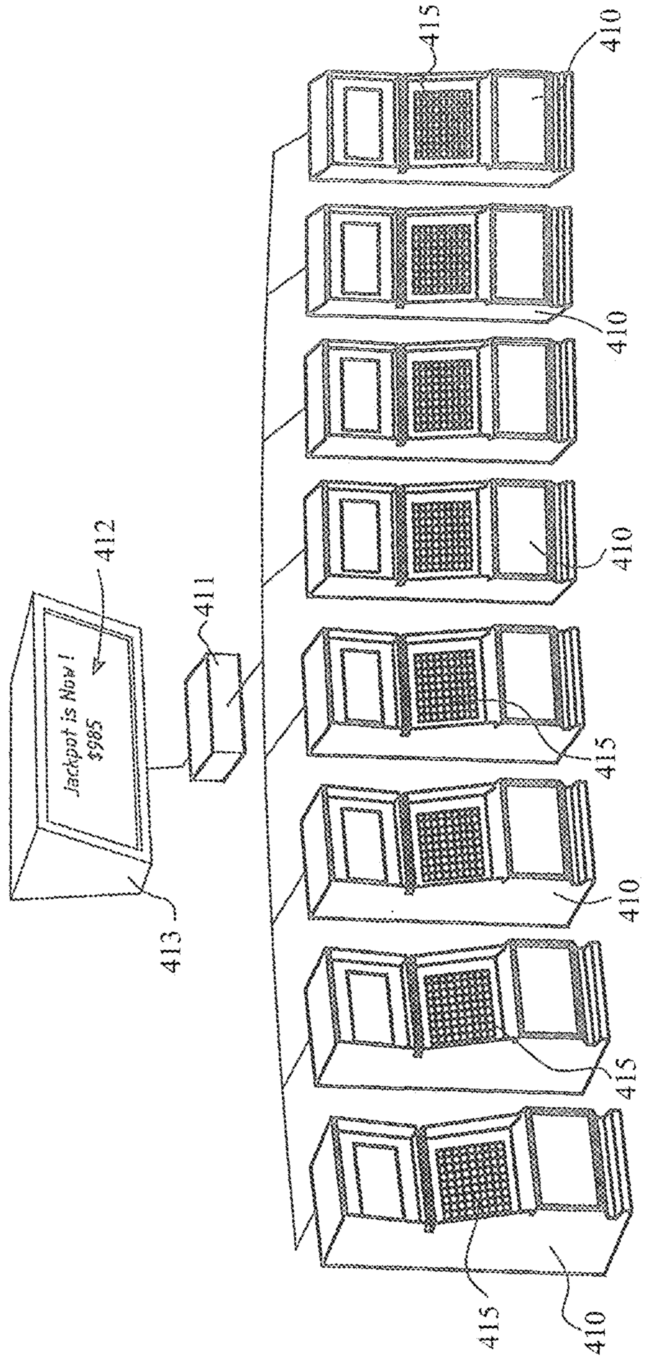
FIG. 76 is a perspective view of a number of the gaming machines of FIG. 74 or 75 when linked to a progressive jackpot system.

In yet a further preferred embodiment of the invention as shown in FIG. 76, a plurality of gaming machines 400 are arranged side by side in a line or arc so as to allow each of the players (not shown) of the machines to view a common jackpot prize display unit 413. Each individual machine 410 is provided with at least a main game display unit 415 for the playing of a main game according to the above described first and second embodiments.

Each of machines 410 of the embodiment illustrated in FIG. 73 is electronically linked to a jackpot control module 411 which monitors the volume of play on each of the linked machines and displays an incrementing jackpot value 412 determined according to the combined volume of play on the linked machines.

A win of the jackpot prize may be triggered by specific outcomes of either a main game or of a feature game. If the jackpot trigger is dependent on an outcome of the feature game, players on adjoining machines may be made aware by means of the common display that a potential triggering of the jackpot is to commence on the machine offered the feature game, thus adding interest for all the players.

It will be appreciated that the linked machines may form part of Local Area Networks (LAN) or Wide Area Networks (WAN).

Figure 77:
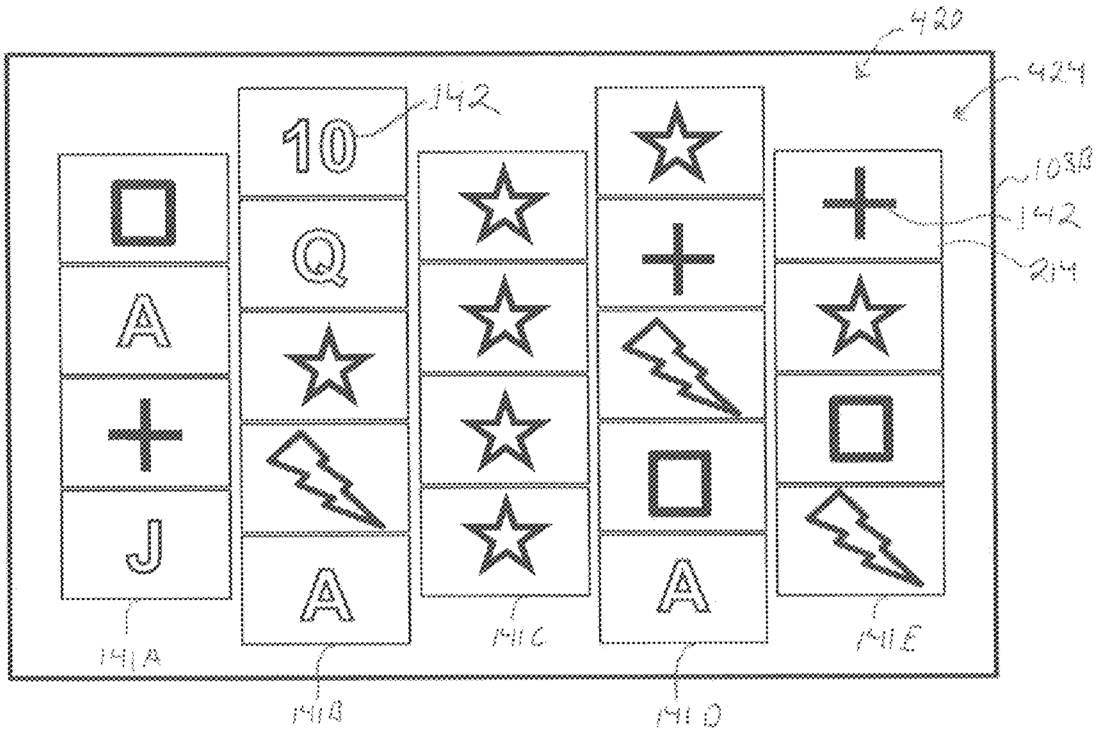
FIG. 77 is a graphical display showing a screen display example of a first initiation of a game which is displayed on the gaming machine shown in FIG. 55, according to an embodiment of the present invention.

FIG. 77 is a graphical display showing a screen display 140A of a first instance 420 of a game. FIGS. 78-81 are graphical displays of a second instance 422 of the game. In the illustrated embodiment, the game controller 121 initiates the first instance 420 of the game, randomly generates an outcome 424 of the first instance 420, and displays the first instance outcome 424 (shown in FIG. 77) of the game on the display device 103B. The game controller 121 is configured to detect a triggering condition in the first instance outcome 424 and initiate the second instance 422 of the game upon detecting the triggering condition in the first instance 420. The game controller 121 determines an outcome 426 of the second instance 422 and spins and stops the reels 141A-141E to display the second instance outcome 426 (shown in FIG. 80) on the display device 103B. In the illustrated embodiment, the game controller 121 displays the second instance outcome 426 including synchronizing at least two reels, such as reels 141B and 141D, such that the synchronized reels 141B and 141D display the same symbol 142 in the same symbol elements 214 in the second instance outcome 426. More specifically, the game controller 121 selects at least two of the reels 141A-141E and synchronizes the selected reels 141A-141E in the second instance 422.

In one embodiment, before spinning the reels 141A-141E to display the second instance outcome 426, the game controller 121 may rotate the selected reels 141B and 141D to synchronize the display of the symbols 142. In another embodiment, the game controller 121 may spin the reels 141B and 141D and adjust a rotation of the selected reels 141B and 141D to synchronize the display of the symbols 142 while the reels 141B and 141D are spinning (shown in FIGS. 78-80).

In the illustrated embodiment, the game controller 121 selects a first group 428 of reels such as, for example, reels 141B and 141D, and selects a second group 430 of reels such as, for example, reels 141A and 141E. During the second instance 422 of the game, the game controller 121 synchronizes reels 141B and 141D of the first group 428 to display the same symbol 142 in the same symbol positions 214, and synchronizes reels 141A and 141E of the second group 430 to display the same symbols 142 in the same symbol position 214 (shown in FIG. 78-80).

The game controller 121 may also display the selected reels 141B and 141D having a run of consecutive elements 230, for example, a run of consecutive symbol positions 232, and display the same symbol 142 in each consecutive symbol position 232. During the second initiation 420, the game controller 121 may randomly select the same symbol 142 and/or similar symbols 142 to be displayed in each of the consecutive symbol positions 232. In addition, the game controller 121 synchronizes the selected reels 141B and 141D to synchronize the display of the consecutive symbol positions 232. In one embodiment, the game controller 121 may populate the run of consecutive elements 232 in each of the selected reels 141B and 141D while the reels 141B and 141D are spinning such that the player is made aware of the population of the run of consecutive elements with the same symbols 142.

Figure 81:
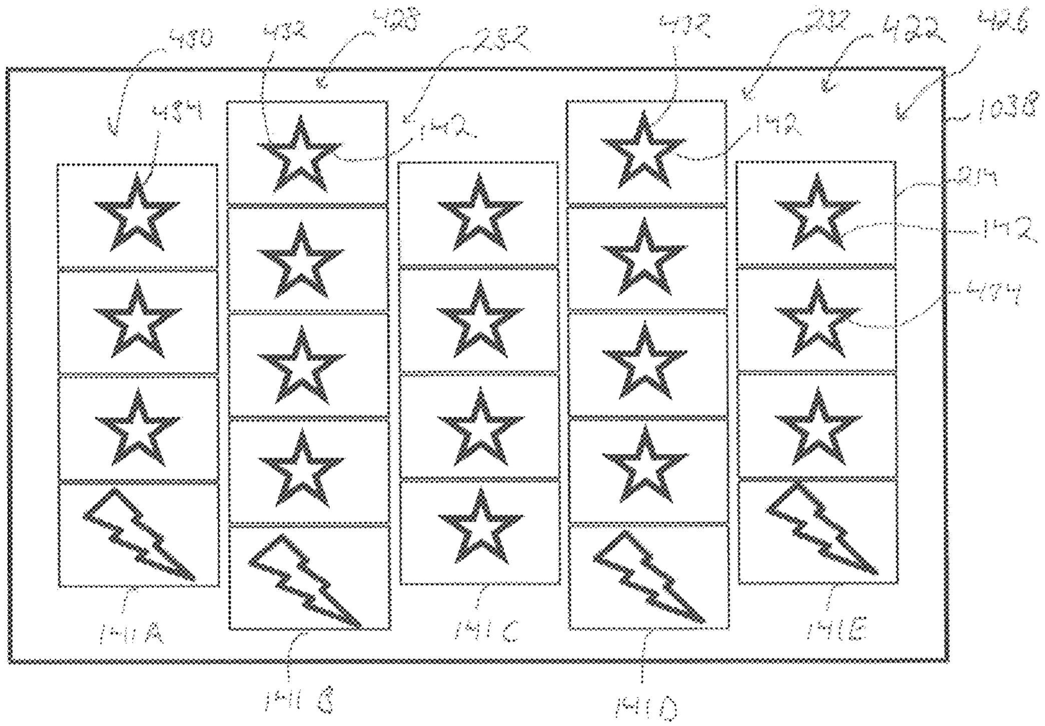
FIG. 81 is another graphical display showing a screen display example of stopped symbols at the second initiation of the game.

In one embodiment, illustrated in FIG. 81, the game controller 121 may display the first group 428 of reels and the second group 430 with a run of consecutive elements 232. During the second instance 422, the game controller 121 may populate the run of consecutive elements 232 in the first group 428 with a first identical symbol 432 and populate the run of consecutive elements 232 in the second group 430 with a second identical symbol 434. In one embodiment, the first identical symbol 432 and the second identical symbol 434 are the same. Alternatively, the first identical symbol 432 may be different than the second identical symbol 434.

Figure 78:
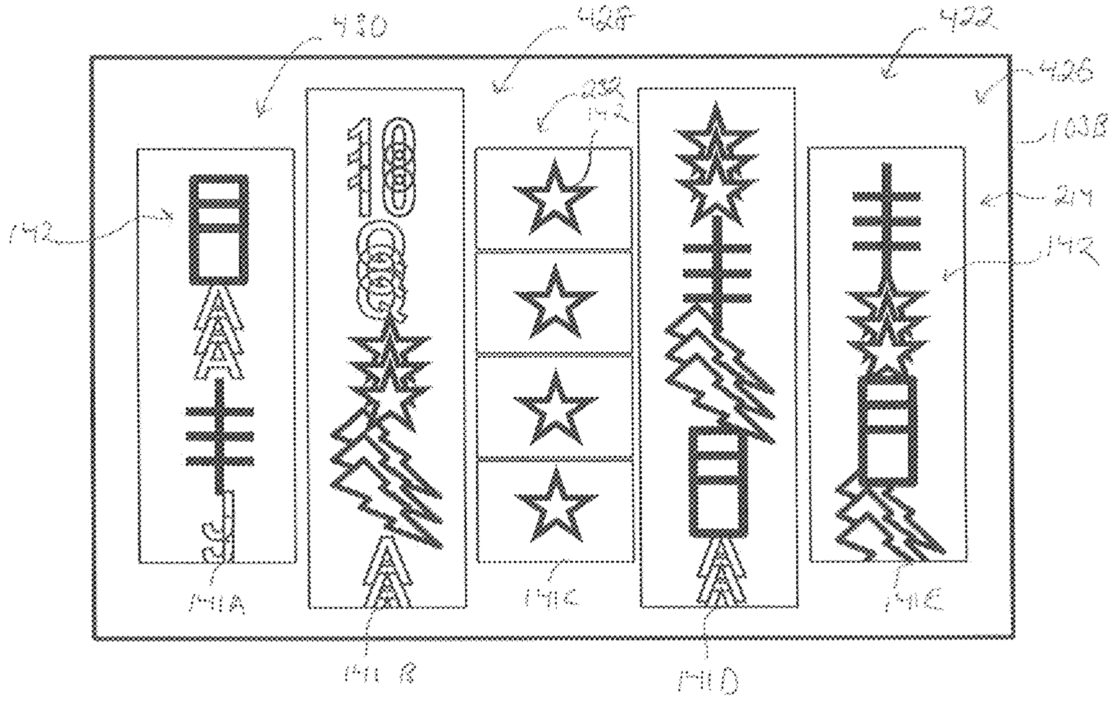
FIG. 78 is a graphical display showing a screen display example of moving symbols at a second initiation of the game.
Figure 79:
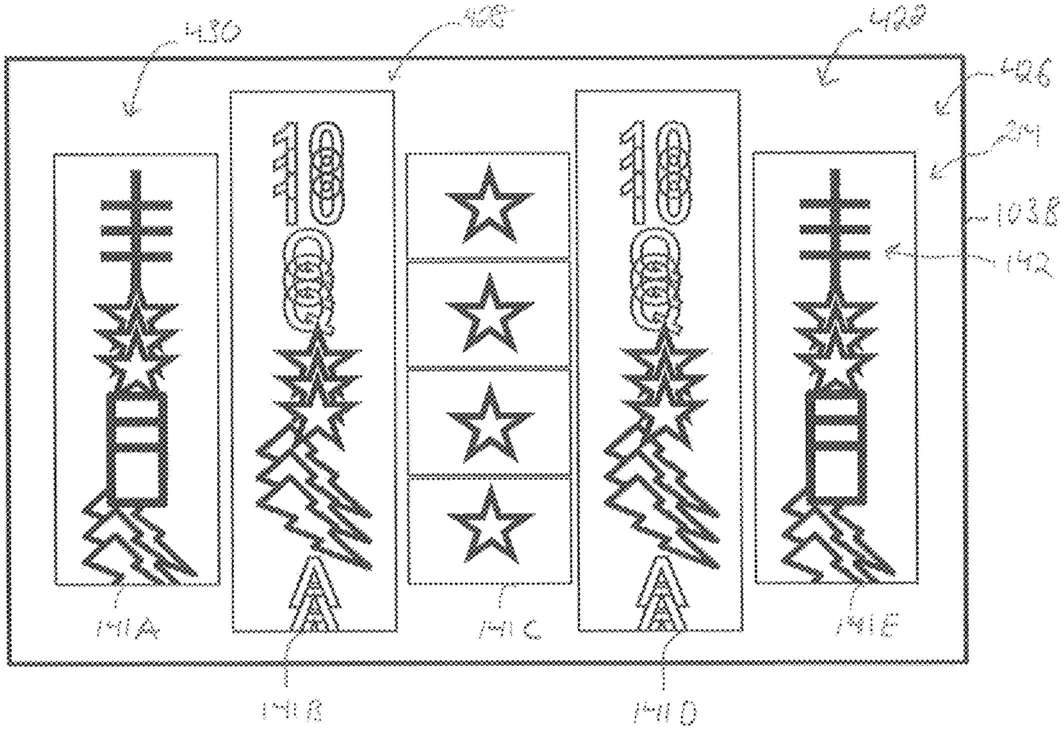
FIG. 79 is another graphical display showing a screen display example of moving symbols at the second initiation of the game.
Figure 80:
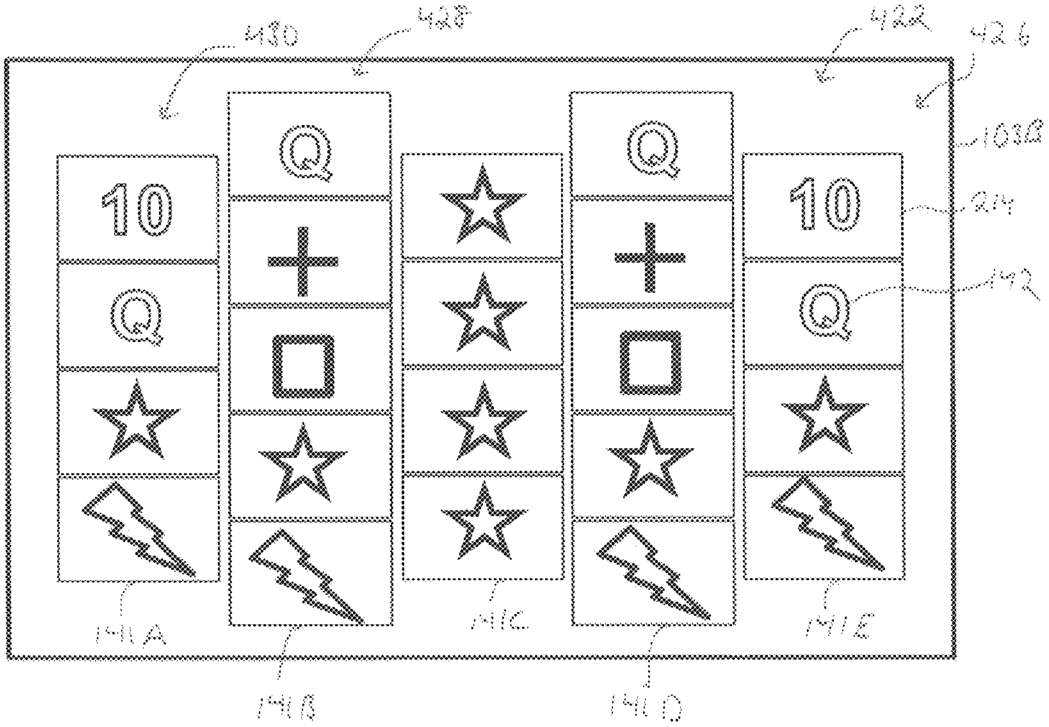
FIG. 80 is a graphical display showing a screen display example of stopped symbols at the second initiation of the game.

In the illustrated embodiment, in the first instance 420 of the game, the game controller 121 displays at least one reel such as, for example, reel 141C with a run of consecutive elements 232. For example, as shown in FIG. 77, the game controller 121 may display reel 141C with a run of consecutive elements 232 and populate the run of consecutive elements 232 with an identical symbol 142 in the first instance 420. The game controller 121 may also detect the triggering condition in the first instance outcome 424 if the run of consecutive elements 232 is displayed in the first instance 420 with the reel 141C stopped. Upon detecting the triggering condition in the first instance 420, the game controller 121 may retain the reel 141C in the stopped position during the second instance 422 and rotate the selected reels 141B and 141D to display the second instance 422 with the reel 141C held in the stopped position (as shown in FIGS. 78-80) with the identical symbol 142 displayed in the second instance outcome 426.

In one embodiment, the game controller 121 may populate the run of consecutive elements 232 in the reel 141C with an identical symbol 142 in the first instance 420 and display the run of consecutive elements 232 with the identical symbol 142 in the second instance 422. Alternatively, the game controller 121 may replace the symbols 142 displayed in the run of consecutive elements 232 with another symbol 142 during the second instance 422. In addition, the game controller 121 may select the synchronized reels 141B and 141D such that the held reel 141C is between the synchronized reels 141B and 141D.

GENERAL INTERPRETATION OF TERMS

In understanding the scope of the present invention, the term "configured" as used herein to describe a component, section or portion of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single portion or a plurality of portions. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A gaming machine for providing a game to a player, comprising:

a display device for displaying the game, the game including a plurality of reels, each reel having a predetermined number of elements, wherein each element has an associated symbol from a set of symbols, at least one reel has a run of consecutive elements; and, a game controller for initiating an instance of the game, responsively displaying the game on the display device, randomly determining an outcome of the game, and responsively spinning and stopping the reels to display the outcome, the outcome including at least two reels having the same symbols being displayed in the same symbol elements, the game controller for displaying each one of the at least two reels having a run of consecutive elements, and populating the run of consecutive elements with an identical symbol, the game controller for synchronizing a rotation of the at least two reels to display the same symbols in the same symbol elements while the at least two reels are spinning.

2. A gaming machine in accordance with claim 1, the game controller for populating the run of consecutive elements while the reels are spinning such that the player is made aware of the population of the run of consecutive elements with the identical symbol.

3. A gaming machine in accordance with claim 1, the game controller for randomly selecting the identical symbol from a subset of symbols.

4. A gaming machine in accordance with claim 1, wherein the at least two reels are adjacent.

5. A gaming machine in accordance with claim 1, the game controller for displaying the game outcome including a first group of two reels from the plurality of reels having the same symbols being displayed in the same symbol elements and a second group of two different reels from the plurality of reels having the same symbols being displayed in the same symbol elements, each reel of the first and second group of reels having a run of consecutive elements.

6. A gaming machine in accordance with claim 5, the game controller for populating the run of consecutive elements in the first group with a first identical symbol, and populating the run of consecutive elements in the second group with a second identical symbol.

7. A gaming machine in accordance with claim 6, wherein the first identical symbol and the second identical symbol are the same.

8. A gaming machine for providing a game to a player, comprising:

a display device for displaying the game, the game including a plurality of reels, each reel having a predetermined number of elements, wherein each element has an associated symbol from a set of symbols; and, a game controller for initiating a first instance of the game and responsively displaying the game on the display device, the game including a plurality of first reels and a second reel, the game controller for detecting a triggering condition in the first instance and in response to detecting the triggering condition, initiating a second instance of the game, determining an outcome of the second instance of the game including at least two first reels having the same symbols being displayed in the same symbol elements, displaying the outcome including spinning and stopping the at least two first reels and retaining the second reel in a stop position while the at least two first reels are spinning, and awarding an award to the player as a function of the outcome, the game controller for synchronizing a rotation of the at least two first reels to display the same symbols in the same symbol elements while the at least two reels are spinning.

9. A gaming machine in accordance with claim 8, wherein at least one of the plurality of reels has a run of consecutive elements, the triggering condition is defined as the run of consecutive elements being displayed in an outcome of the first instance.

10. A gaming machine in accordance with claim 9, wherein the triggering condition is defined as the second reel being displayed with the run of consecutive elements in the first instance outcome.

11. A gaming machine in accordance with claim 8, wherein the second reel has a run of consecutive elements, the game controller for populating the run of consecutive elements with an identical symbol in the first instance and displaying the run of consecutive elements with an identical symbol in the second instance.

12. A gaming machine in accordance with claim 11, the game controller for replacing the identical symbol with a replacement symbol during the second instance.

13. A gaming machine in accordance with claim 8, wherein the at least two reels are adjacent.

14. A gaming machine in accordance with claim 8, wherein the at least two first reels are separated by the second reel.

15. A method of providing a game on a gaming machine having a plurality of reels and a display device, each reel having a predetermined number of elements, wherein each element has an associated symbol from a set of symbols, at least one reel of the plurality of reels having a run of consecutive elements, the method including the steps of:

initiating an instance of the game and responsively displaying the game on a display device;

randomly determining an outcome of the game and responsively spinning and stopping the reels to display the outcome, the outcome including at least two reels having the same symbols being displayed in the same symbol elements;

displaying each one of the at least two reels having a run of consecutive elements;

populating the run of consecutive elements with an identical symbol; and synchronizing a rotation of the at least two reels to display the same symbols in the same symbol elements while the at least two reels are spinning.

16. A method in accordance with claim 15, further comprising the step of populating the run of consecutive elements while the reels are spinning such that the player is made aware of the population of the run of consecutive elements with the identical symbol.

17. A method in accordance with claim 15, further comprising the step of randomly selecting the identical symbol from a subset of symbols.

18. A method in accordance with claim 15, wherein the at least two reels are adjacent.

19. A method in accordance with claim 15, further comprising the steps of displaying the game outcome including a first group of two reels from the plurality of reels having the same symbols being displayed in the same symbol elements and a second group of two different reels from the plurality of reels having the same symbols being displayed in the same symbol elements, each reel of the first and second group of reels having a run of consecutive elements.

20. A method in accordance with claim 19, further comprising the steps of:

populating the run of consecutive elements in the first group with a first identical symbol; and populating the run of consecutive elements in the second group with a second identical symbol.

21. A method in accordance with claim 20, wherein the first identical symbol and the second identical symbols are the same.

22. A method of providing an electronic game on a gaming machine having a plurality of reels and a display device, each reel having a predetermined number of elements, wherein each element has an associated symbol from a set of symbols, the method including the steps of:

initiating a first instance of the game and responsively displaying the game on a display device, the game including a plurality of first reels and a second reel;

synchronizing a rotation of the at least two first reels to display the same symbols in the same symbol elements while the at least two reels are spinning;

detecting a triggering condition in the first instance and in response to detecting the triggering condition, initiating a second instance of the game;

determining an outcome of the second instance of the game including at least two first reels having the same symbols being displayed in the same symbol elements;

displaying the outcome including spinning and stopping the at least two first reels and retaining the second reel in a stop position while the at least two reels are spinning; and awarding an award to the player as a function of the outcome.

23. A method in accordance with claim 22, wherein at least one reel of the plurality of reels having a run of consecutive elements, the triggering condition is defined as the run of consecutive elements being displayed in an outcome of the first instance.

24. A method in accordance with claim 23, wherein the triggering condition is defined as the second reel being displayed with the run of consecutive elements in the first instance outcome.

25. A method in accordance with claim 22, wherein the second reel has a run of consecutive elements, the method includes the step of populating the run of consecutive elements with an identical symbol in the first instance and displaying the run of consecutive elements with an identical symbol in the second instance.

26. A method in accordance with claim 25, further comprising the step of replacing the identical symbol with a replacement symbol during the second instance.

27. A method in accordance with claim 22, wherein the at least two reels are adjacent.

28. A method in accordance with claim 22, wherein the at least two first reels are separated by the second reel.

* * * * *